US008620658B2

(12) United States Patent
Nakade et al.

(10) Patent No.: US 8,620,658 B2
(45) Date of Patent: Dec. 31, 2013

(54) VOICE CHAT SYSTEM, INFORMATION PROCESSING APPARATUS, SPEECH RECOGNITION METHOD, KEYWORD DATA ELECTRODE DETECTION METHOD, AND PROGRAM FOR SPEECH RECOGNITION

(75) Inventors: Motoki Nakade, Tokyo (JP); Hiroaki Ogawa, Chiba (JP); Hitoshi Honda, Tokyo (JP); Yoshinori Kurata, Ibaraki (JP); Daisuke Ishizuka, Saitama (JP)

(73) Assignees: Sony Corporation, Tokyo (JP); So-Net Entertainment Corporation, Tokyo (JP)

( * ) Notice: Subject to any disclaimer, the term of this patent is extended or adjusted under 35 U.S.C. 154(b) by 1370 days.

(21) Appl. No.: 12/102,158

(22) Filed: Apr. 14, 2008

(65) Prior Publication Data
US 2009/0055185 A1 Feb. 26, 2009

(30) Foreign Application Priority Data

| Apr. 16, 2007 | (JP) | JP2007-107319 |
| Apr. 16, 2007 | (JP) | JP2007-107324 |
| Dec. 17, 2007 | (JP) | JP2007-325274 |
| Dec. 17, 2007 | (JP) | JP2007-325275 |

(51) Int. Cl.
| *G10L 15/00* | (2013.01) |
| *G06F 17/27* | (2006.01) |
| *G06F 17/21* | (2006.01) |
| *G10L 15/26* | (2006.01) |
| *G10L 17/00* | (2013.01) |
| *G10L 15/04* | (2013.01) |
| *G10L 15/14* | (2006.01) |
| *G10L 21/00* | (2013.01) |

(52) U.S. Cl.
USPC ............. 704/257; 704/9; 704/10; 704/235; 704/246; 704/251; 704/256; 704/270; 704/270.1; 704/275

(58) Field of Classification Search
USPC .............. 704/9, 10, 235, 246, 251, 270, 271, 704/257, 275, 256, 270.1
See application file for complete search history.

(56) References Cited

U.S. PATENT DOCUMENTS 5,842,163 A * 11/1998 Weintraub ................ 704/240
6,219,045 B1 * 4/2001 Leahy et al. ............... 715/757
(Continued)

FOREIGN PATENT DOCUMENTS

| JP | 9-186978 | 7/1997 |
| JP | 2001-184289 | 7/2001 |

(Continued)

OTHER PUBLICATIONS

Office Action corresponding to Japanese Application No. 2007-325274.

*Primary Examiner* — Edgar Guerra-Erazo
(74) *Attorney, Agent, or Firm* — Frommer Lawrence & Haug LLP; William S. Frommer

(57) ABSTRACT

A voice chat system includes a plurality of information processing apparatuses that performs a voice chat while performing speech recognition and a search server connected to the plural information processing apparatuses via a communication network. The search server discloses a search keyword list containing the search keywords searched by the search server to at least one of the plural information processing apparatuses. The at least one information processing apparatus includes a recognition word dictionary generating unit that acquires the search keyword list from the search server to generate a recognition word dictionary containing words for use in the speech recognition, and a speech recognition unit that performs speech recognition on voice data obtained from a dialog of the conversation during the voice chat by referencing a recognition database containing the recognition word dictionary.

49 Claims, 42 Drawing Sheets

(56) References Cited

U.S. PATENT DOCUMENTS

| | | | |
|---|---|---|---|
| 6,275,792 B1* | 8/2001 | Lewis | 704/9 |
| 6,513,009 B1* | 1/2003 | Comerford et al. | 704/270 |
| 6,731,307 B1* | 5/2004 | Strubbe et al. | 715/727 |
| 6,999,932 B1* | 2/2006 | Zhou | 704/277 |
| 7,127,497 B2 | 10/2006 | Nonaka | |
| 7,785,197 B2* | 8/2010 | Smith | 463/30 |
| 7,836,044 B2* | 11/2010 | Kamvar et al. | 707/713 |
| 8,375,033 B2* | 2/2013 | Shpigel et al. | 707/748 |
| 2001/0023192 A1* | 9/2001 | Hagane | 455/563 |
| 2001/0041977 A1* | 11/2001 | Aoyagi et al. | 704/246 |
| 2002/0010760 A1* | 1/2002 | Armenta et al. | 709/219 |
| 2003/0140309 A1* | 7/2003 | Saito et al. | 715/500 |
| 2005/0181878 A1* | 8/2005 | Danieli et al. | 463/42 |
| 2005/0245317 A1* | 11/2005 | Arthur et al. | 463/42 |
| 2007/0124142 A1* | 5/2007 | Mukherjee | 704/235 |
| 2008/0021884 A1* | 1/2008 | Jones et al. | 707/3 |
| 2008/0051064 A1* | 2/2008 | Jones et al. | 455/412.2 |
| 2010/0138402 A1* | 6/2010 | Burroughs et al. | 707/706 |
| 2011/0035383 A1* | 2/2011 | Ghimire | 707/748 |
| 2011/0320273 A1* | 12/2011 | Miranda-Steiner | 705/14.49 |

FOREIGN PATENT DOCUMENTS

| | | |
|---|---|---|
| JP | 2002 216026 | 8/2002 |
| JP | 2002-245078 | 8/2002 |
| JP | 2002-297645 | 10/2002 |
| JP | 2003-186494 | 7/2003 |
| JP | 2003-323192 | 11/2003 |
| JP | 3526101 | 2/2004 |
| JP | 2004 252121 | 9/2004 |
| JP | 2004-267433 | 9/2004 |
| JP | 2004-295102 | 10/2004 |
| JP | 2005-237017 | 9/2005 |
| JP | 2005-309760 | 11/2005 |
| JP | 2006-319456 | 11/2006 |
| JP | 2007-79745 | 3/2007 |
| JP | 2007-514992 | 6/2007 |
| JP | 2008-225191 | 9/2008 |
| WO | WO 2005/045806 | 5/2005 |

\* cited by examiner

FIG.3
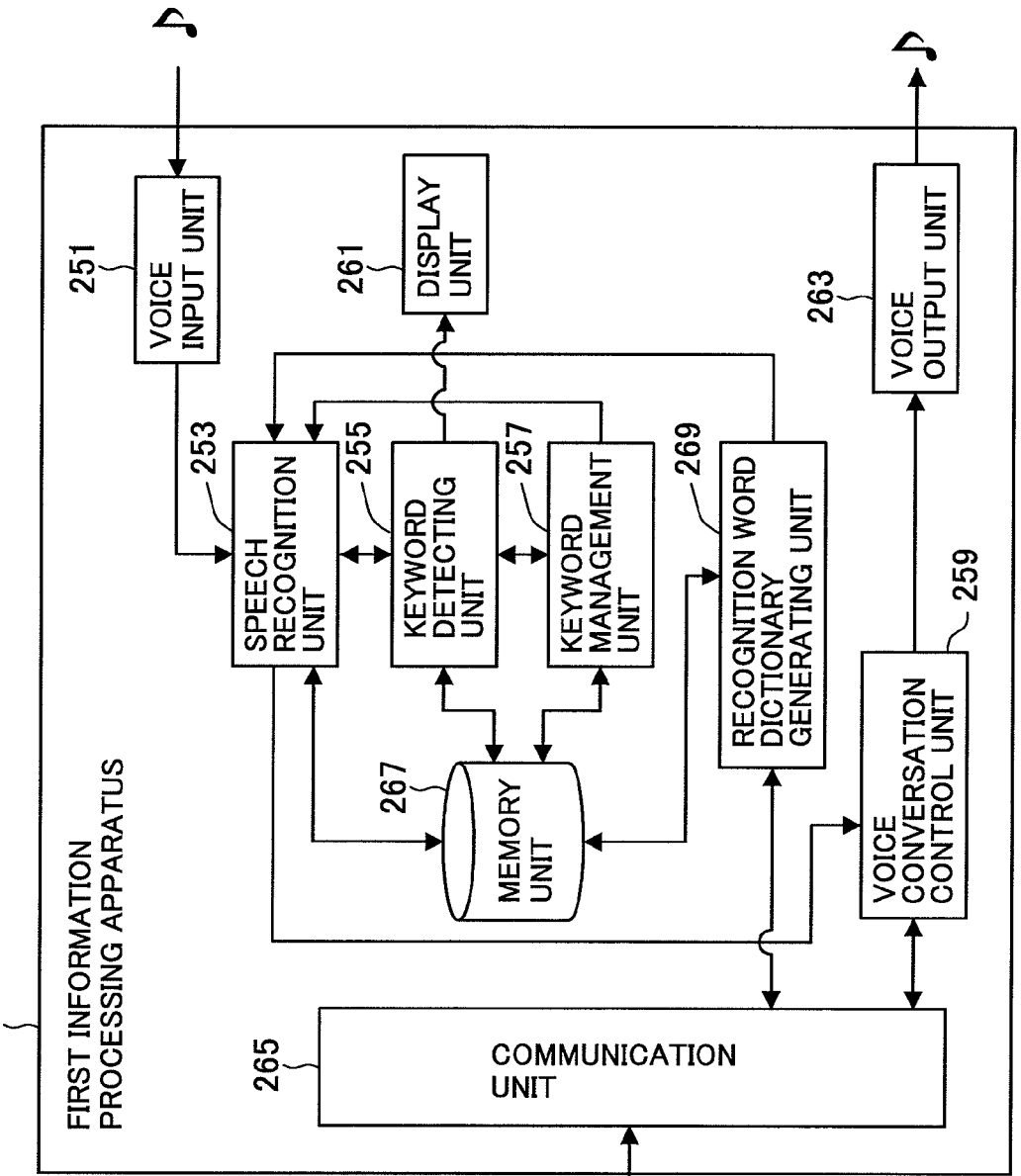
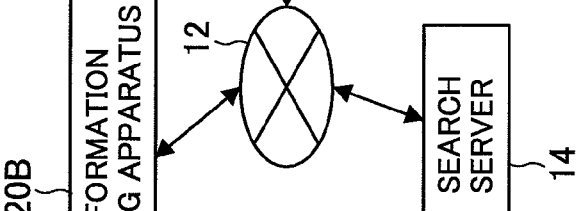

FIG.6

| SYMBOL | TRANSCRIPTION | PHONEME SEQUENCE |
|---|---|---|
| <FRONT END> | [ ] | silB |
| <TERMINAL END> | [ ] | silE |
| ア | [ア] | a |
| アー | [アー] | a: |
| イ | [イ] | i |
| イー | [イー] | i: |
| ⋮ | | |
| キャ | [キャ] | ky/a |
| キャー | [キャー] | ky/a: |
| ⋮ | | |
| ン | [ン] | N |
| ッ | [ッ] | q |

FIG.7

| SYMBOL | TRANSCRIPTION | PHONEME SEQUENCE |
|---|---|---|
| <FRONT END> | [ ] | silB |
| <TERMINAL END> | [ ] | silE |
| は | [は] | w/a |
| 何時 | [何時] | n/a/N/j/i |
| に | [に] | n/i |
| 起きた | [起きた] | o/k/i/t/a |
| の | [の] | n/o |
| 行きたい | [行きたい] | i/k/i/t/a/i |
| なあ | [なあ] | n/a: |
| ⋮ | ⋮ | |

FIG.8

| CATEGORY | KANA PRONUNCIATION |
|---|---|
| __PERSONAL NAME__ | ICHIRO |
| __PERSONAL NAME__ | SANITAROU |
| __PLACE NAME__ | KITASHINAGAWA |

FIG.9

| CATEGORY | BELONGING WORD |
|---|---|
| __PERSONAL NAME__ | [ ] |
| __PLACE NAME__ | [ ] |

FIG.10

| CATEGORY | BELONGING WORD |
|---|---|
| __PERSONAL NAME__ | [ICHIRO, SANITAROU] |
| __PLACE NAME__ | KITASHINAGAWA |

FIG.11

| WORD1 | WORD2 | WORD3 | P(WORD3 \| WORD1 WORD2) |
|---|---|---|---|
| <FRONT END> | __PERSONAL NAME__ | WA | 0.012 |
| __PERSONAL NAME__ | WA | NANJI | 0.001 |
| WA | NANNJI | NI | 0.001 |
| NANJI | NI | OKITA | 0.032 |
| NI | OKITA | NO | 0.001 |
| OKITA | NO | <TERMINAL END> | 0.004 |
| <FRONT END> | __PLACE NAME__ | NI | 0.011 |
| __PLACE NAME__ | NI | IKITAI | 0.002 |
| NI | IKITAI | NA | 0.010 |
| IKITAI | NA | <TERMINAL END> | 0.009 |
| ⋮ | ⋮ | ⋮ | ⋮ |

FIG.12 a,a:,i,i:,u,u:,⋯,k,ky,g,gy,s,sh,z,j,t,ch,ts,⋯,y,w,N,sp,silB,silE,q

FIG.13

| KANA | PHONEME |
|---|---|
| ア | a |
| アー | a: |
| イ | i |
| イー | i: |
| ... | |
| エ | e |
| ... | |
| キャ | ky/a |
| キャー | ky/a: |
| ... | |
| ス | s/u |
| ... | |
| ディ | d/i |
| ディー | d/i: |
| ... | |
| ル | r/u |
| ... | |
| ワ | w/a |
| ヲ | o |
| ン | N |
| ッ | q |

FIG.15

Score(<FRONT END> ICHIRO WA NANJI NI OKITA NO <TERMINAL END>)
=P(<FRONT END> ICHIRO WA NANJI NI OKITA NO <TERMINAL END>)   ···(1)

=P(<FRONT END>)
 P(ICHIRO | <FRONT END>)
 P(WA | <FRONT END> ICHIRO)
 P(NANJI | <FRONT END> ICHIRO WA)
 P(NI | <FRONT END> ICHIRO WA NANJI)
 P(OKITA | <FRONT END> ICHIRO WA NANJI NI)
 P(NO | <FRONT END> ICHIRO WA NANJI NI OKITA)
 P(<TERMINAL END> | <FRONT END> ICHIRO WA NANJI NI OKITA NO)   ···(2)

≒P(<FRONT END>)
 P(ICHIRO | <FRONT END>)
 P(WA | <FRONT END> ICHIRO)
 P(NANJI | ICHIRO WA)
 P(NI | WA NANJI)
 P(OKITA | NANJI NI)
 P(NO | NI OKITA)                                              ···(3)
 P(<TERMINAL END> | OKITA NO)

P(ICHIRO | <FRONT END>)
=P(__PERSONAL NAME__ | <FRONT END>)P(ICHIRO | __PERSONAL NAME__)
≒P(__PERSONAL NAME__ | <FRONT END>)/N                          ···(4)

P(WA | <FRONT END>ICHIRO)=P(WA | <FRONT END>__PERSONAL NAME__)
                                                               ···(5)

P(NANJI | ICHIRO WA)=P(NANJI | __PERSONAL NAME__ WA)           ···(6)

FIG.16

| CATEGORY | KANA PRONUNCIATION |
|---|---|
| __PERSONAL NAME__ | ICHIRO |
| __PERSONAL NAME__ | MATSUI |

FIG.17

| SYMBOL | TRANSCRIPTION | PHONEME SEQUENCE |
|---|---|---|
| <FRONT END> | [ ] | silB |
| <TERMINAL END> | [ ] | silE |
| 何時 | [何時] | n/a/N/j/i |
| に | [に] | n/i |
| 起きた | [起きた] | o/k/i/t/a |
| の | [の] | n/o |
| イチロー | [イチロー] | i/ch/i/r/o: |
| 松井 | [松井] | m/a/ts/u/I |

FIG.18

| CATEGORY | BELONGING WORD |
|---|---|
| __PERSONAL NAME__ | ICHIRO |
| __PERSONAL NAME__ | MATSUI |

1501 PIN LOCK DELETE
1 ☑ ☐ CASSIM —1503
  ☐ ☐ カシム語難解 通訳四苦八苦 方言に比喩 —1509
  ☐ ☐ 口コミで浸透、心とらえる"カシムの言葉" —1509
  ☐ ☐ カシム監督 千葉から大量選出へ —1509
1501
5 ☑ ☐ MAKI —1503
  ☐ ☐ ONE FOR ALL 〜牧誠二郎のブログ〜
  ☐ ☐ JET OFFICIAL SITE —1509
1501 ☐ ☑ 新潟市牧支所ホームページ —1509
4 ☐ ☐ CHIBA —1503
1501 ☐ ☐ ...
3 ☐ ☐ YEMEN —1503
1501 ☐ ☐ ...
2 ☐ ☑ REPRESENTATIVE —1503
  ☐ ☐ ...

FIG.35

| KEYWORD | WEIGHT | SESSION ID | CONVERSATIONAL COUNTERPART |
|---|---|---|---|
| JAPAN CUP | 2 | 200609150001 | A |
| | | 200609150002 | B |
| ZANBLOCK | 1 | 200609150001 | A |
| MAKI | 1 | 200609150002 | B |
| ⋮ | ⋮ | ⋮ | ⋮ |

1601  1603  1605  1607

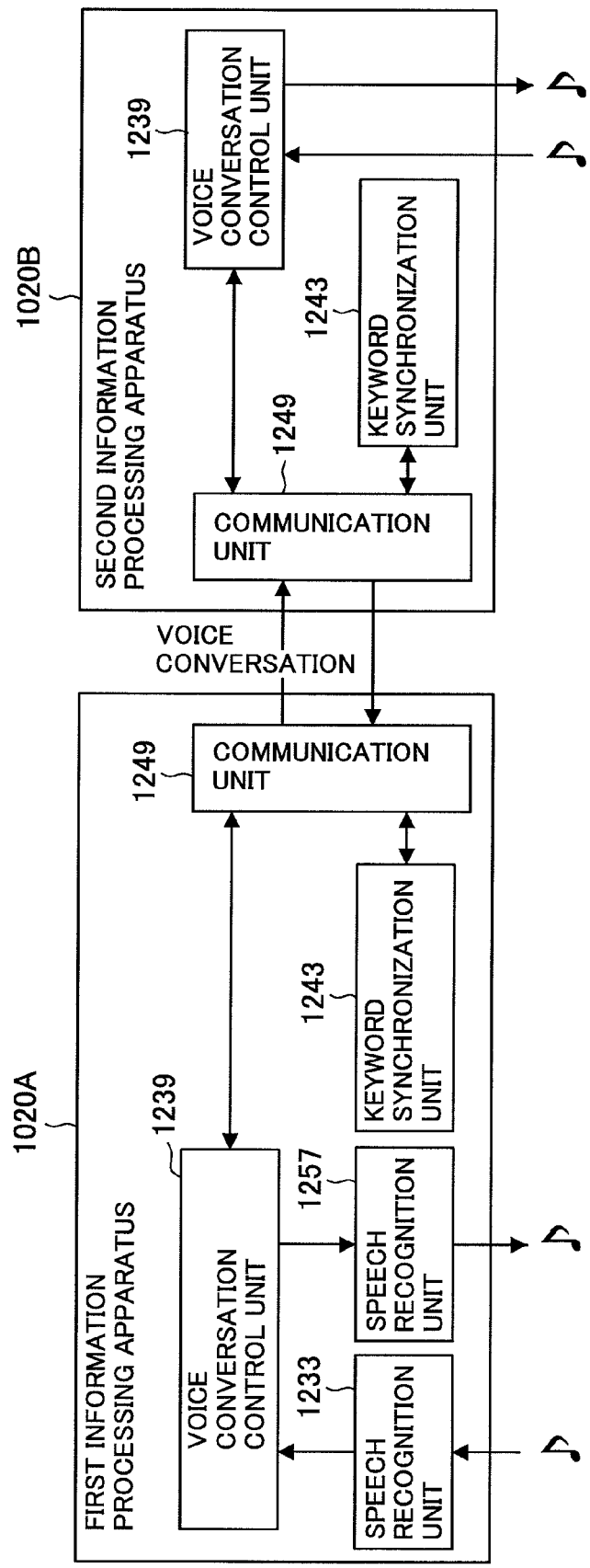

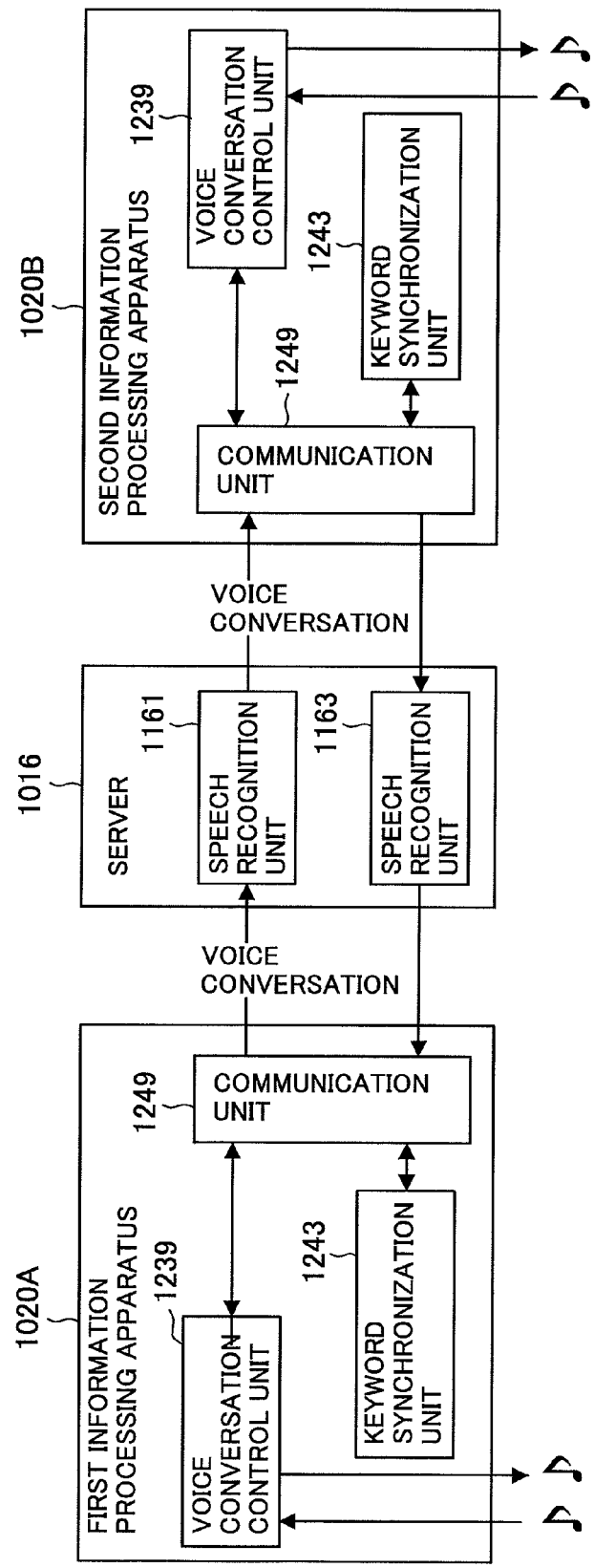

VOICE CHAT SYSTEM, INFORMATION PROCESSING APPARATUS, SPEECH RECOGNITION METHOD, KEYWORD DATA ELECTRODE DETECTION METHOD, AND PROGRAM FOR SPEECH RECOGNITION

CROSS-REFERENCE TO RELATED APPLICATION

The present invention contains subject matter related to Japanese Patent Application JP 2007-107319 filed in the Japan Patent Office on Apr. 16, 2007, Japanese Patent Application JP 2007-107324 filed in the Japan Patent Office on Apr. 16, 2007, Japanese Patent Application JP 2007-325274 filed in the Japan Patent Office on Dec. 17, 2007, and Japanese Patent Application JP 2007-325275 filed in the Japan Patent Office on Dec. 17, 2007, the entire contents of which being incorporated herein by reference.

BACKGROUND OF THE INVENTION

1. Field of the Invention

The present invention relates to a voice chat system, an information processing apparatus, a speech recognition method, a keyword detection method, and a program.

2. Description of the Related Art

Speech recognition has been studied for a long time, and it has come to be able to provide a quite highly accurate recognition rate regarding speech that is read. However, it is still difficult to provide high performance in the recognition of natural conversation between humans.

In recent years, earnest research has been performed on a technology for extracting the subject of conversation from speech, which is also known as a topic detection technology. When employing the topic detection technology, a speech recognition unit that extracts text information from the speech plays an important role.

As a method for extracting keywords from a speech, there are known a method that extracts keywords from a speech only paying attention to the keywords and a method that recognizes the entire speech using large-vocabulary speech recognition and then extracts keywords from a recognition result. Specifically, the former method uses a method of extracting a word sequence, for example, from a phoneme lattice, a lattice of phonemes of which the sequence was recognizable. Meanwhile, the latter method uses LVCSR (large-vocabulary continuous speech recognition). If the number of keywords is great, the latter method is advantageous because of its computational efficiency. In any of the methods, it is necessary to have linguistic understanding on the vocabularies to be recognized, and this can be solved by using information on the frequency of occurrence of the vocabularies to be detected.

The speech recognition can be classified into isolated word recognition that recognizes a isolated word and continuous word recognition that recognizes a word sequence composed of plural words. The continuous word recognition uses a language model, "a database storing the likelihood of linkage between words," to thereby prevent "a word sequence having similar sound but totally different meaning" from being output as a recognition result.

However, the language model describes only the information of the words that are originally recognizable (hereinafter, referred to as known words); therefore, it is difficult to properly recognize words that are registered later (hereinafter, referred to as registered words). On the other hand, in the case of the isolated word recognition, once words are registered in a recognition word dictionary, the words are recognized immediately after the registering. However, in the case of the continuous word recognition, only the registering of words is not sufficient but is necessary to be reflected onto the language model; unfortunately the reflecting onto the language model is generally difficult.

In this respect, an example of the related art, JP-A NO. 2004-252121 discloses a method that classifies registered words into categories such as "personal name" and "place name," provides a language model corresponding to the categories, and correlates the registered words with the categories using the language model, whereby new vocabularies are recognizable by continuous speech recognition.

Meanwhile, selection of the registered words has large issues. In particular, proper nouns are often important keywords because recognition of the proper nouns allows providing users with useful information.

In this respect, as an example of the related art, JP-A NO. 2002-216026 discloses a method that acquires keywords from the information on the Internet and extracts a keyword from the acquired keywords.

There are however numerous proper nouns; therefore it may be practically difficult to register all the words that users will speak for speech recognition in advance.

SUMMARY OF THE INVENTION

For these reasons, even the method disclosed in JP-A NO. 2002-216026 may have difficulties in recognizing with high accuracy a keyword related the latest topics from a dialog of the conversation during a voice chat.

The present invention is contrived in view of the above-mentioned situations. There is a need for providing new and improved voice chat system, information processing apparatus, speech recognition method, and program that can recognize with high accuracy a keyword existing in a dialog of the conversation during a voice chat with high accuracy with high accuracy.

There is also a need for providing new and improved information processing apparatus, keyword detection method, and program that can detect a keyword existing in broadcast information (program information) with high accuracy of the conversation during a voice chat.

According to a viewpoint of the present invention, there is provided a voice chat system, including: a plurality of information processing apparatuses that perform a voice chat while performing speech recognition; and a search server connected to the plural information processing apparatuses via a communication network, wherein the search server discloses a search keyword list containing the search keywords searched by the search server to at least one of the information processing apparatuses, the at least one information processing apparatus including: a recognition word dictionary generating unit that acquires the search keyword list from the search server to generate a recognition word dictionary containing words for use in the speech recognition; a speech recognition unit that performs speech recognition on voice data obtained from a dialog of the conversation during the voice chat by referencing a recognition database containing the recognition word dictionary; a voice conversation control unit that performs communication control of the voice data with at least one information processing apparatus; and a keyword detection unit that detects keywords related to the content of the conversation during the voice chat from the result of the speech recognition.

According to another viewpoint of the present invention, there is provided an information processing apparatus acquiring, from a search server, a search keyword list containing the search keywords searched by the search server and performing a voice chat with other information processing apparatus, the apparatus including: a recognition word dictionary generating unit that acquires the search keyword list from the search server to generate a recognition word dictionary containing words for use in the speech recognition; a speech recognition unit that performs speech recognition on voice data obtained from a dialog of the conversation during the voice chat by referencing a recognition database containing the recognition word dictionary; a voice conversation control unit that performs communication control of the voice data with the other information processing apparatus; and a keyword detection unit that detects keywords related to the content of the conversation during the voice chat from the result of the speech recognition.

The recognition word dictionary may include: a fixed word dictionary in which predetermined words are pre-registered; and a variable word dictionary in which registered words are updated on an as needed basis, and the recognition word dictionary generating unit may select words to be registered in the variable word dictionary from the search keyword list that contains higher-rank search keywords of the search server to generate the variable word dictionary.

The recognition word dictionary generating unit may determine a preference of a user of the information processing apparatus based on history information of the keywords detected by the keyword detection unit and select the words from the search keyword list based on the preference.

The recognition word dictionary generating unit may search for the words selected from the search keyword list using the search server and acquire a sub-keyword related to the words from a search result obtained by the search, thereby registering the sub-keyword in the variable word dictionary in a correlated manner with the words.

The recognition word dictionary generating unit may apply a weight to the respective words selected from the search keyword list based on search rank information that is determined by a frequency of the words being searched by the search server.

The recognition word dictionary generating unit may calculate a frequency of the keywords based on history information of the keywords detected by the keyword detection unit and change the weight of the words registered in the variable word dictionary and corresponding to the keywords.

According to a still another viewpoint of the present invention, there is provided an information processing apparatus acquiring, from a search server, a search keyword list containing the search keywords searched by the search server, selecting words from the search keyword list, acquiring, from a recognition word dictionary generating device that applies weight information for use in speech recognition to the selected words, the words having the weight information applied thereto, and performing a voice chat with other information processing apparatus, the apparatus including: a speech recognition unit that performs speech recognition on voice data obtained from a dialog of the conversation during the voice chat by referencing a recognition database containing the words acquired from the recognition word dictionary generating device; a voice conversation control unit that performs communication control of the voice data with the other information processing apparatus; and a keyword detection unit that detects keywords related to the content of the conversation during the voice chat from the result of the speech recognition.

According to a still another viewpoint of the present invention, there is provided a speech recognition method used in an information processing apparatus, the apparatus acquiring, from a search server, a search keyword list containing the search keywords searched by the search server and performing a voice chat with other information processing apparatus, the method including the steps of: acquiring the search keyword list from the search server to generate a recognition word dictionary containing words for used in speech recognition; obtaining voice data from the content of the conversation during the voice chat; analyzing the voice data based on an acoustic feature of the voice data and generating word sequence candidates corresponding to the content of the conversation; and analyzing the generated word sequence candidates based on a linguistic concatenation feature between the words that constitute the word sequence by referencing a recognition database for use in the speech recognition containing the recognition word dictionary, thereby selecting a most feasible word sequence.

According to a still another viewpoint of the present invention, there is provided a speech recognition method used in an information processing apparatus, the apparatus acquiring, from a search server, a search keyword list containing the search keywords searched by the search server, selecting words from the search keyword list, acquiring, from a recognition word dictionary generating device that applies weight information for use in speech recognition to the selected words, the words having the weight information applied thereto, and performing a voice chat with other information processing apparatus, the method including the steps of: acquiring the words having the weight information applied thereto from the recognition word dictionary generating device and storing the words in a recognition database for use in speech recognition; obtaining voice data from the content of the conversation during the voice chat; analyzing the voice data based on an acoustic feature of the voice data and generating word sequence candidates corresponding to the content of the conversation; and analyzing the generated word sequence candidates based on a linguistic concatenation feature between the words that constitute the word sequence by referencing the recognition database, thereby selecting a most feasible word sequence.

According to a still another viewpoint of the present invention, there is provided a program for a computer that controls an information processing apparatus, the apparatus acquiring, from a search server, a search keyword list containing the search keywords searched by the search server and performing a voice chat with other information processing apparatus, the program allowing the computer to execute: a recognition word dictionary generating function that acquires the search keyword list from the search server to generate a recognition word dictionary containing words for use in the speech recognition; a speech recognition function that performs speech recognition on voice data obtained from a dialog of the conversation during the voice chat by referencing a recognition database containing the recognition word dictionary; a voice conversation control function that performs communication control of the voice data with the other information processing apparatus; and a keyword detection function that detects keywords related to the content of the conversation during the voice chat from the result of the speech recognition.

According to the embodiment described above, the computer program is stored in a memory unit of the computer and executed when a CPU of the computer reads the program, thereby causing the computer to function as the information processing apparatus. A computer-readable recording medium may also be provided having recorded therein the computer program. The recording medium may be a magnetic disk, an optical disk, a magneto-optical disk, and a flash memory, for example. The computer program may be distributed, for example, via a network without using the recording medium.

According to a still another viewpoint of the present invention, there is provided a program for a computer that controls an information processing apparatus, the apparatus acquiring, from a search server, a search keyword list containing the search keywords searched by the search server, selecting words from the search keyword list, acquiring, from a recognition word dictionary generating device that applies weight information for use in speech recognition to the selected words, the words having the weight information applied thereto, and performing a voice chat with other information processing apparatus, the program allowing the computer to execute: a speech recognition function that performs speech recognition on voice data obtained from a dialog of the conversation during the voice chat by referencing a recognition database containing the words acquired from the recognition word dictionary generating device; a voice conversation control function that performs communication control of the voice data with the other information processing apparatus; and a keyword detection function that detects keywords related to the content of the conversation during the voice chat from the result of the speech recognition.

According to a still another viewpoint of the present invention, there is provided an information processing apparatus, including: a recognition word dictionary generating unit that acquires, from a search server, a search keyword list containing the search keywords searched by the search server to generate a recognition word dictionary containing words for use in language recognition; a broadcast text information receiving unit that receives broadcast text information transmitted from a broadcasting station; a keyword detection unit that detects predetermined keywords from the broadcast text information by referencing the recognition word dictionary; and an external display device connection control unit that performs connection control with an external display device and outputs the keywords detected from the broadcast text information to the external display device.

The broadcast text information receiving unit may acquire reception channel information concerning a broadcast channel through which the external display device is receiving and the broadcast text information corresponding to the broadcast channel from the external display device connected to the information processing apparatus. Alternatively, the broadcast text information receiving unit may acquire reception channel information concerning a broadcast channel through which the external display device is receiving, from the external display device connected to the information processing apparatus, and acquires the broadcast text information corresponding to the broadcast channel from the broadcasting station.

The information processing apparatus may store a reference history of the keywords in the external display device, and the external display device connection control unit may notify the search server of a keyword selected by the external display device.

According to a still another viewpoint of the present invention, there is provided An information processing apparatus, including: a recognition word dictionary generating unit that acquires, from a search server, a search keyword list containing the search keywords searched by the search server to generate a recognition word dictionary containing words for use in speech recognition; a broadcast audio information receiving unit that receives broadcast audio information transmitted from a broadcasting station; a speech recognition unit that performs speech recognition on the broadcast audio information by referencing a recognition database containing the recognition word dictionary; a keyword detection unit that detects predetermined keywords from the result of the speech recognition on the broadcast audio information; and an external display device connection control unit that performs connection control with an external display device and outputs the keywords detected from the broadcast audio information to the external display device.

The broadcast audio information receiving unit may acquire reception channel information concerning a broadcast channel through which the external display device is receiving and the broadcast audio information corresponding to the broadcast channel from the external display device connected to the information processing apparatus. Alternatively, the broadcast audio information receiving unit may acquire reception channel information concerning a broadcast channel through which the external display device is receiving, from the external display device connected to the information processing apparatus, and acquires the broadcast audio information corresponding to the broadcast channel from the broadcasting station.

The information processing apparatus may store a reference history of the keywords in the external display device, and the external display device connection control unit may notify the search engine of a keyword selected by the external display device.

According to a still another viewpoint of the present invention, there is provided a keyword detection method, including the steps of: acquiring, from a search server, a search keyword list containing the search keywords searched by the search server to generate a recognition word dictionary containing words for use in language recognition; receiving broadcast text information transmitted from a broadcasting station; detecting predetermined keywords from the broadcast text information by referencing the recognition word dictionary; and performing connection control with an external display device and outputting the keywords detected from the broadcast text information to the external display device.

According to a still another viewpoint of the present invention, there is provided a keyword detection method, including the steps of: acquiring, from a search server, a search keyword list containing the search keywords searched by the search server to generate a recognition word dictionary containing words for use in speech recognition; receiving broadcast audio information transmitted from a broadcasting station; performing speech recognition on the broadcast audio information by referencing a recognition database containing the recognition word dictionary; detecting predetermined keywords from the result of the speech recognition on the broadcast audio information; and performing connection control with an external display device and outputting the keywords detected from the broadcast audio information to the external display device.

According to a still another viewpoint of the present invention, there is provided a program for allowing a computer to realize: a recognition word dictionary generating function that acquires, from a search server, a search keyword list containing the search keywords searched by the search server to generate a recognition word dictionary containing words for use in language recognition; a broadcast text information receiving function that receives broadcast text information transmitted from a broadcasting station; a keyword detection function that detects predetermined keywords from the broadcast text information by referencing the recognition word dictionary; and an external display device connection control function that performs connection control with an external display device and outputs the keywords detected from the broadcast text information to the external display device.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

According to a still another viewpoint of the present invention, there is provided a program for allowing a computer to realize: a recognition word dictionary generating function that acquires, from a search server, a search keyword list containing the search keywords searched by the search server to generate a recognition word dictionary containing words for use in speech recognition; a broadcast audio information receiving function that receives broadcast audio information transmitted from a broadcasting station; a speech recognition function that performs speech recognition on the broadcast audio information by referencing a recognition database containing the recognition word dictionary; a keyword detection function that detects predetermined keywords from the result of the speech recognition on the broadcast audio information; and an external display device connection control function that performs connection control with an external display device and outputs the keywords detected from the broadcast audio information to the external display device.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

According to the embodiments of the present invention described above, a recognition word dictionary for speech recognition is created using a database acquired from a search server and the speech recognition is performed using the recognition word dictionary. Therefore, it is possible to recognize with high accuracy a keyword existing in a dialog of the conversation during a voice chat with high accuracy with high accuracy. Moreover, a recognition word dictionary for language recognition is created using a database acquired from a search server and keyword detection is performed using the recognition word dictionary. Therefore, it is possible to detect a keyword existing in broadcast information (program information) with high accuracy.

BRIEF DESCRIPTION OF THE DRAWINGS

FIG. 3 is a block diagram for explaining the configuration of the information processing apparatus according to the first embodiment;

FIG. 6 is an explanatory diagram showing an example of a fixed word dictionary according to the first embodiment;

FIG. 7 is an explanatory diagram showing another example of the fixed word dictionary according to the first embodiment;

FIG. 8 is an explanatory diagram showing an example of a variable word dictionary according to the first embodiment;

FIG. 9 is an explanatory diagram showing an example of a category table according to the first embodiment;

FIG. 10 is an explanatory diagram showing another example of the category table according to the first embodiment;

FIG. 11 is an explanatory diagram showing an example of a language model according to the first embodiment;

FIG. 12 is an explanatory diagram showing an example of a phoneme list according to the first embodiment;

FIG. 13 is an explanatory diagram showing a Kana-phoneme conversion rule according to the first embodiment;

FIG. 15 is an explanatory diagram showing an example of a computation formula for a language score according to the first embodiment;

FIG. 16 is an explanatory diagram showing a modified example of a common dictionary according to the first embodiment;

FIG. 17 is an explanatory diagram showing a modified example of a fixed word dictionary according to the first embodiment;

FIG. 18 is an explanatory diagram showing a modified example of the category table according to the first embodiment;

FIG. 34 is an explanatory diagram showing an example of search information display by the information processing apparatus according to the third embodiment;

FIG. 35 is an explanatory diagram showing reference history data of search information according to the third embodiment;

FIG. 36C is a simplified block diagram for explaining a second modified example of the speech recognition method of the information processing apparatus according to the third embodiment;

FIG. 36D is a simplified block diagram for explaining a third modified example of the speech recognition method of the information processing apparatus according to the third embodiment;

DETAILED DESCRIPTION OF THE PREFERRED EMBODIMENTS

Figure 1:
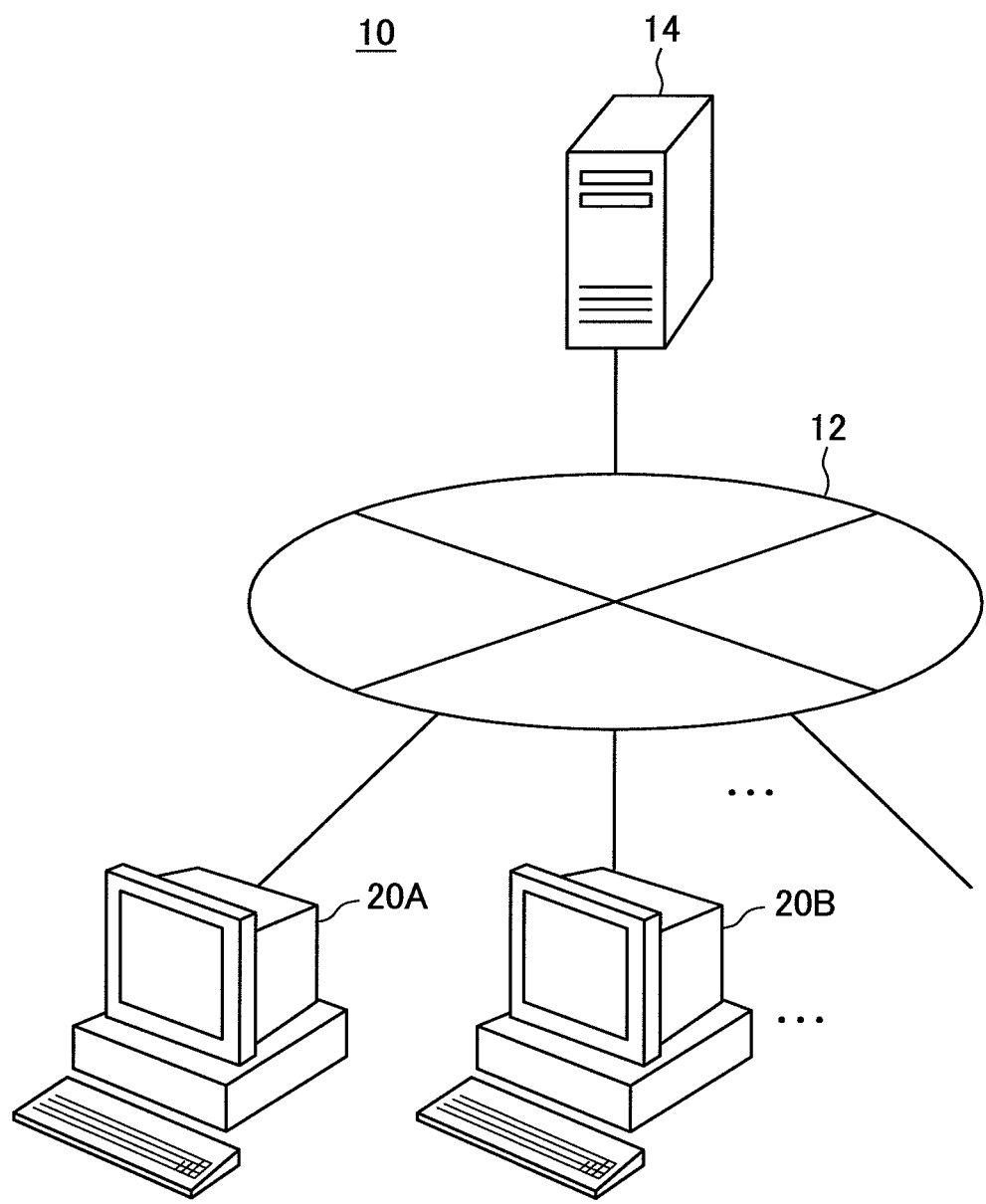
FIG. 1 is an explanatory diagram showing a voice chat system according to a first embodiment of the present invention.

Hereinafter, preferred embodiments of the present invention will be described in detail with reference to the attached drawings. Note that, in this specification and the attached drawings, structural elements that have substantially the same function and structure are denoted with the same reference numerals, and repeated explanation of these structural elements is omitted.

First Embodiment

Hereinafter, a voice chat system according to a first embodiment of the present invention will be described in detail.

FIG. 1 is an explanatory diagram showing a voice chat system according to a first embodiment. The voice chat system 10 includes a communication network 12, a search server 14, and information processing apparatuses 20A and 20B (hereinafter, sometimes, collectively referred to as information processing apparatus or apparatuses 20).

The communication network 12 is a communication network that connects the information processing apparatus 20 and the search server 14 to enable bidirectional or unidirectional communication therebetween. The communication network 12 may be constructed, for example, by a public network, such as Internet, telephone network, satellite communication network, or broadcast communication channel, or a private network, such as WAN (Wide Area Network), LAN (Local Area Network), IP-VPN (Internet Protocol-Virtual Private Network), Ethernet (registered trademark), or wireless LAN. The communication network 12 may be wired or wireless.

The search server 14 is a website that users can search for information available through the Internet using keywords or the like. In the present embodiment, the search server 14 may provide a full-text search service that allows search of the full text of information in store using a keyword; or it may be a directory service that allows search of information classified by categories.

The information processing apparatus 20 performs a chat (a voice chat) by means of voice with another information processing apparatus 20 connected thereto via the communication network 12. The information processing apparatus 20 can request the search server 14 connected thereto via the communication network 12 to perform search of information via the communication network 12. The another information processing apparatus 20 performing the voice chat may be connected thereto via the communication network 12, as shown in the drawing. Alternatively, the another information processing apparatus 20 may be directly connected, not via the communication network 12, to a USB (Universal Serial Bus) port, an IEEE 1394 port such as i.Link, an SCSI (Small Computer System Interface) port, an RS-232C port, and the like.

In the shown example shown in the drawing, the information processing apparatus 20 is a desktop PC; however, in the present embodiment, the information processing apparatus 20 may be a notebook PC. In the present embodiment, the information processing apparatus 20 is not limited to the example described above but may be constructed, for example, by a television set-top checkbox, an information appliance such as a home-use game machine, a mobile phone, a PDA (Personal Digital Assistant), and the like as long as it is a device capable of having a function of communicating via a network. Additionally or alternatively, the information processing apparatus 20 may be a portable device, such as a portable game machine, a PHS, or a portable video/audio player, which is carried by a user who leased it.

In FIG. 1, only two information processing apparatuses 20 are connected to the communication network 12. However, the present embodiment is not limited to the example, and a plurality of information processing apparatuses 20 may be connected to the communication network 12.

(Hardware Configuration of Information Processing Apparatus 20)

Next, the hardware configuration of the information processing apparatus 20 according to the present embodiment will be described briefly with reference to FIG. 2.

Figure 2:
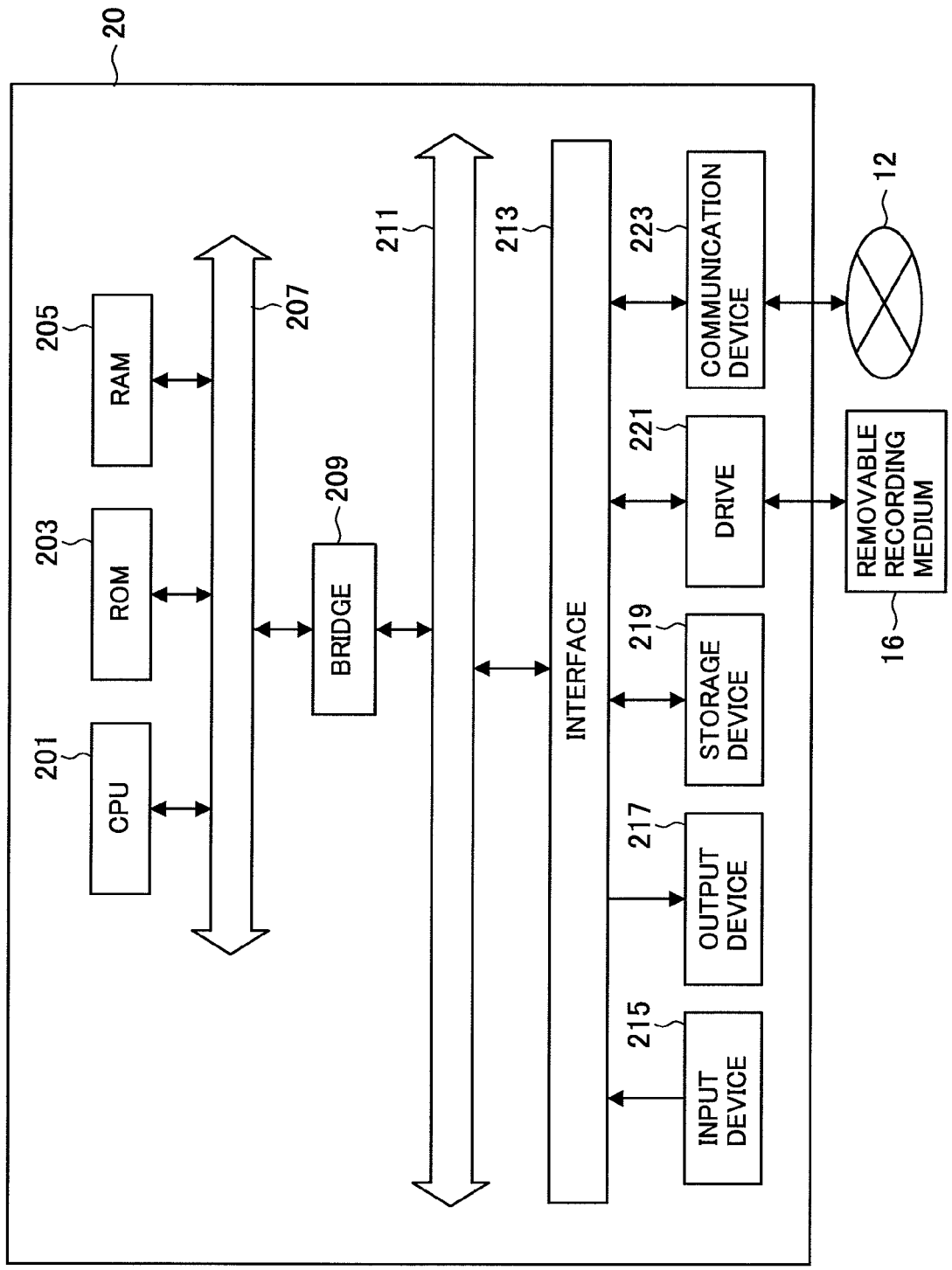
FIG. 2 is a block diagram for explaining the hardware configuration of an information processing apparatus according to the first embodiment.

FIG. 2 is a block diagram for explaining the hardware configuration of the information processing apparatus 20 according to the first embodiment. The information processing apparatus 20 includes a central processing unit (CPU) 201, a read only memory (ROM) 203, a random access memory (RAM) 205, a host bus 207, a bridge 209, an external bus 211, an interface 213, an input device 215, an output device 217, a storage device 219, a drive 221, and a communication device 233.

The CPU 201 functions as an arithmetic processing unit and a control unit. The CPU 201 controls the overall or a part of the internal operations in the information processing apparatus 20 in accordance with various programs recorded in the ROM 203, the RAM 205, the storage device 219, or a removable recording medium 16. The ROM 203 stores the programs, arithmetic parameters, and so on used by the CPU 201. The RAM 205 temporarily stores the programs used in execution of the CPU 201 and the parameters appropriately varying in the execution of the CPU 201. The CPU 201, the ROM 203, and the RAM 205 are connected to each other via the host bus 207 including inner bus, such as a CPU bus.

The host bus 207 is connected to the external bus 211, such as Peripheral Component Interconnect (PCI) bus, via the bridge 209.

The input device 215 includes an operation unit, such as a mouse, a keyboard, a touch panel, buttons, switches, and a lever, operated by a user and a voice input unit, such as a microphone and a headset. The input device 215 may be a remote control unit (a so-called remote controller) that uses an infrared ray or other electronic wave or may be an externally connected device such as a mobile phone or a PDA corresponding to the operation of the information processing apparatus 20. The input device 215 may be an input control circuit that generates an input signal based on information input by the user using the operation unit or the voice input unit and outputs the generated input signal to the CPU 201. The user of the information processing apparatus 20 can operate the input device 215 to input a variety of data to the information processing apparatus 20 or to instruct the information processing apparatus 20 to perform processing operations.

The output device 217 may be constructed, for example, by a display unit, such as a cathode ray tube (CRT) display unit, a liquid crystal display (liquid crystal display) unit, a plasma display panel (PDP) unit, an electro-luminescence (EL) display unit, or a lamp, an audio output unit including a speaker and a headphone, and a device such as a printer, a mobile phone, or a fax machine, which can notify users of acquired information in a visible or audible manner. The output device 217 outputs, for example, a variety of information searched by a search server. Specifically, the display unit displays a search result for the variety of information by the search server as a text or an image. Meanwhile, the audio output unit converts the voice data that is played back into a voice to output the voice.

The storage device 219 is a data storage device which is an example of a storage unit of the information processing apparatus 20 according to the present embodiment. The storage device 219 is constructed, for example, by a magnetic storage unit such as a hard disk drive (HDD), a semiconductor storage device, an optical storage device, a magneto-optical storage device, and the like. The storage device 219 stores the programs or a variety of data executed by the CPU 201 and a variety of data acquired from the outside.

The drive 221 is a reader-writer for a storage medium. The drive 221 is incorporated in the information processing apparatus 20 or is externally attached to the information processing apparatus 20. The drive 221 reads out information recorded in the removable storage medium 16, such as a magnetic disk, an optical disk, a magneto-optical disk, or a semiconductor memory, which is loaded in the drive 221, and outputs the readout information to the RAM 205. The drive 221 can record information in the removable storage medium 16, such as a magnetic disk, an optical disk, a magneto-optical disk, or a semiconductor memory, which is loaded in the drive 221. The removable recording medium 16 may be, for example, a DVD medium, a HD-DVD medium, a Blu-ray medium, a compact flash (CF), a memory stick, or a secure digital (SD) memory card. The removable recording medium 16 may be, for example, an electronic device or an integrated circuit (IC) card having mounted thereon a non-contact type IC chip.

The communication device 223 is a communication interface constructed by a communication device used for connecting to the communication network 12. The communication device 223 may be, for example, a communication card for wired or wireless local area network (LAN), Bluetooth or wireless USB (WUSB), a router for optical communication, a router for asymmetric digital subscriber line (ADSL), or a modem for various communication protocols. The communication device 223 transmits and receives a variety of information to and from the Internet or other communication devices while transmitting and receiving information related to a voice chat with another information processing apparatus 20. The communication network 12 connected to the communication device 223 may be constructed by a network such as the Internet, a home LAN, an infrared communication, or a satellite communication, which is connected in a wired or wireless manner.

With the configuration described above, the information processing apparatus 20 can perform a voice chat with another information processing apparatus directly connected to the information processing apparatus 20 or with another information processing apparatus connected thereto via the communication network 12 while acquiring a variety of information from the search server 14 or the like connected thereto via the communication network 12. Moreover, the information processing apparatus 20 can take out information stored in the information processing apparatus 20 using the removable recording medium 16.

Hereinabove, an example of the hardware configuration that can realize the functions of the information processing apparatus 20 according to the present embodiment has been described. The components described above may be constructed using a general-purpose element or may be constructed by a specialized hardware that is specialized to the functions of the respective components. Therefore, the hardware configuration can be appropriately modified in accordance with the level of technology at the time of practicing the present embodiment. The hardware configuration described above is merely for illustration purposes, and the invention is by no means limited to this. Some components such as the host bus 207, the external bus 211, or the interface 213 may be omitted depending on the form of use.

(Configuration of Information Processing Apparatus 20)

Next, the configuration of the information processing apparatus 20 according to the present embodiment will be described in detail. In the following descriptions, two information processing apparatuses 20 performing a voice chat will be referred to as a first information processing apparatus 20A and a second information processing apparatus 20B. The first and second information processing apparatuses 20A and 20B generate voice data from the sound of the respective users of the information processing apparatuses and transmit the voice data to the other information processing apparatus, which is a counterpart of the voice chat. FIG. 3 is a block diagram for explaining the configuration of the first information processing apparatus 20A according to the first embodiment.

In the following descriptions, the term "word" refers to a unit that is conveniently treated as a single word in a speech recognition process. It is not necessarily the same as a linguistic word. For example, "タロウ君 (uttered as tarou kun)" may be treated as one word, or may be treated as two words in the form of "tarou" and "kun." Further, a larger unit "こんにちは タロウ君 (uttered as konnichiwa taroukun)" may be treated as one word.

Additionally, the term "phoneme" refers to a unit that is conveniently treated as a single unit in an acoustic point of view. It is not necessarily the same as a phonetic syllable or phoneme. For example, in the word "東京 (uttered as tou kyou)," the part "tou" may be represented by three phoneme symbols "t/o/u," or "to:," which is a prolonged sound of "o." Further, the part "tou" may be represented by "t/o/o." In addition, a symbol representing a silence may be adopted. Furthermore, symbols that classify the silence as "a silence before an utterance", "a short silence interposed between utterances", "a silence in an utterance", and "a silence corresponding to 'っ (uttered as tsu)" may be adopted.

As shown in FIG. 3, the first information processing apparatus 20A according to the present embodiment includes a voice input unit 251, a speech recognition unit 253, a keyword detection unit 255, a keyword management unit 257, a voice conversation control unit 259, a display unit 261, a voice output unit 263, a communication unit 265, a memory unit 267, and a recognition word dictionary generating unit 269.

The voice input unit 251 is an interface that inputs, to the first information processing apparatus 20A, a dialog of the conversation during a voice chat which is the speech uttered by the user of the first information processing apparatus 20A. The voice input unit 251 is constructed, for example, by an input device such as a microphone or a headset, connected to the first information processing apparatus 20A. The speech of the users uttered to the microphone or headset is automatically input in real time to the first information processing apparatus 20A, converted to a voice signal, which is an electric signal, and transmitted to the speech recognition unit 253 via the voice input unit 251.

The speech recognition unit 253 is constructed, for example, by CPU, ROM or RAM. The speech recognition unit 253 generates voice data from the speech of the user, which is autonomously input by the voice input unit 251 and transmitted in real time, and transmits the voice data to a voice conversation control unit 259 described later, thereby performing speech recognition based on the generated voice data. The speech recognition unit 253 generates, as a result of the speech recognition, a word sequence corresponding to the generated voice data and transmits the generated word sequence to a keyword detection unit 255 described later. The speech recognition unit 253 may be configured to transmit the generated word sequence to a display unit 261 described later. The details of the speech recognition unit 253 will be described later.

The keyword detection unit 255 determines whether or not a keyword managed by the keyword management unit 257 exists in the word sequence transmitted from the speech recognition unit 253 and outputs, as a keyword, the word corresponding to the keyword if the keyword exists. If plural keywords exist in one word sequence, the keyword detection unit 255 may be configured to detect all the corresponding keywords. The keyword detection unit 255 may be configured to transmit the keyword detected from the word sequence to the display unit 261 described later.

For example, when a recognition result, "The recent structural reform is eviscerated," is transmitted from the speech recognition unit 253 and when a keyword, "structural reform" exists in the keyword managed by the keyword management unit 257, the keyword detection unit 255 outputs "structural reform" as a keyword.

The keyword management unit 257 manages the keywords to be extracted from the word sequence generated by the speech recognition unit 253. The keyword management unit 257 stores, in the storage unit 267, search history information that is a history of the user of the first information processing apparatus 20A performing search using the search server 14 or chat history information that is a history of the user using a voice chat system of the present embodiment. The managed keywords are selected based on a search keyword contained in the history information or the detected keywords. The keywords managed by the keyword management unit 257 are freely referenced by the keyword detection unit 255. The keyword management unit 257 may also provide the managed keywords to the speech recognition unit 253, and the speech recognition unit 253 may update a resonant cycle database described later based on the keywords provided by the keyword management unit 257.

The voice conversation control unit 259 is constructed, for example, by CPU, ROM, and RAM, and controls the voice chat with the second information processing apparatus 20B connected via the communication network 12. The voice conversation control unit 259 receives the voice data generated by the speech recognition unit 253 and transmits the voice data to the second information processing apparatus 20B via the communication unit 265. The voice conversation control unit 259 receives voice data transmitted from the second information processing apparatus 20B via the communication unit 265 and transmits the voice data to the voice output unit 263. The voice conversation control unit 259 may be configured to store, every time the voice chat is performed, the date the voice chat was performed, an identifier for identifying the voice chat, and an identifier for identifying a counterpart of the voice chat in the memory unit 267 as the chat history information in a correlated manner.

The voice conversation control unit 259 may be constructed by a specialized hardware that is specialized to the voice conversation control and may be provided as an application program such as a voice chat program.

The display unit 261 displays the keywords transmitted from the keyword detection unit 255 to the user of the first information processing apparatus 20A via a display device such as a display of the first information processing apparatus 20A. The display unit 261 may be configured to display the word sequence itself, which is the result of speech recognition transmitted from the speech recognition unit 253.

The voice output unit 263 is an interface that receives the voice data of the speech uttered by the user of the second information processing apparatus 20B and inputs the received voice data to the first information processing apparatus 20A. The voice output unit 263 is constructed, for example, by a speaker or an earphone which is an output device connected to the first information processing apparatus 20A.

The voice data received via the communication unit 265 from the second information processing apparatus 20B is output to the user of the first information processing apparatus 20A via the voice output unit 263.

The communication unit 265 is a communication device installed in the first information processing apparatus 20A, for example. The communication unit 265 relays communication of information via the communication network 12 between the first information processing apparatus 20A, specifically, the speech recognition unit 253, the keyword management unit 257, the voice conversation control unit 259, and the recognition word dictionary generating unit 269, and the external device of the first information processing apparatus 20A, specifically the search server 14 or the second information processing apparatus 20B. Moreover, the communication unit 265 can communicate information with other information processing apparatus that are directly connected to the first information processing apparatus 20A not via the communication network 12.

The memory unit 267 is a storage device installed in the first information processing apparatus 20A, for example, and stores therein data such as the keywords detected by the keyword detection unit 255 or the keyword information managed by the keyword management unit 257. Besides these data, the memory unit 267 can also store therein the recognition result such as the word sequence or the voice data generated by the speech recognition unit 253 or a variety of databases. The memory unit 267 may appropriately store therein a variety of parameters that need be stored when the first information processing apparatus 20A performs a process and progress information of the process. The memory unit 267 is freely accessible when the speech recognition unit 253, the keyword detection unit 255, the keyword management unit 257, the voice conversation control unit 259, the recognition word dictionary generating unit 269, or the like performs reading or writing to the memory unit 267.

The recognition word dictionary generating unit 269 acquires a search keyword list and the like from the search server 14 and selects only suitable keywords from the acquired search keyword list, thereby generating a recognition word dictionary for use in the speech recognition. The recognition word dictionary generating unit 269 may not only select the keywords from the acquired search keyword list but also add attribute information of the keywords or related sub-keywords to the selected keywords or a recognition weight for use in the speech recognition. The details of the recognition word dictionary generating unit 269 will be described later.

<Speech Recognition Unit 253>

Figure 4:
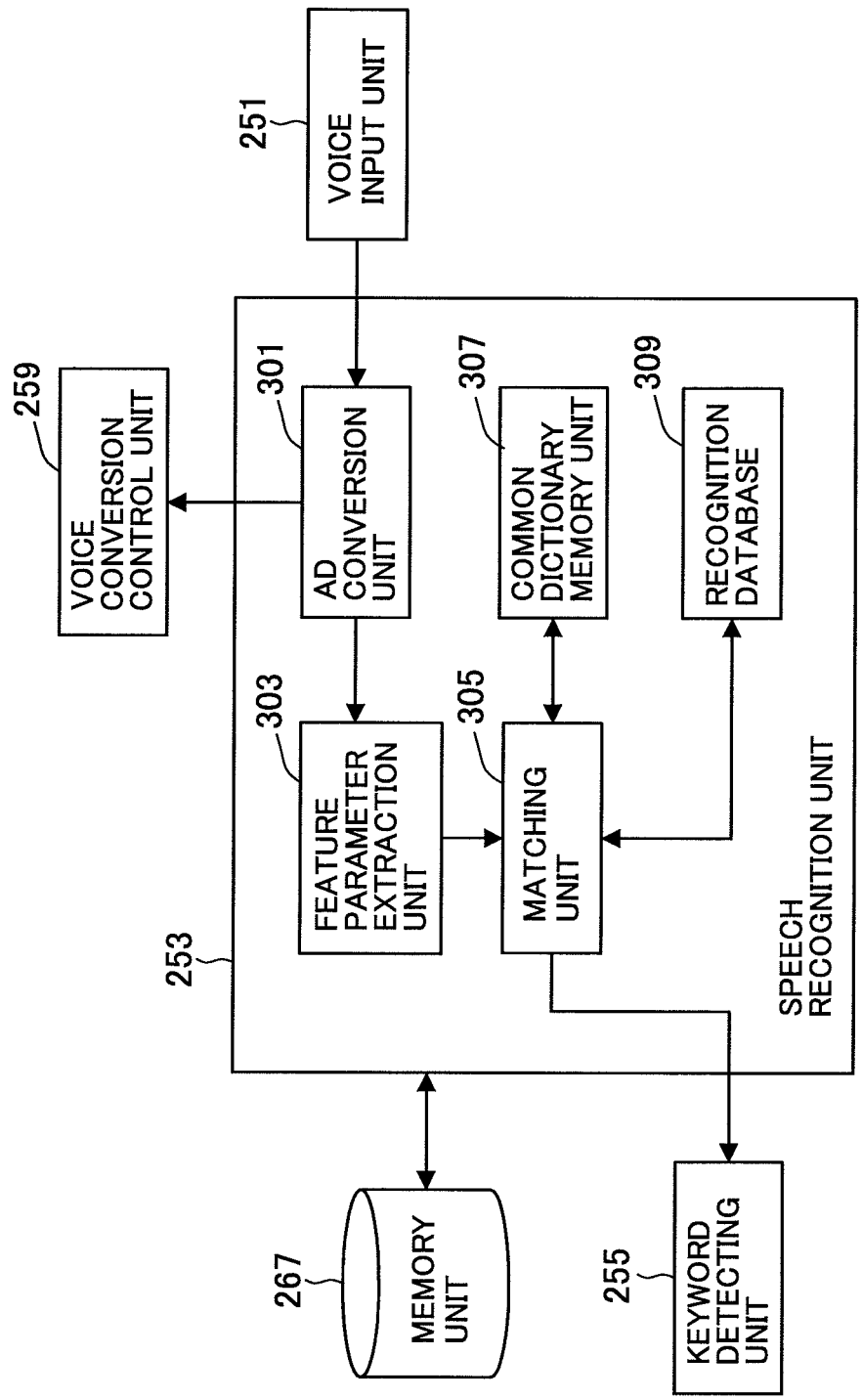
FIG. 4 is a block diagram for explaining the configuration of a speech recognition unit according to the first embodiment.

Next, the speech recognition unit 253 according to the present embodiment will be described in detail with reference to FIG. 4. FIG. 4 is a block diagram for explaining the configuration of the speech recognition unit 253 according to the first embodiment.

As shown in FIG. 4, the speech recognition unit 253 according to the present embodiment includes an AD conversion unit 301, a feature parameter extraction unit 303, a matching unit 305, a common dictionary memory unit 307, and a recognition database 309.

The AD conversion unit 301 samples and quantizes the voice signal, which is an analog signal transmitted from the voice input unit 251, and converts the analog voice signal to voice data, which is a digital signal. Upon completion of the conversion to the voice data, the AD conversion unit 301 transmits the generated voice data to the voice conversation control unit 259 and the feature parameter extraction unit 303. The AD conversion unit 301 may store the generated voice data in the memory unit 267.

The feature parameter extraction unit 303 extracts feature parameters such as Mel Frequency Cepstrum Coefficients (MFCC) and time difference parameter thereof, spectrum, power linear predictive coefficients, cepstrum coefficients, and a line spectrum pair, from each frame of the appropriate voice data generated from the AD conversion unit 301. Upon completion of extraction of the feature parameters, the feature parameter extraction unit 303 transmits the extracted feature parameters to a matching unit 305 described later. The feature parameter extraction unit 303 may store, in the memory unit 267, the variety of feature parameters extracted from the voice data.

The matching unit 305 generates, as the result of the speech recognition, the word sequence that is closest to the speech (that is, the content of the conversation during the voice chat) input to the voice input unit 251 by appropriately referencing the recognition database 309 and a common dictionary memory unit 307 based on the variety of feature parameters transmitted from the feature parameter extraction unit 303. Generation method of the word sequence will be described later. Upon completion of generation of the word sequence, the matching unit 305 transmits the generated word sequence to the keyword detection unit 255. The matching unit 305 may store the generated word sequence in the memory unit 267.

The matching unit 305 may perform matching using a Viterbi decoder based on beam search or a stack decoder base on A* search. Additionally or alternatively, a so-called keyword spotting method may be used in the matching. If "recognition weight" information described later is added the variety of word dictionaries referenced by the matching unit 305, a weight may be applied to a language score described later and the recognition result may be ranked by the weighted score.

The common dictionary memory unit 307 stores a common dictionary which is a dictionary of the words that are typically used in the speech recognition. In the common dictionary stored in the common dictionary memory unit 307, all the words registered therein are described in a correlated manner with pronunciation information and category information. For example, when a proper noun, "イチロー (personal name)" is registered in the common dictionary, the proper noun, "イチロー" is registered in a correlated manner with pronunciation information (phoneme information), "ichiro," and a category, "_personal name_." The details of the common dictionary will be described later.

The recognition database 309 is a database that stores a variety of model or rules used by the matching unit 305 for generation of the word sequence. The details of the recognition database 309 are described below.

<Recognition Database 309>

Figure 5:
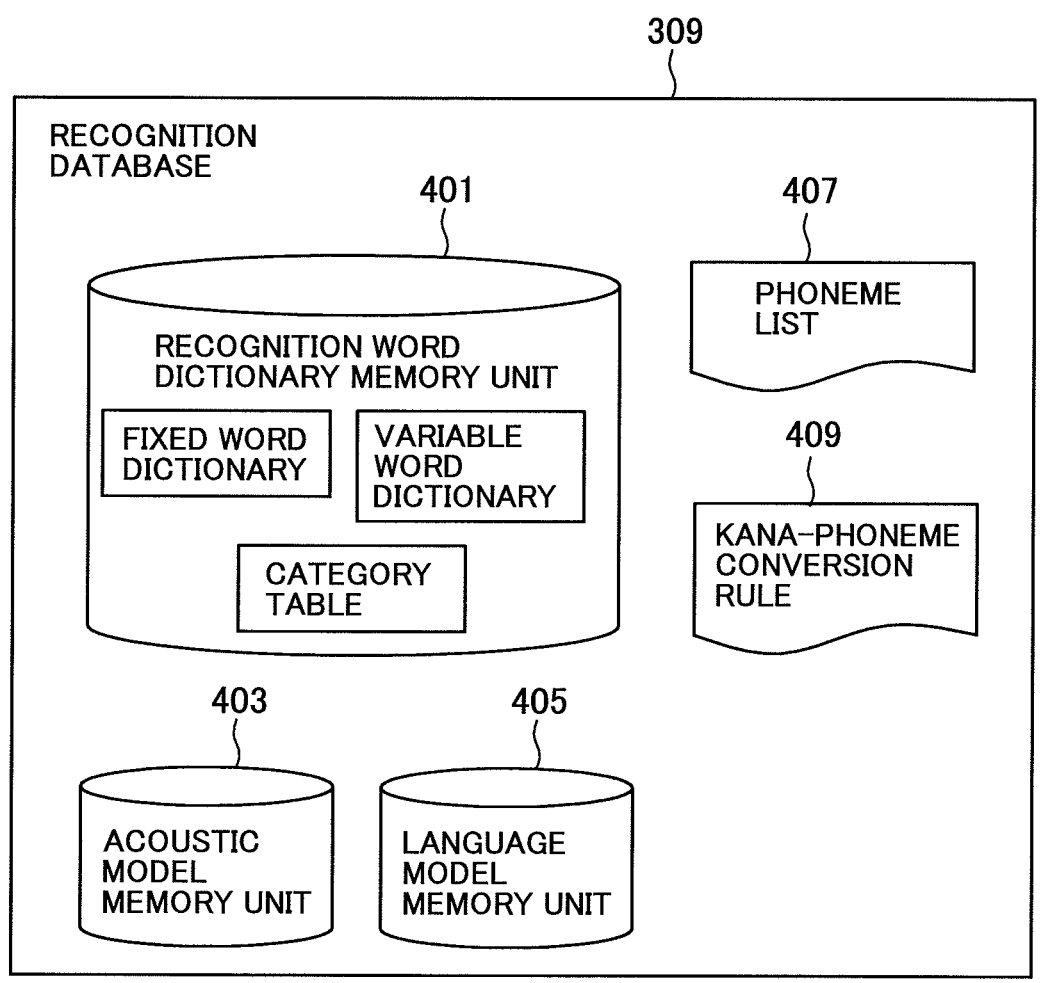
FIG. 5 is an explanatory diagram showing a recognition database according to the first embodiment.

Next, the recognition database 309 according to the present embodiment will be described in detail with reference to FIG. 5. FIG. 5 is an explanatory diagram showing the recognition database 309 according to the first embodiment.

As shown in FIG. 5, the recognition database 309 according to the present embodiment includes a recognition word dictionary memory unit 401, an acoustic model memory unit 403, a language model memory unit 405, a phoneme list 407, and Kana-phoneme conversion rule 409.

The recognition word dictionary memory unit 401 stores therein a recognition word dictionary used by the matching unit 305 when generating the word sequence. The recognition word dictionary includes a fixed word dictionary, a variable word dictionary, and a category table, for example.

In the fixed word dictionary, a variety of information such as pronunciations (phoneme sequence) of the words that are not subjected to registration and deletion, i.e., the words (hereinafter, referred to as fixed word) established in a system in advance and a model describing the concatenation relationships of the phonemes are described.

In the variable word dictionary, a variety of information such as pronunciation of the keyword words and a model describing the concatenation relationships of the phonemes are described. Processes such as registration and deletion of the keyword word and change of the pronunciation are mainly performed with respect to the words registered in the fixed word dictionary. The variable word dictionary may not store any information or data therein.

For example, in the case of detecting keywords related to a baseball, the common dictionary memory unit 307 may register therein words that are generally used in the daily conversation (for example, words described in an ordinary dictionary such as Japanese language dictionary); the fixed word dictionary in the recognition word dictionary memory unit 401 may register therein words that are generally used in the field of the baseball, such as "play," "double play," "pinch hitter," or "roaster." The variable word dictionary in the recognition word dictionary memory unit 401 may register therein proper nouns, such as "ichiro," which vary over time. Since the variable word dictionary is updated on an as needed basis, it is possible to easily perform recognition including keywords related to the latest topics on the baseball.

Next, the fixed word dictionary according to the present embodiment will be described with reference to FIGS. 6 and 7. FIGS. 6 and 7 are explanatory diagrams showing examples of the fixed word dictionary according to the first embodiment.

In FIG. 6, "Symbol" is a character string for identifying a word and can be represented, for example, by Japanese Kana notation. Entries of the same symbols are regarded as the entries of the same words. The language model of the present embodiment is represented by the symbol. "Transcription" represents the notation of words, and the character string output as a recognition result is the transcription. "Phoneme Sequence" is the pronunciation of words as expressed by the phoneme sequence. The fixed word dictionary of the present embodiment describes not only the symbols of the Kana notation as shown in FIG. 6 but also the character string having a mixture of Chinese characters and Japanese Hiragana as shown in FIG. 7.

"<start>" and "<end>" described in FIGS. 6 and 7 are special symbols that represent "a silence before an utterance" and "a silence after an utterance," respectively. Therefore, the special symbols do not have a corresponding notation in the transcription column and are represented as "[ ]" (blank).

Besides the items described in FIGS. 6 and 7, the fixed word dictionary of the present embodiment may include an "attribute" column that describes parts of speech of the words, such as noun or verb, or a genre of the words and a "recognition weight" column that describes weight information of the words used in calculation of a language score described later.

Next, the variable word dictionary according to the present embodiment will be described with reference to FIG. 8. FIG. 8 is an explanatory diagram showing an example of a variable word dictionary according to the first embodiment.

As shown in FIG. 8, the variable word dictionary of the present embodiment includes a "Symbol" column and a "Kana pronunciation." In the example shown in FIG. 8, two categories, "_personal name_" and "_place name_" are described as "symbol." In the "_personal name_" category, the pronunciations of two words, "イチロー (uttered as ichiro)" and "サニータロウ (uttered as sanitarou)," are described in the Kana pronunciation. In the "_place name_" category, a pronunciation of a word, "キタシナガワ (uttered as kitashinagawa)," is described in the Kana pronunciation. The variable word dictionary of the present embodiment may describe specific words as well as the categories as shown in FIG. 8. When the specific words other than the categories as shown in the drawing are described in the variable word dictionary, individual words are described in the "symbol" column and the "transcription" or "phoneme sequence" corresponding to the words will be provided in the variable word dictionary.

Similar to the case of the fixed word dictionary, the fixed word dictionary of the present embodiment may include an "attribute" column that describes parts of speech of the words, such as noun or verb, or a genre of the words and a "recognition weight" column that describes weight information of the words used in calculation of a language score described later. Since the words described in the variable word dictionary are mainly the words that vary over time, the value described in the "recognition weight" column is preferably set higher than the "recognition weight" described in the fixed word dictionary. In this way, a higher "recognition weight" is set to the words described in the variable word dictionary. Therefore, in a voice chat in which users usually converse about the ongoing topics, it is possible to select specific keywords or the words related to the specific keywords on a preferential basis. Accordingly, the speech recognition can be performed with high recognition rate.

The details of the generation and update process of the variable word dictionary according to the present embodiment will be described later.

In the category table, the categories contained in the language model contained in the language model memory unit 405 and information about the words contained in the categories are described in a correlated manner. The category table may be described in a list form or a table form. The category table may not store any information or data therein if the language model does not include any categories.

The categories may be classified into classes based on a semantic attribute (for example, "_personal name_," "_user name_," "_place name_," "_shop name_," and the like) or classes based on the parts of speech (for example, "_noun_," "_verb_," "_particle_," and the like). Hereinafter, a notation, "_ . . . _" refers to a category name.

FIG. 9 shows an example of the category table. In the category table, the kind of categories used in the language model described later and information about the words belonging to the category are described. For example, when two categories, "_personal name_" and "_place name_" are used in the language model, the two categories, "_personal name_" and "_place name_" are entered in the category table as shown in FIG. 9. When a new category is added to the category table, the word belonging to the newly added category may be represented as a blank, and the belonging words may be added thereto with the progress of learning or adaptation of the language model. In FIG. 9, the words belonging to the categories, "_personal name_" and "_place name_" are represented as "[ ]"; this notation represents that there are no belonging words.

FIG. 10 shows another example of the category table of the recognition word dictionary memory unit 401, in which information about words are entered. In FIG. 10, the entry on the first row represents that words, "イチロー (uttered as ichiro)"

and "サニータロウ (uttered as sanitarou)," belong to the category of "_personal name_."

The acoustic model memory unit 403 stores therein an acoustic model that represents an acoustic feature of individual phonemes of the speech to be recognized. Here, the acoustic model is a model that represents the acoustic feature of a speech for each pronunciation symbol such as vowel or consonant. The acoustic model is used when collating the voice data of an input speech with a recognition candidate word while paying attention to the similarity as the sound. As the acoustic model, a Hidden Markov Model (HMM), for example, can be used; however, the acoustic model according to the present embodiment is not limited to the HMM.

As the acoustic model stored in the acoustic model memory unit 403, two models, one for quiet environment (an acoustic model capable of providing high recognition rate under quiet environment) and the other for noisy environment (an acoustic model capable of providing favorable recognition rate under noisy environment) may be provided so that either one of the models can be referenced depending on the environment.

The language model memory unit 405 stores therein a language model that describes information (hereinafter, referred to as concatenation information) representing how the words registered in each dictionary of the common dictionary memory unit 307 and the recognition word dictionary memory unit 401 are concatenated (connected). As a description method, statistical word concatenation probability (n-gram or class n-gram), generation grammar, finite state automaton (FSA) or the like may be used.

The language model contained in the language model memory unit 405 contains concatenation information of a category of the words classified from a specific point of view as well as the concatenation information of the words. For example, when "a category to which the words representing personal names belong" is represented as a symbol "_personal name" and "a category to which the words representing food belongs" is represented as a symbol "_food_," the language model also describes the concatenation information of "_personal name" and "_food_"; that is, concatenation between categories and concatenation between the category and the words stored in advance in the dictionary are also described.

Therefore, concatenation information of the words that are not contained in the language model can be acquired. For example, when acquiring concatenation information between "イチロー (uttered as ichiro)" and "は (a particle, uttered as wa)," even though the concatenation information of "イチロー (uttered as ichiro)" is not described in the language model, if it is possible to know that the "イチ (uttered as ichiro)" belongs to a category represented as a symbol "_personal name_," it is possible to acquire the concatenation information between "イチロー (uttered as ichiro)" and "は (a particle, uttered as wa)" by acquiring the concatenation information between "_personal name_" and "は (a particle, uttered as wa)."

<Language Model>

Next, a specific example of the language model according to the present embodiment will be described with reference to FIG. 11. FIG. 11 is an explanatory diagram showing an example of the language model according to the first embodiment.

In FIG. 11, a statistical language model is used as the language model. The statistical language model is a model that describes the concatenation information of words using a conditional probability. In the language model shown in FIG. 11, a tri-gram that represents a probability of a succession of three words 1, 2, and 3, that is, the probability of three concatenations of words is used as the statistic language model.

In FIG. 11, "P(word 3|word 1 word 2)" represents a probability of occurrence of "word 3" subsequent to a succession of "word 1" and "word 2" among a word sequence. In the example shown in the drawing, the probability of occurrence of "は (uttered as wa)" subsequent to a succession of "<start>" and "_personal name_" is "0.012." Such a probability may be obtained by analyzing texts that describe a large quantity of chat dialogs. As the language model, besides the tri-gram, bi-gram (two concatenation probability) or uni-gram (probability of occurrence of a word) may be used according to the necessity.

In the language model of FIG. 11, grammar is described using the categories as well as the words. That is, in FIG. 11, the "_personal name_" and the "_place name_" refers to the categories, "_personal name_" and "_place name_"; therefore, by describing the tri-gram using such categories, the words representing a personal name or a place name can be recognized by the speech recognition unit 253 if the words are registered in the variable word dictionary.

The phoneme list 407 is a list of phoneme symbols used in the recognition database 309. The phoneme list 407 represents one phoneme (or a corresponding one) as one symbol, as shown in FIG. 12. For example, in the phoneme list of FIG. 12, vowel+colon (for example, "a:") represents a prolonged sound, and "N" represents "ん (Japanese hirakana, uttered as ng). In addition, "sp," "silB," "silE," and "q" all represent a silence, which respectively represent "a silence in an utterance", "a silence before an utterance", "a silence after an utterance", and "a silence corresponding to 'つ (uttered as tsu)."

The Kana-phoneme conversion rule 409 is a rule for converting a Kana character string to a phoneme sequence. In this way, by storing the Kana-phoneme conversation rule 409, the common dictionary memory unit 307 or the recognition word dictionary memory unit 401 can store and maintain therein, as pronunciation information, the Kana character string that is independent from the phoneme sequence. The Kana-phoneme conversion rule 409 describes the conversion rule from the Kana notation to the phonemes such as the symbols of phonemes correlated to the notation or all the possible Kana notations. According to the Kana-phoneme conversation rule 409 shown in FIG. 13, for example, a Kana character string, "イチロー." is converted to a phoneme sequence, "i/ch/i/r/o:."

Hereinabove, an example of the function of the first information processing apparatus 20A according to the present invention has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

The configuration of the second information processing apparatus 20B is substantially the same as the first information processing apparatus 20A, and descriptions thereof will be omitted.

(Speech Recognition Process of Speech Recognition Unit 253)

Figure 14:
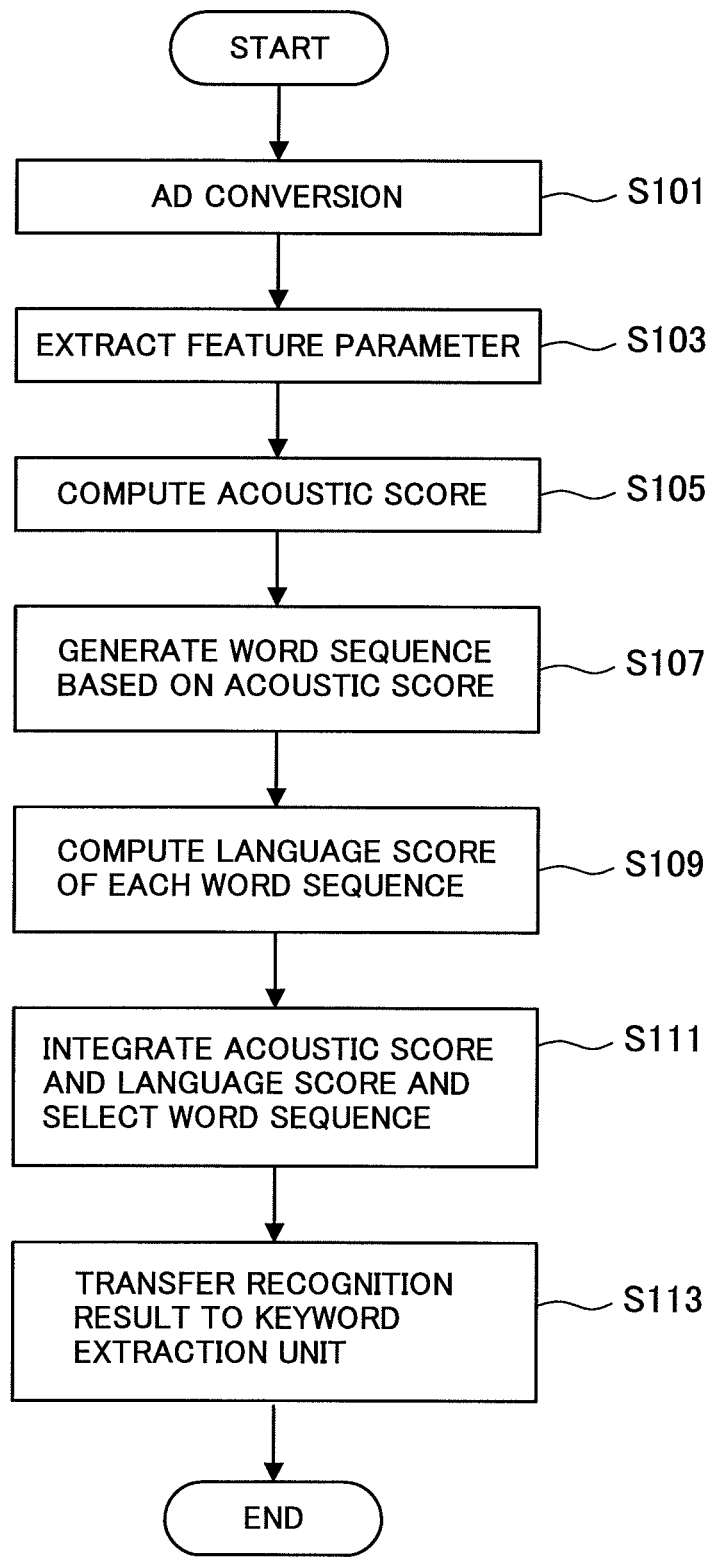
FIG. 14 is a flowchart for explaining an example of a speech recognition process according to the first embodiment.

Next, the speech recognition process of the speech recognition unit 253 according to the present embodiment will be described with reference to FIG. 14. FIG. 14 is a flowchart for explaining an example of the speech recognition process according to the first embodiment.

The speech recognition process described later is started when a speech is input to the voice input unit 251 such as a microphone from the user of the first information processing apparatus 20A.

The voice signal generated by the voice input unit 251 is first converted by the AD conversion unit 301 to the voice data, which is a digital signal, and transmitted to the feature parameter extraction unit 303 (Step S101). At this time, the AD conversion unit 301 may store the generated voice data in the memory unit 267. Next, the feature parameter extraction unit 303 having transmitted thereto the voice data extracts a feature amount such as Mel cepstrum from the transmitted voice data (Step S103). In extraction of the feature parameter, a variety of analysis methods, for example, cepstrum analysis, linear predictive analysis, analysis based on acoustic filter using MFCC coefficient may be used. The feature parameter extraction unit 303 may store in the memory unit 267 the variety of feature parameters extracted from the voice data.

Once the feature amount is extracted by the feature parameter extraction unit 303, the matching unit 305 references the common dictionary stored in the common dictionary memory unit 307 or the fixed word dictionary and the variable word dictionary stored in the recognition word dictionary memory unit 401 in the recognition database 309 and thereby generates a word sequence by connecting some of the words represented as symbols in the dictionaries (Step S105). Subsequently, the matching unit 305 calculates an acoustic score of the generated word sequence based on the acoustic model stored in the acoustic model memory unit 403 of the recognition database 309 (Step S105). Here, the acoustic store is a score that represents how closely the word sequence, which is a candidate of the speech recognition result, resembles the input voice in terms of sound (from the acoustic point of view). A higher acoustic score means that the generated word sequence is acoustically close to the input voice.

Once the acoustic score is calculated based on the feature parameters, the matching unit 305 selects a predetermined number of word sequences having higher acoustic score based on the calculated acoustic scores (Step S107). Incidentally, the matching unit 305 may store in the memory unit 267 the calculated acoustic scores or the selected word sequences.

Upon completion of the acoustic score calculation, the matching unit 305 calculates a language score of each word sequence selected in Step S107 based on the language model contained in the language model memory unit 405 of the recognition database 309 (Step S109). For example, if grammar or finite state automaton is used among a variety of language models stored in the language model memory unit 405, when the word sequence is acceptable to the language model, the language score of the word sequence is "1"; when the word sequence is not acceptable to the language model, the language score of the word sequence is "0."

When the generated word sequence is acceptable to the language model, the matching unit 305 may leave the word sequence selected in Step S107. Alternatively, when the generated word sequence is acceptable as a language but not acceptable to the language model, the matching unit 305 may delete the word sequence selected in Step S107.

When the statistical language model such as n-gram or class n-gram is used as the language model, the generation probability of the word sequence is used as the language score. The detailed method of calculating the language score is described in Japanese Patent Application No. 2001-382579 filed by the present applicant (corresponding to JP-A NO. 2003-186494). Incidentally, the matching unit 305 may store the calculated language score in the memory unit 267.

The language model according to the present embodiment calculates the language score using the common dictionary stored in the common dictionary memory unit 307 or the fixed word dictionary and the variable word dictionary stored in the recognition word dictionary memory unit 401 in the recognition database 309. Since the proper nouns varying over time are described in the variable word dictionary in an updated manner on an as needed basis, the words frequently used as a topic during a voice chat can be subjected to the language score calculation.

Upon completion of calculation of the acoustic score and the language score, the matching unit 305 integrates the acoustic score calculated in Step S105 and the language score calculated in Step S109 and sorts the word sequences, thereby determining the word sequence having the greatest integrate score as a recognition result (Step S111). Specifically, the matching unit 305 determines as the recognition result, the word sequence that maximizes the product or the logarithmic sum of the acoustic score acquired from the acoustic model and the language score acquired from the language model. When information such as a recognition weight of words is added to the dictionaries used in the language model, a language score having the recognition weight information incorporated therein may be used.

With this, a word sequence that is most feasible from the acoustic and linguistic points of view is determined as the recognition result. Once the most feasible word sequence is determined as the recognition result, the matching unit 305 transmits the determined recognition result to the keyword detection unit 255 (Step S113). Incidentally, the matching unit 305 may store in the memory unit 267, the word sequence, which is the determined recognition result.

In this way, in the speech recognition process according to the present embodiment, upon calculation of the language score, by referencing the variable word dictionary that describes vocabularies related to the latest topics (specific topics) that users are likely to converse on during a voice chat, it is possible recognize the vocabularies related to the latest topics on a preferential basis. Therefore, it is possible to improve the recognition rate of the latest keywords that is difficult to be recognized in a general speech recognition process or the vocabularies related to the keywords. The information displayed as the recognition result is highly likely to be information on the latest topics, that is, the information that users are interested. Therefore, even if the displayed information is somehow different from the conversation of the users in the voice chat (that is, even when there is an error in the speech recognition result), the users of the voice chat may be able to broaden the conversation. With this, the errors in the speech recognition process may be somehow permitted by the users performing the voice chat.

<Calculation Method of Language Score>

Next, a calculation method of the language score according to the present embodiment will be described with reference to FIG. 15. FIG. 15 is an explanatory diagram showing an example of a computation formula for the language score according to the first embodiment. FIG. 15 shows the computation formula of the language score when the matching unit 305 selects, a word sequence, "<Start> イ (uttered as ichiro) は (uttered as wa) 何時 (uttered as nanji) に (uttered as ni) 起きた (uttered as okita) の (uttered as no)<End>," in Step S109 of FIG. 14.

A language score, "Score(<Start> イチロー (uttered as ichiro) は (uttered as wa) 何時 (uttered as nanji) に (uttered as ni) 起きた (uttered as okita) の (uttered as no)<End>," is a generation probability of a word sequence, "<Start> イチロー (uttered as ichiro) は (uttered as wa) 何時 (uttered as nanji) に (uttered as ni) 起きた (uttered as okita) の (uttered as no)<End>," as shown in Formula (1).

The exact value of the language score, "Score(<Start> ichiro wa nanji ni okita no <End>," is computed by "P(<start>) P(ichiro|<start>) P(wa|<start> ichiro) P(nanji|<start> ichiro) P(ni|<start> ichiro wa nanji) P(okita|<start> ichiro wa nanji ni) P(no|<start> ichiro wa nanji ni okita) P(<end>|<start> ichiro wa nanji ni okita no), as shown in Formula (2). As shown in FIG. 16, since the language model 112 uses the tri-gram, the conditional terms, "<start> ichiro wa," "<start> ichiro wa nanji," "<start> ichiro wa nanji ni," "<start> ichiro wa nanji ni okita," and "<start> ichiro wa nanji ni okita no," are approximated by conditional probabilities in which the word sequences are limited to the immediately preceding two words, i.e., "ichiro wa," "wa nanji," "nanji ni," "ni okita," and "okita no," respectively (Formula (3)).

The conditional probabilities are obtained by referencing the language model as shown in FIG. 11. However, since the language model does not contain a symbol "ichiro," the matching unit 305 recognizes that the word represented by a symbol "ichiro" belongs to the category of "_personal name_" by referencing the category table stored in the recognition word dictionary memory unit 401 in the recognition database 309, thereby converting "ichiro" to "_personal name_."

Specifically, as shown in Formula (4), "P(ichiro|<start>)" is converted to "P(_personal name|<start>) P(ichiro|_personal name_)" and then approximated to "P(_personal name_|<start>)/N." Here, N is the number of words belonging to the category of "_personal name_" in the category table.

Specifically, when a probability is described in the form of P(X|Y), if a word X belongs to a category C, the value of P(C|Y) is first obtained from a language model and the obtained value is multiplied by the value of P(X|C), which is a generation probability of a word X from a category C. Assuming the generation probabilities of the words belonging to the category C be the same, if the number of words belonging to the category C is N, the value of P(X|C) can be approximated to 1/N.

For example, there is only one word represented by the symbol "ichiro" in the category of "_personal name_," the value of N is "1." Therefore, as shown in Formula (5), "P(wa|<start> ichiro)" is equal to "P(wa|<start>_personal name_)." In addition, "P(nanji|ichiro wa)" is equal to "P(nanji|_personal name_wa), as shown in Formula (6).

By using the calculation method of the language score, it is possible to compute the language score of a word sequence containing a variable word. As a result, variable words can be output as the recognition result.

In the example describe above, the common dictionary of the common dictionary memory unit 307 does not contain any information or data therein at the startup of the system. However, several words may be stored in advance in the common dictionary.

FIG. 16 shows an example of the common dictionary in which a keyword "ichiro" is entered in the category of "_personal name_" at the startup of the system. In the example of FIG. 16, since the Kana pronunciation "イチロー" is entered in the category of "_personal name_" at the startup of the system, the keyword can be detected without needing to register the keyword.

In the example described above, the words stored in the fixed word dictionary are described in the language model, and the words stored in the variable word dictionary belong to at least one category. Some of the words belonging to the category may be stored in the fixed word dictionary.

FIG. 17 shows an example of the fixed word dictionary, and FIG. 18 shows an example of the category table at the startup. Specifically, in the category table of FIG. 16, a category "_personal name_" and a symbol, "イチロー," of a word belonging to the category "_personal name_" are registered in advance. In the fixed word dictionary 131 of FIG. 17, a symbol "イチロー," a transcription "イチロー" of a word represented by the symbol "イチロー," and a phoneme sequence "i/ch/i/r/o:" are registered in advance.

In the above case, the speech recognition process is performed such that a word "ichiro" belongs to the category of "_personal name_." That is, the word "ichiro" is treated as a personal name from the beginning. However, since the word "ichiro" is stored in the fixed word dictionary, it is difficult to be deleted or modified.

In this way, by storing possible words in the fixed word dictionary in advance, it is possible to recognize keywords without needing to register them in the dictionary.

(Recognition Word Dictionary Generating Unit 269)

Figure 19:
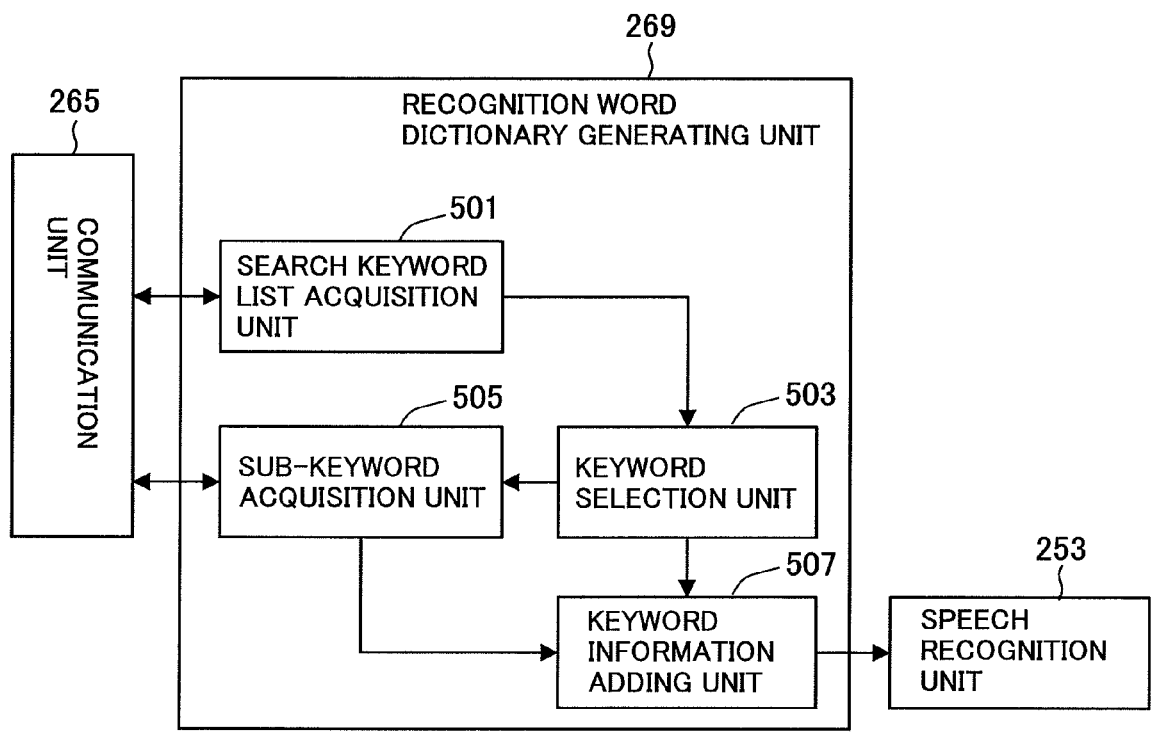
FIG. 19 is a block diagram for explaining a recognition word dictionary generating unit according to the first embodiment.

Next, the recognition word dictionary generating unit 269 according to the present embodiment will be described in detail with reference to FIG. 19. FIG. 19 is a block diagram for explaining the recognition word dictionary generating unit according to the first embodiment.

The recognition word dictionary generating unit 269 according to the present embodiment includes, as shown in FIG. 19, a search keyword list acquisition unit 501, a keyword selection unit 503, a sub-keyword acquisition unit 505, and a keyword information adding unit 507.

The search keyword list acquisition unit 501 acquires from the search server 14 connected thereto via the communication network 12, a higher-rank search keyword list that contains higher-rank search keywords searched by the search server. The acquired higher-rank search keywords may be the overall higher-rank search keywords of the search server 14 or may be the higher-rank search keywords in a specific field. The number of higher-rank search keywords acquired is arbitrary.

When the higher-rank search keyword list is acquired from a specific field, the search keyword list acquisition unit 501 may determine the preference of the user of the first information processing apparatus 20A by referencing the history information of the voice chat stored in the memory unit 267 or the history information of the recognized keywords, thereby acquiring only the higher-rank search keywords that conform to the user's preference. For example, the search keyword list acquisition unit 501 may transform the history information of the voice chat and the history information of the recognized keywords into a form of a topic vector having a predetermined dimension using probabilistic latent semantic analysis (PLSA) or the like. Similarly, the higher-rank search keywords of the search server may be transformed into a form of a topic vector using PLSA or the like. The topic vector based on the history information may be compared with the topic vector based on the higher-rank search keywords, thereby acquiring the higher-rank search keywords having a vector similar to the topic vector generated based on the history information.

The search keyword list acquisition unit 501 transmits the search keyword list acquired from the search server 14 to the keyword selection unit 503. The search keyword list acquisition unit 501 may store the acquired search keyword list in the memory unit 267.

The keyword selection unit 503 selects keywords from the search keyword list that the search keyword list acquisition unit 501 has acquired from the search server 14 based on the preference of the user of the first information processing apparatus 20A. The selection of the keywords may be performed as follows. The history information of the keywords detected by the keyword detection unit 255 is transformed into a form of a topic vector having a predetermined dimension using PLSA or the like. Similarly, the acquired keyword list may be transformed into a form of a topic vector using PLSA or the like. The topic vector based on the history information may be compared with the topic vector based on the acquired keyword list, thereby selecting the search keywords having a vector similar to the topic vector generated based on the history information.

When it is possible to acquire the history information of the voice chat or the history information of the recognized keywords from the second information processing apparatus 20B, which is a counterpart of the voice chat, the selection of the keywords may be performed while performing a matching process on the history information acquired from the second information processing apparatus 20B and the history information stored in the first information processing apparatus 20A. In this case, the matching between the two history information may take the union, integration, or XOR of the two history information. Alternatively, the matching may be unified to the preference of the user of the first or second information processing apparatus 20A or 20B. When recognition weight information described later is added to the acquired keywords, the maximum, minimum or average value of the recognition weights may be used as new recognition weight information.

The keyword selection unit 503 may delete words that are not suitable for registration in the variable word dictionary from the search keyword list that the search keyword list acquisition unit 501 has acquired from the search server 14. Here, the words that are not suitable for registration in the variable word dictionary may include: (i) general words; (ii) words that are not appropriate from a common sense of view; and (iii) words that are difficult for speech recognition to recognize such as words having only one or two phoneme.

Upon selection of keywords from the search keyword list acquired from the search server 14, the keyword selection unit 503 transmits the selected keywords to the sub-keyword acquisition unit 505 and the keyword information adding unit 507 and stores the selected keywords in the variable word dictionary stored in the recognition word dictionary memory unit 401. The keyword selection unit 503 may store the selected keywords in the memory unit 267.

The sub-keyword acquisition unit 505 searches for the keywords selected by the keyword selection unit 503 using the search server 14 to acquire sub-keywords related to the keywords selected by the keyword selection unit 503. When a keyword is searched by the search server 14, a plurality of documents are obtained as a search result. The sub-keyword acquisition unit 505 acquires sub-keywords from the obtained plural documents using a weighting method such as term frequency-inverted document frequency (TFIDF). A method of acquiring sub-words from the search result by the search server 14 is not limited to the method described above but all the known methods may be used. For example, if a word, "サッカー日本代表 (Japanese soccer team member)," is transmitted as a keyword from the keyword selection unit 503, the sub-keyword acquisition unit 505 performs search using the search server 14 with the keyword "Japanese soccer team member" to acquire a keyword such as "オシム (Osim)" or "中田 (Nakata)" from the documents obtained by the search.

Upon completion of the acquisition of the sub-keywords from the search server 14, the sub-keyword acquisition unit 505 stores the acquired sub-keyword in a correlated manner with the keyword used in the search in the variable word dictionary stored in the recognition word dictionary memory unit 401. The sub-keyword acquisition unit 505 transmits the acquired sub-keyword to the keyword information adding unit 507 described later. Incidentally, the sub-keyword acquisition unit 505 may store the acquired sub-keyword in the memory unit 267.

The keyword information adding unit 507 adds keyword information including the recognition weight information used in calculation of the language score and the part of speech or the genre of the keywords to the keywords selected by the keyword selection unit 503 and store the selected keywords and the keyword information in the variable word dictionary in a correlated manner.

The keyword information may be added to the sub-keyword correlated with the keywords.

The recognition weight information is information that describes a recognition weight, which is a correction factor (weight factor) used in calculation of the language score; as the recognition weight has a greater value, the correction value of the language score increases, and thus keywords having a greater recognition weight are highly likely to be adopted as the recognition result. For example, a keyword having a recognition weight of 10 will be speech-recognized with a probability ten times higher than a keyword (i.e., an unweighted keyword) having a recognition weight of 1.

Regarding the determining of the recognition weight, rank information in the search keyword list acquired from the search server 14 or frequency of occurrence of keywords in the output of the speech recognition result may be used. Since the search keyword list is a list of search keywords placed on the higher rank in the search server 14, ranks may be assigned to the keywords in the descending order of their frequencies of occurrence in the search; a predetermined recognition weight is determined in order of the rank. Specifically, predetermined coefficients are assigned to the keywords in the descending order of their frequencies of occurrence in the search, and a normalized keyword frequency is multiplied with the assigned coefficients, thereby obtaining the recognition weight.

Regarding the determining of the recognition weight, information on whether or not the user of the first information processing apparatus 20A has performed the search of the keywords obtained as the speech recognition result using the search server 14 or not, or the preference of the user of the first information processing apparatus 20A may be used.

The attribute information, which is information on the parts of speech or the genre of the keywords, can be added by using the description content in the bulletin board or websites provided on the Internet or using a morphological analysis tool. Alternatively, an encyclopedia, the wikipedia, or Japanese language dictionary available on the Internet may be appropriately used.

Regarding the acquisition of the search keyword list and the sub-keyword, and the adding of the keyword information, a thesaurus, an ontology database, an encyclopedia, a Japanese language dictionary, or a morphological analysis tool, which is stored in a server connected thereto via the communication network 12, may be used instead of the search server 14. The search server 14 may be used in addition to the thesaurus, the ontology database, the encyclopedia, the Japanese language dictionary, and the morphological analysis tool.

<Recognition Word Dictionary Generation/Update Process>

Figure 20:
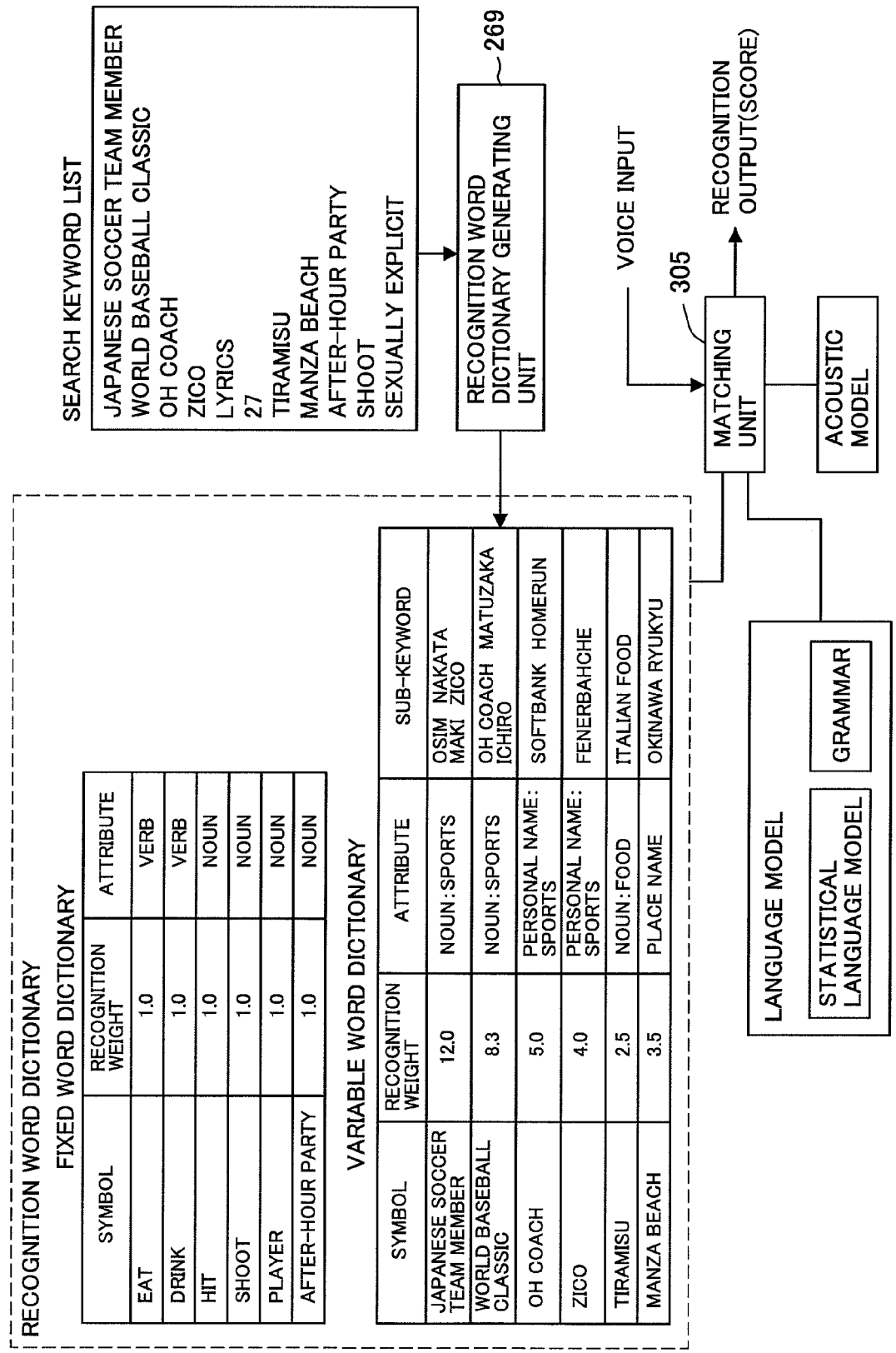
FIG. 20 is an explanatory diagram showing a recognition word dictionary generation/update process according to the first embodiment.

Next, the operation of the recognition word dictionary generating unit according to the present embodiment will be described in detail with reference to FIG. 20. FIG. 20 is an explanatory diagram showing a recognition word dictionary generation/update process according to the first embodiment.

First, the search keyword list acquisition unit 501 of the recognition word dictionary generating unit 269 acquires, from the search server 14, a search keyword list describing the higher-rank search keywords based on the user's preference. As shown in FIG. 20, in the search keyword list, "サッカー日本代表 (Japanese soccer team member), " "ワールドベース ボールクラシック (World Baseball Classic)," "王 監督 (Oh coach), '"ジーコ (Zico), " "歌詞 (Lylics)," "27," "ティラミス (Tiramisu), " "万座ビーチ (Manza Beach), '"飲み会 (after-hour party)," "シ ュート (shot)," and "卑猥 (sexually explicit)" are described. The search keyword list acquisition unit 501 stores the acquired keywords in the memory unit 267 and transmits them to the keyword selection unit 503 of the recognition word dictionary generating unit 269.

The keyword selection unit 503 deletes words that are not suitable for registration by referencing the transmitted search keyword list. In the example described above, general words such as "飲み会 (after-hour party), " "シュート (shot), "," "歌詞 (Lylics)," and "27" and words that are not appropriate from a common sense of view, such as " 卑猥 (sexually explicit)" are deleted from the search keyword list. The keyword selection unit 503 additionally describes the search keyword list, from which such words are deleted, in the variable word dictionary. Regarding the additional describing in the variable word dictionary, the keyword selection unit 503 may also add descriptions on items such as a phoneme sequence or a transcription as well as the items shown in FIG. 20.

Subsequently, the sub-keyword acquisition unit 505 acquires such keywords additionally described in the variable word dictionary and acquires sub-keywords related to the acquired keywords by using the search server 14 or the like. For example, as shown in FIG. 20, as a result of searching the search server 14 based on a keyword, "サッカー日本代表 (Japanese soccer team member), "sub-keywords, "カシム (Osim), " "中田 (Nakata)," "巻 (Maki)," and "ジーコ (Zico)," are acquired. These sub-keywords are additionally described in the variable word dictionary in a correlated manner with the keyword, "サッカー日本代表 (Japanese soccer team member)." Similarly, the sub-keywords for other keywords may be acquired and additionally described in the variable word dictionary in a correlated manner with them.

Next, the keyword information adding unit 507 assigns predetermined coefficients to the search keywords, from which unnecessary words were deleted, in the descending order of their search ranks in the search server 14. For example, the keyword information adding unit 507 assigns coefficients 10, 9, 8, and so on to the keywords in the descending order of their ranks in the search keyword list and multiplies the assigned coefficients by a value obtained by dividing the frequency of each keyword by a normal expectation value, thereby calculating the recognition weight. The thus-obtained recognition weight may be multiplied by a sigmoid function, for example. The keyword information adding unit 507 adds the recognition weight information calculated in the above-described manner to the respective keywords and additionally describes them in the variable word dictionary.

The calculation method of the recognition weight information is merely for illustration purposes. The calculation method of the recognition weight information according to the present embodiment is not limited to the method described above, and other method other than the above-described method may be used in calculation of the recognition weight information.

As shown in FIG. 20, in the fixed word dictionary, words generally used in the daily conversation, such as "食べる (eat), " "飲む (drink), " "ヒット (hit), " "シュート (shot), " "選手 (player)," and "飲み会 (after-hour party)," are registered in advance. The words registered in advance in the fixed word dictionary are general words as described above and are not highly likely to be speech-recognized on a preferential basis; therefore, as the recognition weight information, "1" is registered for the words.

The keyword information adding unit 507 acquires attribute information, such as the part of speech or the genre of the respective words, from information obtained using a morphological analysis tool or available from the bulletin board on the search server 14, thereby additionally describing them in the variable word dictionary. For example, "noun: sports" is added as the attribute information to the keyword, "サッカー日本代表 (Japanese soccer team member)," shown in FIG. 20.

By performing the above-described processes, the recognition word dictionary generating unit 269 can perform the generation and update process of the variable word dictionary on an as needed basis. When the first information processing apparatus 20A of the present embodiment is started for the first time, there may be a case in which no information or data is described in the variable word dictionary. For this reason, the recognition word dictionary generating unit 269 performs the generation of the variable word dictionary in accordance with the above-described method. The update of the variable word dictionary can be performed in an arbitrary manner. For example, the update of the variable word dictionary may be performed every predetermined periods on a periodic basis, or may be performed in accordance with an update command from the user of the first information processing apparatus 20A.

Regarding the update of the variable word dictionary, when some words recorded as the sub-keywords are speech-recognized with high frequency, the sub-keywords that are speech-recognized with high frequency may be newly stored in the variable word dictionary as a keyword.

When executing the speech recognition process, the matching unit 305 performs the calculation of the language model using the content described in a variety of word dictionaries based on a statistical language model or a grammar model, stored in the language model memory unit 405 of the recognition database 309. When calculating the language score of the words stored in the variable word dictionary, the matching unit 305 calculates the language score based on the language model using a common method and multiplies the calculated language score by the recognition weight added to the keyword, thereby obtaining a language score for actual use in the speech recognition. Since recognition weights 1 or larger are added to the words stored in the variable word dictionary as shown in FIG. 20, the language scores calculated for the words are relatively greater than those of the words stored in the common dictionary or the fixed word dictionary. For this reason, among the words stored in the variable word dictionary, specific words that often appear in the latest topics are recognized with high probability.

In the method described above, the language score calculated using a common method is multiplied by a recognition weight; therefore, the language score obtained as a calculation result may be 1 or larger in some case. However, in the speech recognition process, the relative ranks of the respective keywords in terms of the language scores are more important than the absolute values of the language scores; therefore, the language score may have a value of 1 or larger.

Figure 21A:
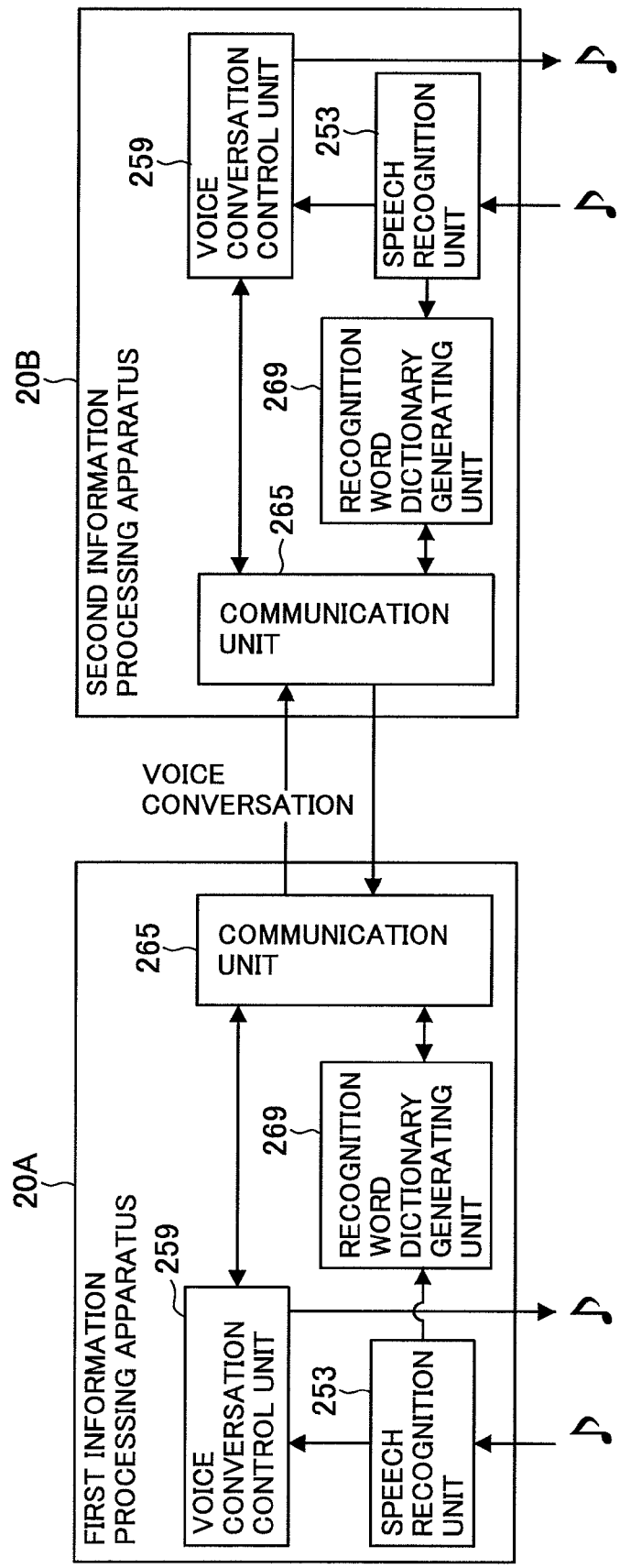
FIG. 21A is an explanatory diagram showing the configuration of the voice chat system according to the first embodiment.
Figure 21B:
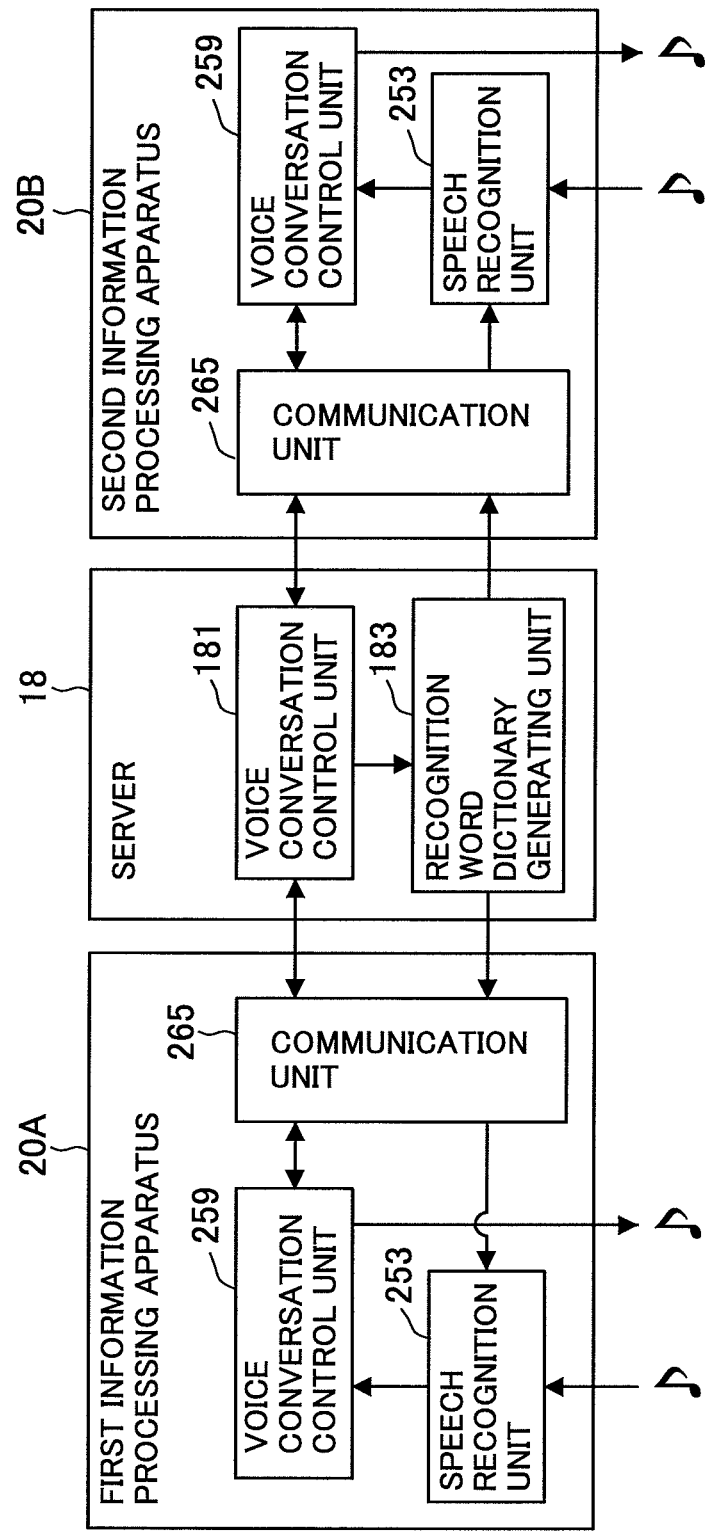
FIG. 21B is an explanatory diagram showing a modified example of the voice chat system according to the first embodiment.

As shown in FIG. 21A, the recognition word dictionary generating unit 269 may be provided to both the first and second information processing apparatuses 20A and 20B performing the voice chat. As shown in FIG. 21B, the recognition word dictionary generating unit 269 may not be provided to the first and second information processing apparatuses 20A and 20B performing the voice chat but provided in a server 18 that relays communication between the first and second information processing apparatuses 20A and 20B. As the server shown in FIG. 21B, when the recognition word dictionary generating unit 269 is provided in the server 18, the server 18 shown in FIG. 21B functions as a recognition word dictionary generation device that acquires the search keyword list from the search server 14, selects keywords from the acquired search keyword list using the above-described method, and adds the above-described weight information to the selected keywords.

A recognition word dictionary generating unit 183 in the server 18 acquires a search keyword list from the search server 14 based on the content of the voice conversation acquired from the voice conversation control unit 181 and performs selection of the words and addition of the recognition weight information using the acquired search keyword list in accordance with the above-described process method, thereby creating a variable word dictionary. Thereafter, the recognition word dictionary generating unit 183 in the server 18 transmits the created variable word dictionary to the first and second information processing apparatuses 20A and 20B. The information processing apparatuses store the transmitted variable word dictionary in the respective recognition databases 309; therefore, the variable word dictionary can be used in the speech recognition process. Incidentally, the first and second information processing apparatuses 20A and 20B may acquire, from the server 18, a list of words having recognition weight information added thereto and create a variable word dictionary based on the acquired word list.

In the first and second information processing apparatuses 20A and 20B shown in FIGS. 21A and 21B, only some of the processing units of the respective information processing apparatuses are illustrated. Needless to say, in addition to the processing units illustrated, processing units illustrated in FIGS. 3 to 5 are also included in the information processing apparatuses.

According to the voice chat system of the present embodiment described above, the database of the search server 14 is used in generation of the dictionary for use in the speech recognition. Therefore, keywords that often appear in the latest topics can be used as a linguistic knowledge of the speech recognition. In addition, words related to the keywords of the topic are set to have high occurrence probability using a treasures or the like; therefore, the speech recognition can be performed using the related keywords. With this, in the voice chat system according to the present embodiment, vocabularies related to the latest topic that users are likely to converse about are recognized on a preferential basis, thereby improving the recognition rate. The information displayed as the recognition result is highly likely to be information on the latest topics, that is, the information that users are interested. Therefore, even if the displayed information is somehow different from the conversation of the users, it provides an advantage that the users of the voice chat can broaden the conversation.

Second Embodiment

Hereinafter, a keyword detection system according to a second embodiment of the present invention will be described in detail.

Figure 22:
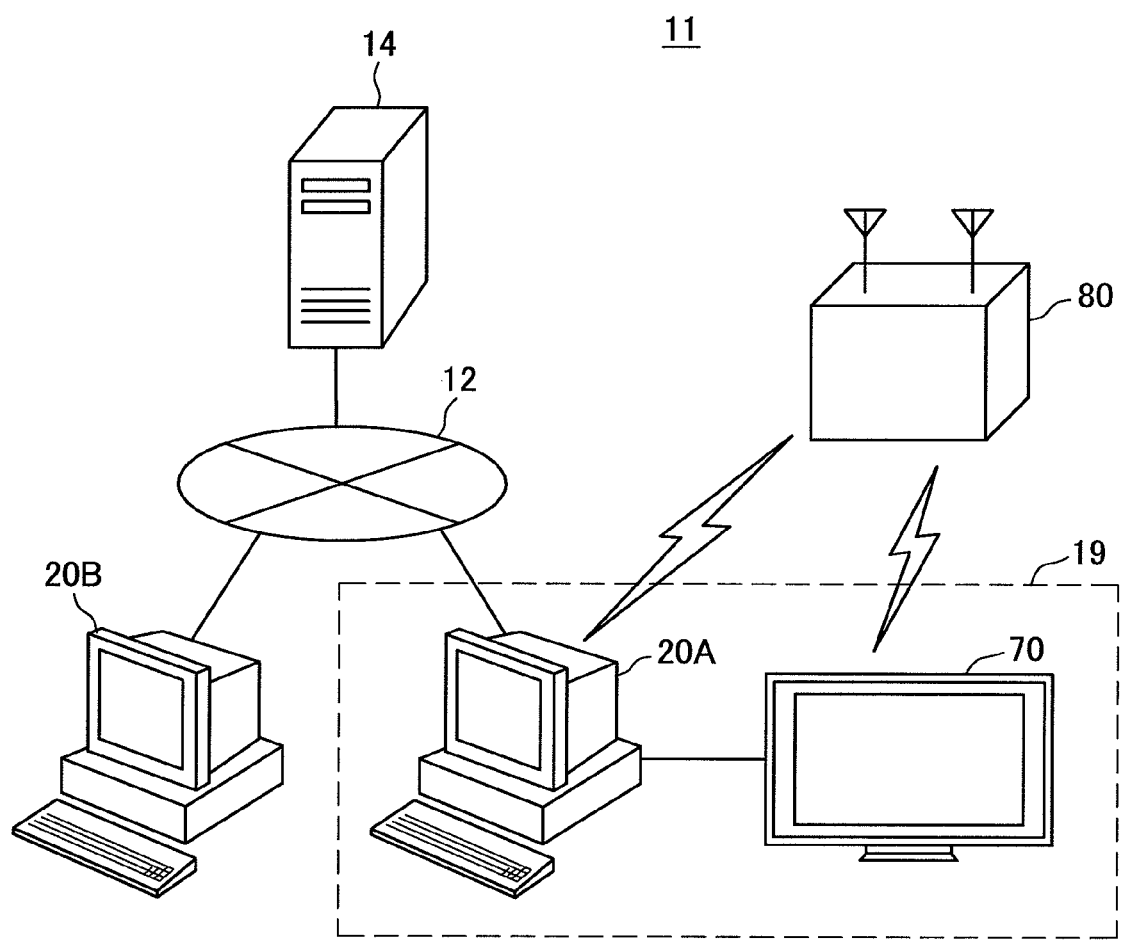
FIG. 22 is an explanatory diagram showing the configuration of a keyword detection system according to a second embodiment of the present invention.

FIG. 22 is an explanatory diagram showing the configuration of a keyword detection system according to the second embodiment of the present invention. As shown in FIG. 22, the keyword detection system 11 according to the present embodiment includes a communication network 12, a search server 14, and information processing apparatuses 20A and 20B (hereinafter, sometimes, collectively referred to as information processing apparatus or apparatuses 20). The information processing apparatus 20A is connected to an external display device 70 within a home network 19. The information processing apparatuses 20A and 20B and the external display device 70 can receive broadcast information transmitted from a broadcasting station 80.

The communication network 12 and the search server 14 have the same configuration and provides substantially the same effect as the communication network 12 and the search server 14 according to the first embodiment, and detailed descriptions thereof will be omitted.

The information processing apparatus 20A performs a chat (a voice chat) by means of voice with another information processing apparatus 20B connected thereto via the communication network 12. The information processing apparatuses 20A and 20B can request the search server 14 connected thereto via the communication network 12 to perform referencing of a database or search of information via the communication network 12. The another information processing apparatus 20B performing the voice chat may be connected to the information processing apparatus 20A not via the communication network 12, as shown in the drawing. Alternatively, the another information processing apparatus 20B may be directly connected to the information processing apparatus 20A, not via the communication network 12, to a USB port, an IEEE 1394 port such as i.Link, an SCSI port, an RS-232C port, and the like.

The information processing apparatus 20A is connected to the external display device 70 described later within the home network 19; therefore a variety of data can be communicated between the information processing apparatus 20A and the external display device 70. The connection between the information processing apparatus 20A and the external display device 70 may be performed via a connection port such as HDMI-CEC (high-definition multimedia interface-consumer electronics control). The information processing apparatus 20A can receive a broadcast wave containing the broadcast information transmitted from the broadcasting station 80 described later using a receiving function provided therein.

In the shown example shown in the drawing, the information processing apparatus 20 is a desktop PC; however, in the present embodiment, the information processing apparatus 20 may be a notebook PC. In the present embodiment, the information processing apparatus 20 is not limited to the example described above but may be constructed, for example, by a television set-top checkbox, an information appliance such as a home-use game machine, a mobile phone, a PDA, and the like as long as it is a device capable of having a function of communicating via a network. Additionally or alternatively, the information processing apparatus 20 may be a portable device, such as a portable game machine, a PHS, or a portable video/audio player, which is carried by a user who leased it.

The external display device 70 is a display unit, such as a CRT display unit, a liquid crystal display unit, a plasma display panel unit, or an electro-luminescence (EL) display unit. The external display device 70 receives the broadcast wave containing the broadcast information transmitted from the broadcasting station 80 described later and displays the content of the broadcast information on a display area of the display unit. Here, the broadcast information transmitted from the broadcasting station refers to data such as broadcast text information, broadcast audio information, or video information, provided through a terrestrial digital broadcasting such as a one-segment digital broadcasting or a 12-segment digital broadcasting (hereinafter, referred to as full-segment digital broadcasting), a cable broadcasting, or an Internet broadcasting via a network. The broadcast wave containing the broadcast information refers to a wave of the terrestrial digital broadcasting such as the one-segment digital broadcasting or the full-segment digital broadcasting. The external display device 70 can transmit the received broadcast information to the information processing apparatus 20 via a connection port such as HDMI-CEC. The external display device 70 can receive a variety of data transmitted from the information processing apparatus 20 and display information corresponding-to-the-data.

Hereinafter, the second embodiment will be described by way of the example of the terrestrial digital broadcasting.

The broadcasting station 80 transmits a broadcast wave containing broadcast information composed of data including: broadcast text information, broadcast audio information, and video information. The external display device 70 receives the broadcast wave transmitted from the broadcasting station 80 and displays caption information or outputs a sound based on the broadcast text information contained in the broadcast wave. The information processing apparatus 20 can receive the broadcast wave transmitted from the broadcasting station 80 to use the content of the broadcast wave in a variety of processing.

(Configuration of Information Processing Apparatus 20)

Next, the configuration of the information processing apparatus 20 according to the present embodiment will be described in detail. The hardware configuration of the information processing apparatus 20 according to the present embodiment is substantially the same as the hardware configuration according to the first embodiment, and detailed descriptions thereof will be omitted.

Figure 23:
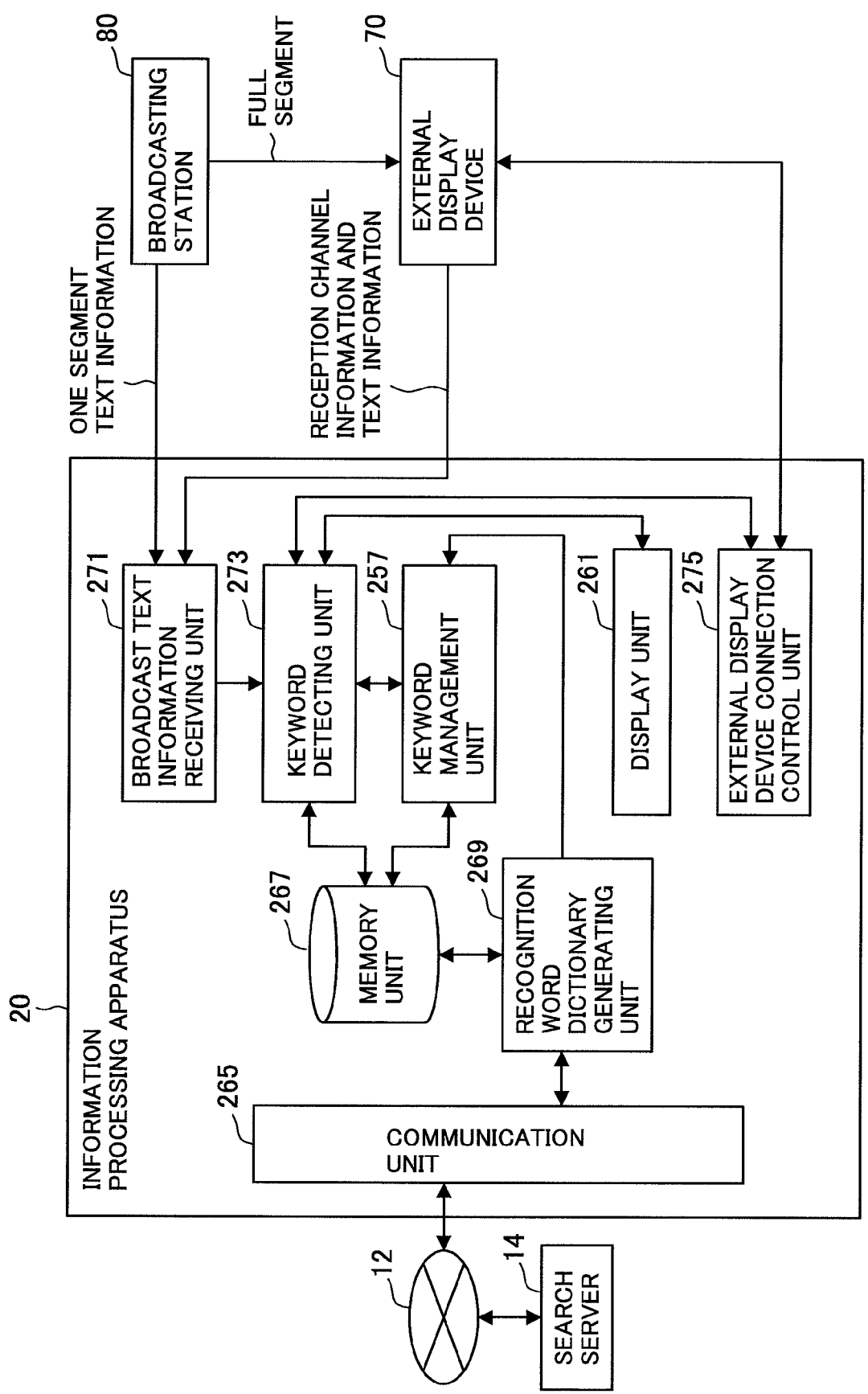
FIG. 23 is a block diagram for explaining the configuration of an information processing apparatus according to the second embodiment.

FIG. 23 is a block diagram for explaining the configuration of the information processing apparatus 20 according to the second embodiment. As shown in FIG. 23, the information processing apparatus 20 according to the present embodiment includes a keyword management unit 257, a display unit 261, a communication unit 265, a memory unit 267, a recognition word dictionary generating unit 269, a broadcast text information receiving unit 271, a keyword detection unit 273, and an external display device connection control unit 275.

The keyword management unit 257 manages the keywords to be extracted from the word sequence corresponding to the broadcast text information received by the broadcast text information receiving unit 271 described later. The keyword management unit 257 stores, in the storage unit 267, search history information that is a history of the user of the information processing apparatus 20 performing search using the search server 14 and selects the managed keywords based on a search keyword contained in the history information or the detected keywords. The keywords managed by the keyword management unit 257 are freely referenced by the keyword detection unit 273 described later. The keyword management unit 257 can provide the managed keywords to the recognition word dictionary generating unit 269 described later, and the recognition word dictionary generating unit 269 can perform generation or update of a recognition word dictionary using the keywords provided by the keyword management unit 257 and the search keyword list acquired from the search server 14.

The display unit 261 displays the keywords transmitted from the keyword detection unit 273 to the user of the information processing apparatus 20 via a display device such as a display of the information processing apparatus 20. The display unit 261 may be configured to display the word sequence itself corresponding to the broadcast text information received by the broadcast text information receiving unit 271.

The communication unit 265 is a communication device installed in the information processing apparatus 20. The communication unit 265 relays communication of information via the communication network 12 between the information processing apparatus 20, specifically, the keyword management unit 257 and the recognition word dictionary generating unit 269, and the external device of the information processing apparatus 20, specifically the search server 14 or another information processing apparatus 20. Moreover, the communication unit 265 can communicate information with other information processing apparatus that are directly connected to the information processing apparatus 20 not via the communication network 12.

The memory unit 267 is a storage device installed in the information processing apparatus 20, for example, and stores therein data such as the keywords detected by the keyword detection unit 273 or the keyword information managed by the keyword management unit 257. Besides these data, the memory unit 267 can store therein the broadcast text information received by the broadcast text information receiving unit 271 or a variety of databases. The memory unit 267 may appropriately store therein a variety of parameters that need be stored when the information processing apparatus 20 performs a process and progress information of the process. The memory unit 267 is freely accessible when the keyword management unit 257, the display unit 261, the communication unit 265, the recognition word dictionary generating unit 269, the broadcast text information receiving unit 271, the keyword detection unit 273, the external display device connection control unit 275, or the like performs reading or writing to the memory unit 267.

The recognition word dictionary generating unit 269 acquires a search keyword list from the search server 14 and selects only suitable keywords from the acquired search keyword list, thereby generating a recognition word dictionary for use in the speech recognition. The recognition word dictionary generating unit 269 selects the keywords from the acquired search keyword list and may add attribute information of the keywords or related sub-keywords to the selected keywords or a recognition weight for use in the speech recognition. In addition, the recognition word dictionary generating unit 269 may perform generation or update of the recognition word dictionary using the keywords transmitted from the keyword management unit 257 or keywords that the keyword detection unit 273 has detected from the broadcast text information received by the broadcast text information receiving unit 271 described later. The detailed configuration of the recognition word dictionary generating unit 269 according to the present embodiment or the generation method of the recognition word dictionary is substantially the same as the configuration of the recognition word dictionary generating unit 269 or the generation method according to the first embodiment, and detailed descriptions thereof will be omitted.

The broadcast text information receiving unit 271 acquires, from the external display device 70, reception channel information concerning a broadcast channel through which the external display device 70 is currently receiving. Here, the reception channel information refers to information that represents a broadcast channel through which the external display device 70 is currently receiving. The broadcast text information receiving unit 271 can synchronize the reception broadcast channel of the broadcast text information receiving unit 271 with the reception broadcast channel of the external display device 70 by acquiring the reception channel information from the external display device 70.

The broadcast text information receiving unit 271 receives a broadcast wave corresponding to the reception broadcast channel of the external display device 70 directly from the broadcasting station 80 based on the acquired reception channel information. At this time, the broadcast text information receiving unit 271 may be configured to directly receive an one-segment broadcast wave among the broadcast wave transmitted from the broadcasting station 80 and acquires text information from the received wave. The broadcast text information receiving unit 271 may be configured to directly receive the full-segment broadcast wave transmitted from the broadcasting station 80.

The broadcast text information receiving unit 271 may be configured to receive the broadcast text information received by the external display device 70 and transmitted to the information processing apparatus 20 from the external display device 70 based on the acquired reception channel information.

The broadcast text information receiving unit 271 outputs the received broadcast text information to the keyword detection unit 273 described later. The broadcast text information receiving unit 271 may record the received broadcast text information in the memory unit 267.

The keyword detection unit 273 determines whether or not a keyword managed by the keyword management unit 257 exists in the word sequence corresponding to the broadcast text information transmitted from the broadcast text information receiving unit 271 and outputs, as a keyword, the word corresponding to the keywords if the keyword exists. If plural keywords exist in one word sequence, the keyword detection unit 273 may be configured to detect all the corresponding keywords. The keyword detection unit 273 may be configured to transmit the keyword detected from the word sequence to the display unit 261.

For example, when a recognition result, "The recent structural reform is eviscerated" is transmitted from the broadcast text information receiving unit 271 and a keyword, "structural reform" exists in the keyword managed by the keyword management unit 257, the keyword detection unit 273 outputs "structural reform" as a keyword.

The external display device connection control unit 275 performs connection control between the information processing apparatus 20 and the external display device 70 connected to the information processing apparatus 20. The external display device connection control unit 275 transmits the keywords or the like detected by the keyword detection unit 273 to the external display device 70. Upon notified by the external display device 70 that the user of the external display device 70 has referenced or selected a specific keyword or an article related to the keyword, the external display device connection control unit 267 may record the reference history or selection history in the memory unit 267 and notify the search server 14 via the communication unit 265. The search server 14 can use the reference history or the selection history in a variety of processing executed within the search server 14. Incidentally, when transmitting data corresponding to a variety of information to the external display device 70, the external display device connection control unit 275 may transform a format of the data to be transmitted into a format that can be displayed by the external display device 70.

Hereinabove, an example of the function of the information processing apparatus 20 according to the present embodiment has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

The information processing apparatus 20 according to the present embodiment may further include the speech recognition unit or the voice conversation control unit of the information processing apparatus 20 according to the first embodiment. The information processing apparatus 20 may further include a database memory unit that stores the content of the search keyword list recorded in the search server 14. With this, the content of the search keyword list can be stored in the database memory unit provided in the information processing apparatus 20. Therefore, it is possible to shorten the time necessary for the information processing apparatus 20 to access the search server 14. In addition, by updating the content of the database memory unit on a periodic basis, the information processing apparatus 20 can acquire the content of the latest search keyword list recorded in the search server 14.

(Configuration of External Display Device 70)

Figure 24:
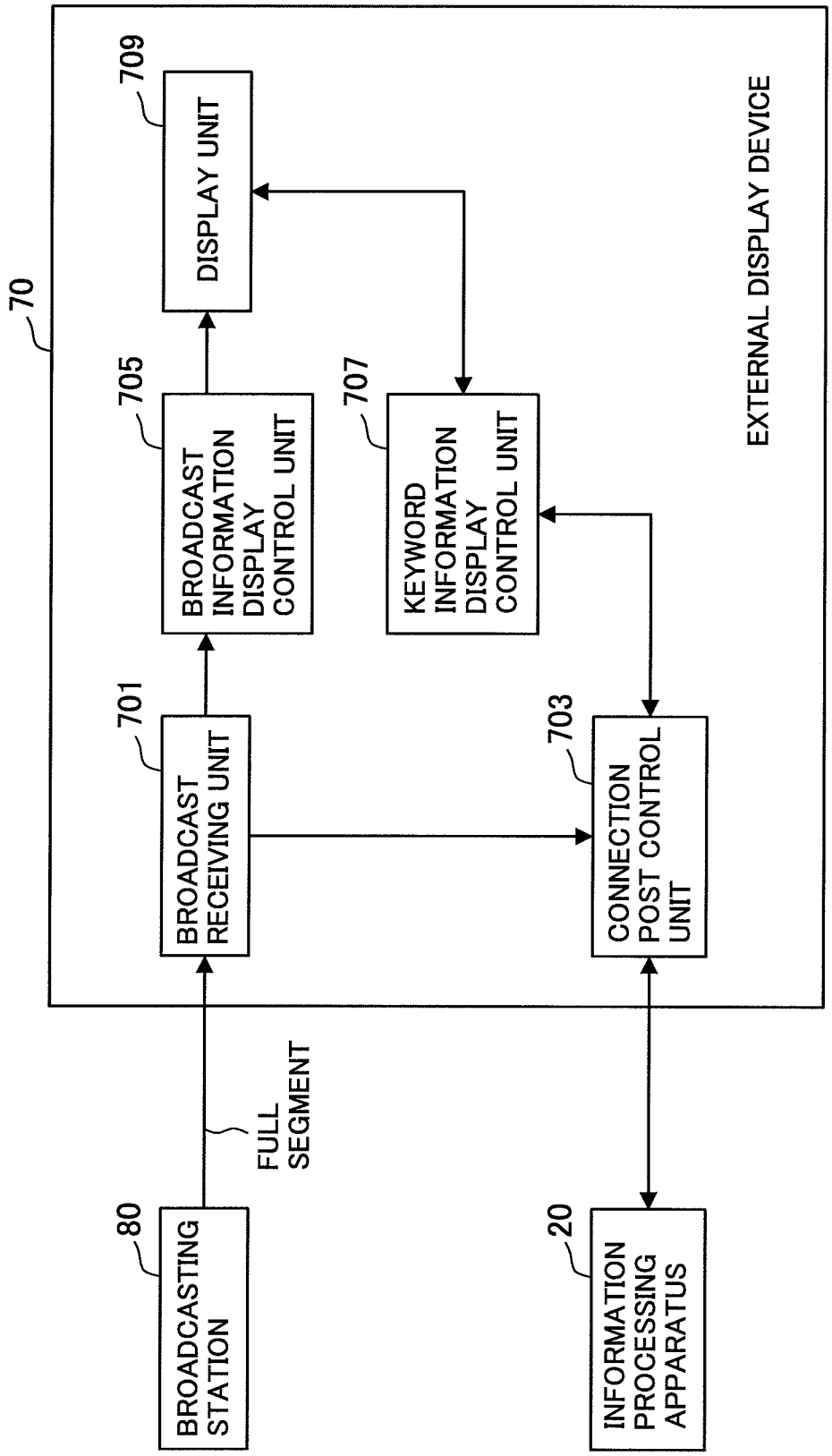
FIG. 24 is a block diagram for explaining the configuration of an external display device according to the second embodiment.
Figure 25:
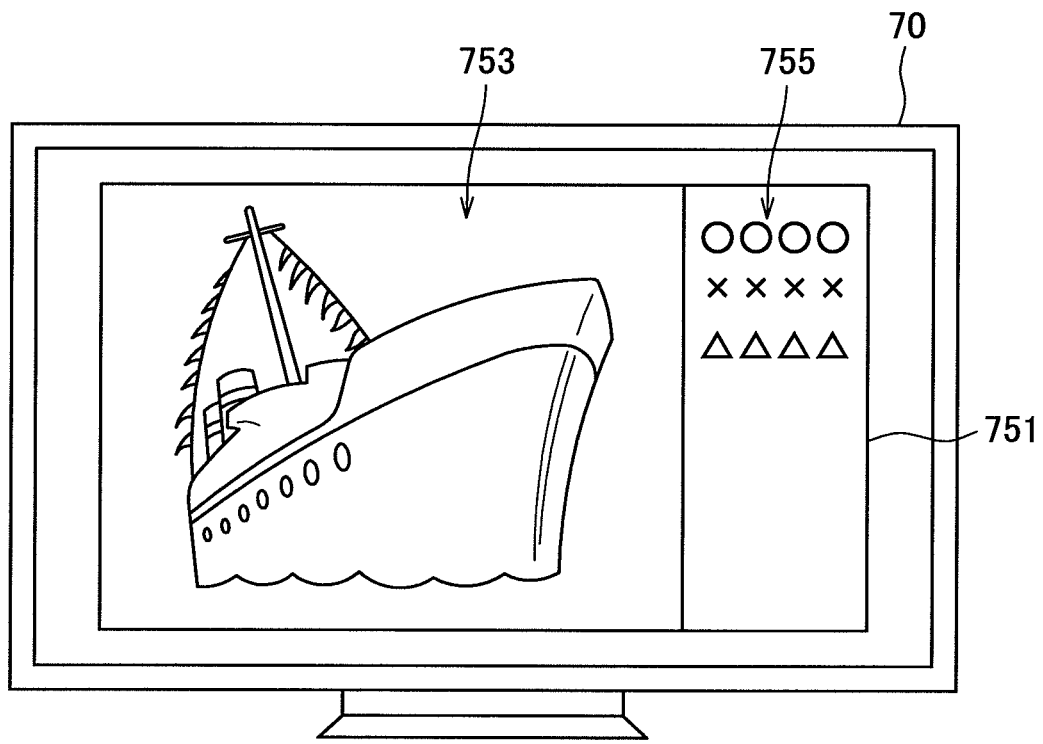
FIG. 25 is an explanatory diagram showing an information display screen of the external display device according to the second embodiment.

Next, the configuration of the external display device 70 according to the present embodiment will be described in detail with reference to FIGS. 24 and 25. FIG. 24 is a block diagram for explaining the configuration of an external display device according to the second embodiment. FIG. 25 is an explanatory diagram showing an information display screen of the external display device according to the second embodiment.

The hardware of the external display device 70 according to the present embodiment includes a display element such as a CRT, a liquid crystal display panel, a plasma display panel, or an EL panel, and a drive control circuit that is constructed by CPU, ROM, and RAM and used in controlling the driving of the display element.

As shown in FIG. 24, the external display device 70 of the present embodiment includes a broadcast receiving unit 701, a connection port control unit 703, a broadcast information display control unit 705, a keyword information display control unit 707, and a display unit 709.

The broadcast receiving unit 701 receives a broadcast wave transmitted from the broadcasting station 80 and outputs data such as broadcast text information, broadcast audio information, or video information, contained in the broadcast wave to the connection port control unit 703 and the broadcast information display control unit 705, which will be described later. The broadcast receiving unit 701 may be configured to record the received information in a memory unit (not shown) provided in the external display device 70 or an externally attached memory unit (not shown) connected to the external display device 70.

The connection port control unit 703 controls a connection port such as HDMI-CEC capable of digital communication with the information processing apparatus 20. The connection port control unit 703 transmits the reception channel information about the broadcast channel, through which the broadcast receiving unit 701 is receiving, to the information processing apparatus 20 via the connection port such as MDMI-CEC. The data received by the broadcast receiving unit 701, such as broadcast text information, broadcast audio information, and video information, may be output to the information processing apparatus 20 via the connection port control unit 703. The variety of data transmitted from the information processing apparatus 20 are input to the external display device 70 via the connection port control unit 703. The variety of data transmitted from the information processing apparatus 20 is transmitted to the keyword information display control unit 707 described later.

The broadcast information display control unit 705 performs display control when displaying the broadcast text information, the broadcast audio information, and the video information transmitted from the broadcast receiving unit 701 on the display unit 709 described later.

The keyword information display control unit 707 performs display control when displaying the keyword information transmitted from the information processing apparatus 20 on the display unit 709 described later. Here, the keyword information transmitted from the information processing apparatus 20 refers to information that includes the keywords extracted by the information processing apparatus 20, a search result for the extracted keywords, and the articles related to the keywords. Upon receiving, from the display unit 709, a request for acquisition of detailed information on the information selected by the user of the external display device 70 selecting the information displayed on the display unit 709 by means of an input device such as a mouse, a keyboard, or a remote controller, the keyword information display control unit 707 transmits the detailed information acquisition request to the information processing apparatus 20 via the connection port control unit 703.

The display unit 709 displays, on an information display screen of the external display device 70, the broadcast text information, the broadcast audio information, and the video information, which are display-controlled by the broadcast information display control unit 705, and the keyword information, which is display-controlled by the keyword information display control unit 707.

The information display screen 751 of the external display device 70 normally includes an image display area 753 on which the broadcast text information, the broadcast audio information, and the video information are displayed. Here, when the keyword information is transmitted from the information processing apparatus 20, the display area of the information display screen 751 is divided to generate a keyword information display area 755 on which the keyword information is displayed. The image display area 753 is controlled, for example, by the broadcast information display control unit 705, and the keyword information display are 755 is controlled, for example, by the keyword information display control unit 707.

The details of the keyword information display area 755 are substantially the same as the search result display screen 50 of the information processing apparatus according to the first embodiment of the present invention, and detailed descriptions thereof will be omitted.

Hereinabove, an example of the function of the external display device 70 according to the present invention has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

(Keyword Detection Method)

Figure 26:
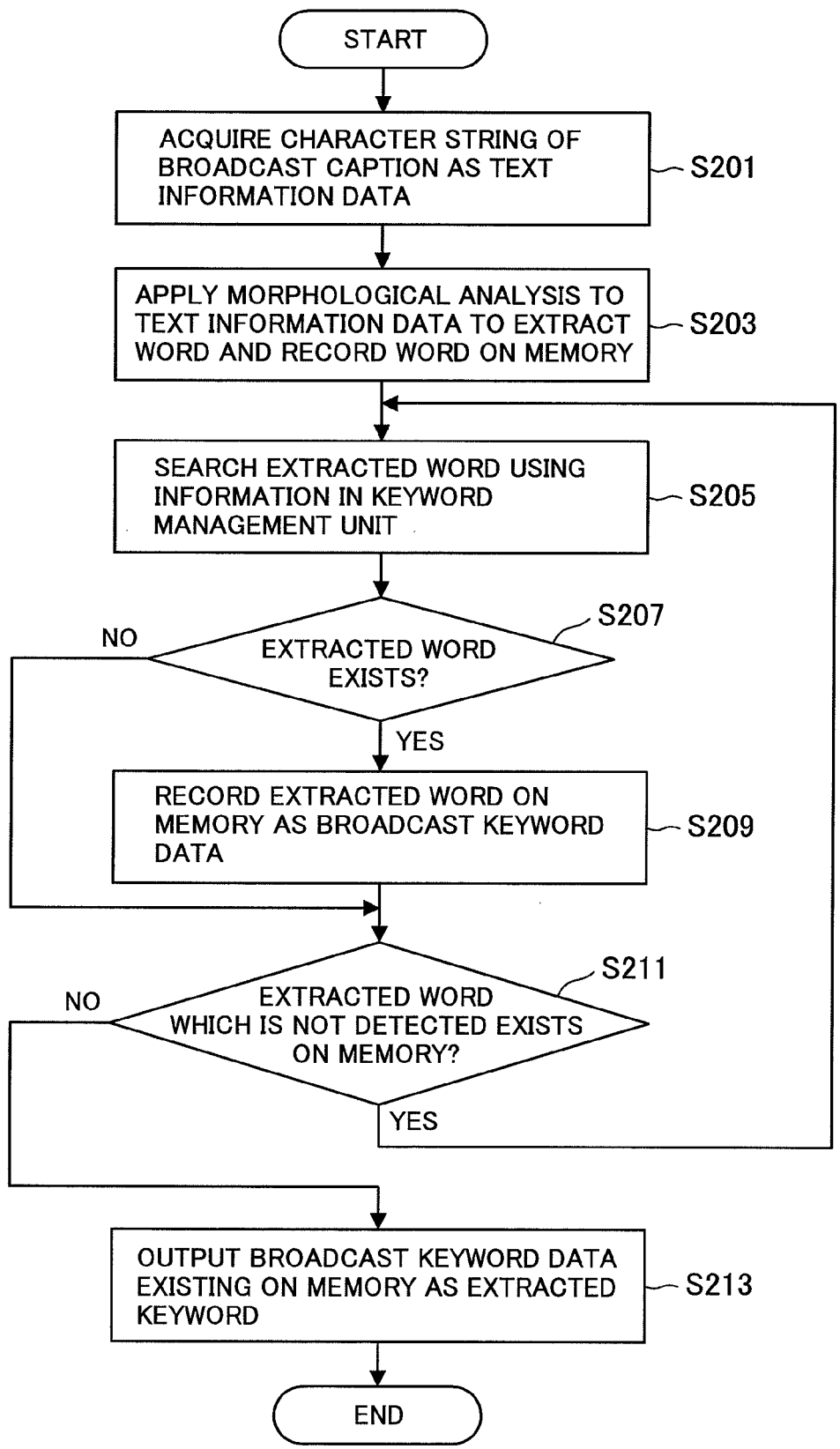
FIG. 26 is a flowchart for explaining a keyword detection method according to the second embodiment.

Next, an example of a keyword detection method performed by the information processing apparatus 20 according to the present embodiment will be described in detail with reference to FIG. 26. FIG. 26 is a flowchart for explaining a keyword detection method according to the second embodiment.

First, the broadcast text information receiving unit 271 of the information processing apparatus 20 receives broadcast text information from the external display device 70 or the broadcasting station 80 based on the reception channel information acquired from the external display device 70, thereby acquiring the character string of the broadcast caption as text information data (Step S201). The broadcast text information receiving unit 271 outputs the acquired text information data to the keyword detection unit 273.

Next, the keyword detection unit 273 applies morphological analysis to the transmitted text information data to extract words from the character string and records the extracted words on a memory of the information processing apparatus 20 (Step S203).

Next, the keyword detection unit 273 searches for the extracted words using the content of the keyword management unit 257 (Step S205).

Subsequently, the keyword detection unit 273 determines whether or not the extracted words exist in the keyword management unit 257 (Step S207). When the extracted words exist in the keyword management unit 257, the keyword detection unit 273 records the existing extracted words on the memory as broadcast keyword data (Step S209). When the extracted words do not exist in the keyword management unit 257, the keyword detection unit 273 performs a process of Step S211 described later.

Next, the keyword detection unit 273 determines whether or not the extracted words, which were not found in the keyword management unit 257, exist on the memory (Step S211). When the unfound words exist on the memory, the process of Step S205 is performed. When the unfound words do not exist in the memory, the keyword detection unit 273 outputs the broadcast keyword data existing on the memory as an extracted keyword (Step S213).

By using the method described above, the information processing apparatus 20 according to the present embodiment can extract keywords from the received broadcast text information.

In the information processing apparatus 20 according to the present embodiment, the words (keywords) existing in the keyword management unit 257 are automatically extracted from the broadcast text information transmitted from the broadcasting station. Therefore, it is possible to display the extracted keywords to the external display device 70. By using such a function, the user performing bidirectional communication such as a chat using the information processing apparatus 20 or the external display device 70 can use the extracted keywords as a topic of the chat or the like.

Figure 27:
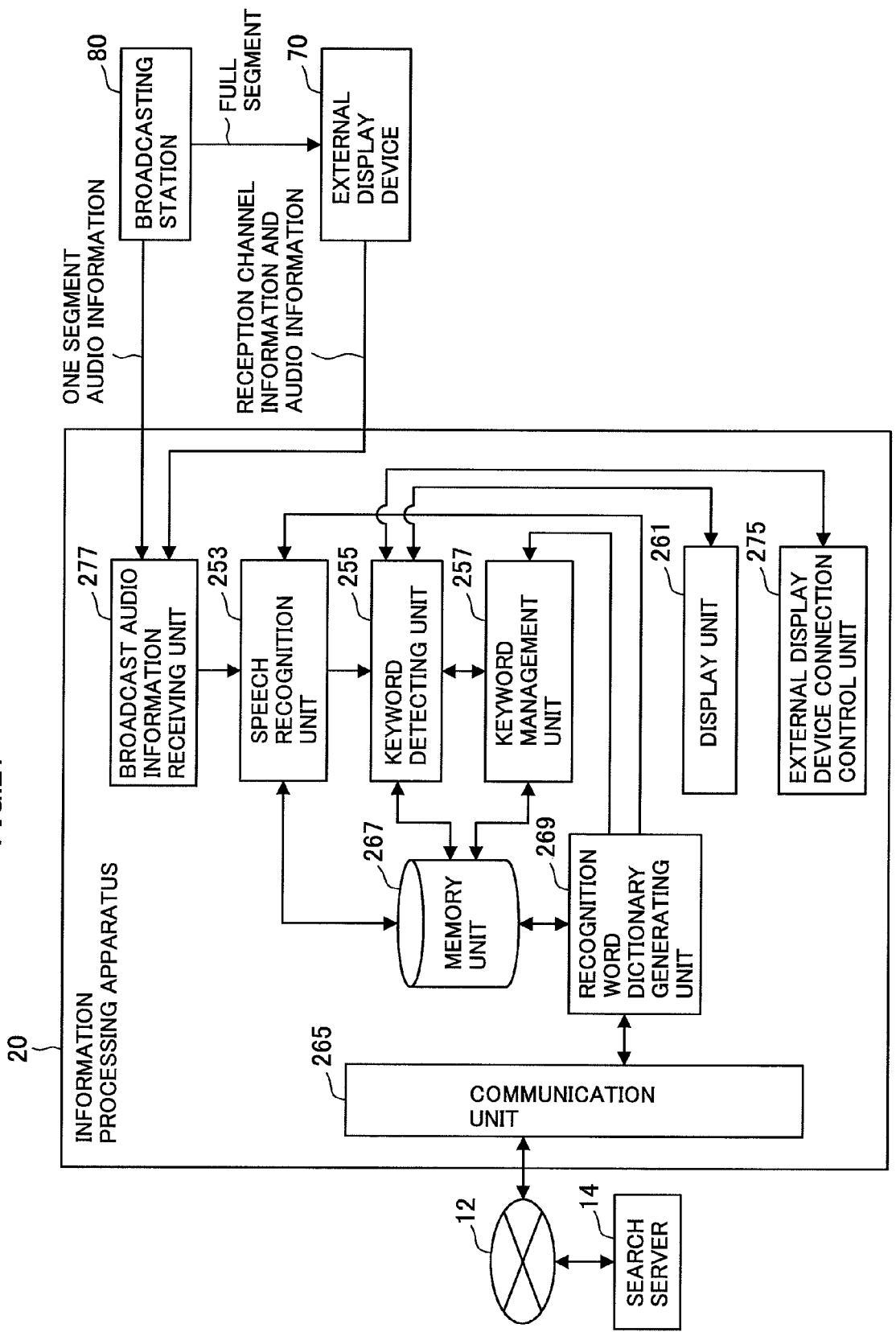
FIG. 27 is a block diagram for explaining the configuration of a first modified example of the information processing apparatus according to the second embodiment.
Figure 28:
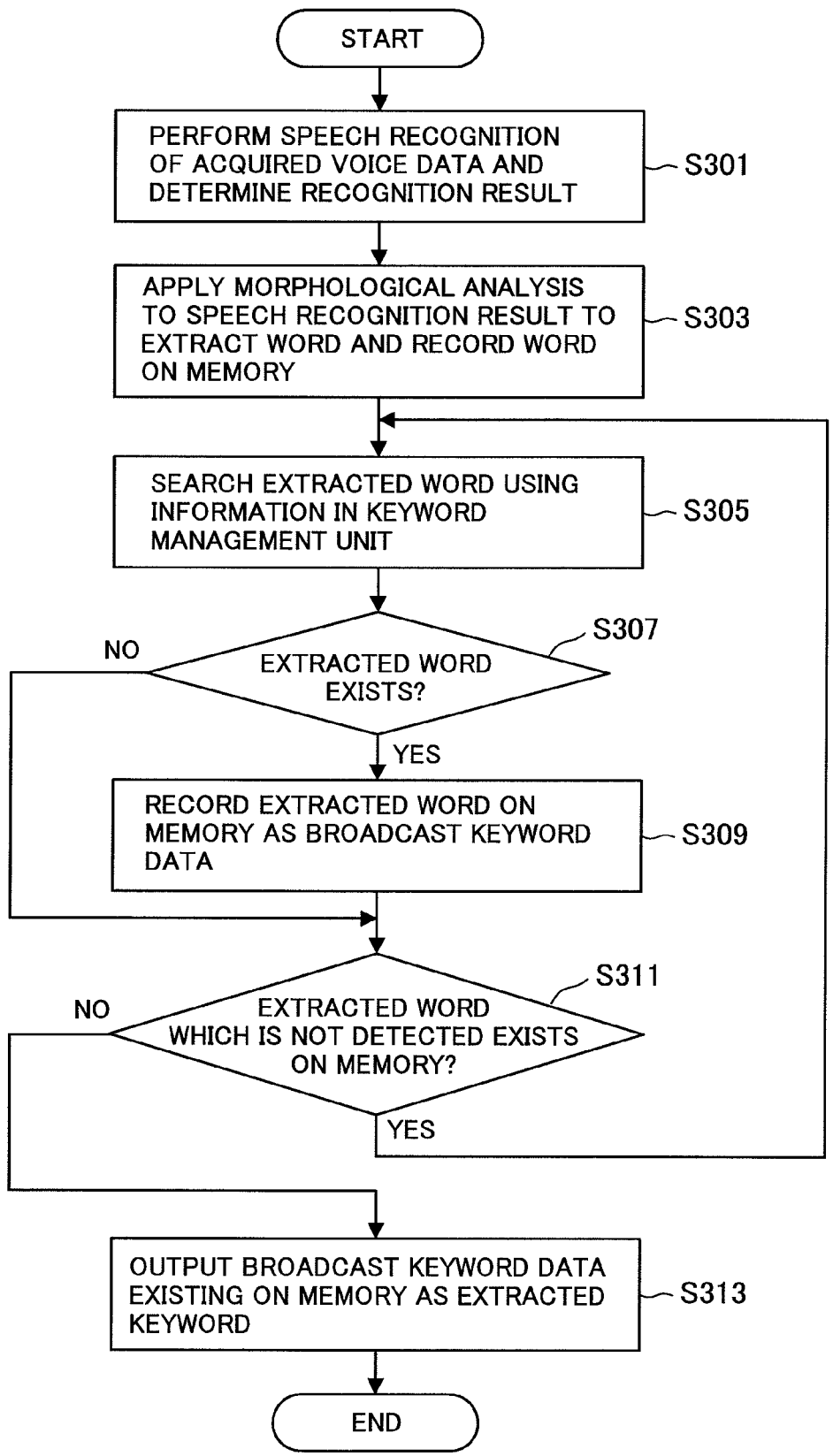
FIG. 28 is a flowchart for explaining a keyword detection method according to the present modified example.

First Modified Example of Information Processing Apparatus according to Second Embodiment Next, a first modified example of the information processing apparatus 20 according to the present embodiment will be described in detail with reference to FIGS. 27 and 28. FIG. 27 is a block diagram for explaining the configuration of the first modified example of the information processing apparatus 20. FIG. 28 is a flowchart for explaining a keyword detection method according to the present modified example. The hardware configuration of the information processing apparatus 20 according to the present modified example is substantially the same as the hardware configuration of the second embodiment of the present invention, and detailed descriptions thereof will be omitted.

As shown in FIG. 27, the information processing apparatus 20 according to the present modified example includes a speech recognition unit 253, a keyword detection unit 255, a keyword management unit 257, a display unit 261, a communication unit 265, a memory unit 267, a recognition word dictionary generating unit 269, a broadcast audio information receiving unit 277, an external display device connection control unit 275.

The keyword management unit 257, the display unit 261, the communication unit 265, the memory unit 267, and the external display device connection control unit 275 according to the present modified example have substantially the same configuration and provides substantially the same effect as the keyword management unit 257, the display unit 261, the communication unit 265, the memory unit 267, and the external display device connection control unit 275, and detailed descriptions thereof will be omitted.

The speech recognition unit 253 performs speech recognition based on broadcast audio information received by the broadcast audio information receiving unit 277 described later. The speech recognition unit 253 generates a word sequence corresponding to the broadcast audio information as a speech recognition result and transmits the generated word sequence to the keyword detection unit 255 described later. The speech recognition unit 253 may be configured to transmission the generated word sequence to the display unit 261. The detailed configuration and the speech recognition method of the speech recognition unit 253 are substantially the same as the configuration and the speech recognition method of the speech recognition unit 253 according to the first embodiment of the present invention, and detailed descriptions thereof will be omitted.

The keyword detection unit 255 determines whether or not a keyword managed by the keyword management unit 257 exists in the word sequence corresponding to the broadcast audio information transmitted from the speech recognition unit 253 and outputs, as a keyword, the word corresponding to the keyword if the keyword exists. If plural keywords exist in one word sequence, the keyword detection unit 255 may be configured to detect all the corresponding keywords. The keyword detection unit 255 may be configured to transmit the keyword detected from the word sequence to the display unit 261 described later.

For example, when a recognition result "The recent structural reform is eviscerated" is transmitted from the speech recognition unit 253 and when a keyword "structural reform" exists in the keyword managed by the keyword management unit 257, the keyword detection unit 255 outputs "structural reform" as a keyword.

The recognition word dictionary generating unit 269 acquires a search keyword list and the like from the search server 14 and selects only suitable keywords from the acquired search keyword list, thereby generating a recognition word dictionary for use in the speech recognition. The recognition word dictionary generating unit 269 selects the keywords from the acquired search keyword list and may add attribute information of the keywords or related sub-keywords to the selected keywords or a recognition weight for use in the speech recognition. In addition, the recognition word dictionary generating unit 269 may perform generation or update of the recognition word dictionary using the keywords transmitted from the keyword management unit 257 or keywords that the keyword detection unit 255 has detected from the broadcast audio information received by the broadcast audio information receiving unit 277 described later. The detailed configuration of the recognition word dictionary generating unit 269 according to the present embodiment or the generation method of the recognition word dictionary is substantially the same as the configuration of the recognition word dictionary generating unit 269 or the generation method according to the first embodiment, and detailed descriptions thereof will be omitted.

The broadcast audio information receiving unit 277 acquires, from the external display device 70, reception channel information concerning a broadcast channel through which the external display device is currently receiving. The broadcast audio information receiving unit 277 can synchronize the reception broadcast channel of the broadcast audio information receiving unit 277 with the reception broadcast channel of the external display device 70 by acquiring the reception channel information from the external display device 70.

The broadcast audio information receiving unit 277 receives a broadcast wave corresponding to the reception broadcast channel of the external display device 70 directly from the broadcasting station 80 based on the acquired reception channel information. At this time, the broadcast audio information receiving unit 277 may be configured to directly receive an one-segment broadcast wave among the broadcast wave transmitted from the broadcasting station 80 and acquires audio information from the received wave. The broadcast audio information receiving unit 277 may be configured to directly receive the full-segment broadcast wave transmitted from the broadcasting station 80.

The broadcast audio information receiving unit 277 may be configured to receive the broadcast audio information received by the external display device 70 and transmitted to the information processing apparatus 20 from the external display device 70 based on the acquired reception channel information.

The broadcast audio information receiving unit 277 outputs the received broadcast audio information to the speech recognition unit 253. The broadcast audio information receiving unit 277 may record the received broadcast audio information in the memory unit 267.

Hereinabove, an example of the function of the information processing apparatus 20 according to the present modified example has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

The information processing apparatus 20 according to the present modified example may further include the speech recognition unit or the voice conversation control unit of the information processing apparatus 20 according to the first embodiment. The information processing apparatus 20 may further include a database memory unit that stores the content of the search keyword list recorded in the search server 14. With this, the content of the search keyword list can be stored in the database memory unit provided in the information processing apparatus 20. Therefore, it is possible to shorten the time necessary for the information processing apparatus 20 to access the search server 14. In addition, by updating the content of the database memory unit on a periodic basis, the information processing apparatus 20 can acquire the content of the latest search keyword list recorded in the search server 14.

(Keyword Detection Method)

Next, an example of a keyword detection method performed by the information processing apparatus 20 according to the present modified example will be described in detail with reference to FIG. 28.

First, the broadcast audio information receiving unit 277 of the information processing apparatus 20 receives broadcast audio information from the external display device 70 or the broadcasting station 80 based on the reception channel information acquired from the external display device 70, and the speech recognition unit 253 performs speech recognition on the broadcast audio information to determine a speech recognition result (Step S301). The speech recognition unit 253 outputs the determined speech recognition result to the keyword detection unit 255.

Next, the keyword detection unit 255 applies morphological analysis to the speech recognition result to extract words from the speech recognition result and records the extracted words on a memory of the information processing apparatus 20 (Step S303).

Next, the keyword detection unit 255 searches for the extracted words using the content of the keyword management unit 257 (Step S305).

Subsequently, the keyword detection unit 255 determines whether or not the extracted words exist in the keyword management unit 257 (Step S307). When the extracted words exist in the keyword management unit 257, the keyword detection unit 255 records the existing extracted words on the memory as broadcast keyword data (Step S309). When the extracted words do not exist in the keyword management unit 257, the keyword detection unit 255 performs a process of Step S311 described later.

Next, the keyword detection unit 255 determines whether or not the extracted words which were not found in the keyword management unit 257 exist on the memory (Step S311). When the unfound words exist on the memory, the process of Step S305 is performed. When the unfound words do not exist in the memory, the keyword detection unit 255 outputs the broadcast keyword data existing on the memory as an extracted keyword (Step S313).

By using the method described above, the information processing apparatus 20 according to the present modified example can extract keywords from the received broadcast audio information.

In the information processing apparatus 20 according to the present modified example, the words (keywords) existing in the keyword management unit 257 are automatically extracted from the broadcast audio information transmitted from the broadcasting station 80. Therefore, it is possible to display the extracted keywords to the external display device 70. By using such a function, the user performing bidirectional communication such as a chat using the information processing apparatus 20 or the external display device 70 can use the extracted keywords as a topic of the chat or the like.

It should be understood by those skilled in the art that various modifications, combinations, sub-combinations and alterations may occur depending on design requirements and other factors insofar as they are within the scope of the attached claims or the equivalents thereof.

For example, in the embodiments described above, the broadcasting station 80 transmits a terrestrial digital broadcasting. However, the broadcasting station 80 may provide a cable broadcasting or an Internet broadcasting.

In the embodiments described above, FIG. 27 shows the case in which the broadcasting station 80 provides a television program through a terrestrial digital broadcasting. However, AV contents provided by a camcorder that user can personally capture and reproduce images with.

In the embodiments described above, a variety of word dictionaries for use in the speech recognition are stored in the common dictionary memory unit 307 and the recognition word dictionary memory unit 401 in the recognition database 309. However, the variety of word dictionaries used in the speech recognition may be stored in either one of the memory units.

In the embodiments described above, only one fixed word dictionary, only one variable word dictionary, and only one category table are stored in the recognition word dictionary memory unit 401. However, plural fixed word dictionary, plural variable word dictionary, and/or plural category table may be stored in the recognition word dictionary memory unit 401. By storing plural fixed word dictionary, plural variable word dictionary, and/or plural category table in the recognition word dictionary memory unit 401, it is possible to generate plural recognition dictionaries specialized in specific fields. Regarding words highly related to a specific keyword, the frequency of occurrence or the N-gram or class-N-gram probability may be set high in order to increase the recognition rate of the specific keyword.

Incidentally, the steps in this specification need not be processed in time series in the order described herein and may be processed in parallel or individually.

Meanwhile, with the development of the Internet-related technology, it has become possible to perform a chat by means of voice (the chat hereinafter referred to as voice chat) between personal computers (PC).

If it is possible to display information related to the content of a conversation on a display device of a PC using a voice chat application installed in the PC, it is possible to improve the convenience of the users in the chat. In this respect, as an example of the related art, JP-B-3526101 discloses a system that performs speech recognition on the content of the conversation of the voice chat, extracts keywords from the content of the conversation, searches for related information from a database, and displays a search result on a screen.

As another example of the related art, a synchronization system is disclosed for synchronizing two PCs so that the same screen display can be displayed by the browsers of the two PCs. However, the synchronization system is not related to the voice chat technology.

However, in the system disclosed in JP-B-3526101, users have to manually transmit information displayed on the screen to the counterpart of the voice chat in order to share the information displayed on the screen; it is therefore not suitable for communication.

In the synchronization system allowing user to see the same display by the PC browsers, since the system is not configured in relation to the conversation, every time the topic of the conversation changes, the users may have to manually input information to search for websites related to the conversation. Therefore, it may be practically difficult to synchronize automatically and efficiently the content of the conversation and all the terminals of the speakers.

The present invention is contrived in view of the above-mentioned situations. There is a need for providing new and improved voice chat system, information processing apparatus, and program that can synchronize automatically and efficiently keywords related to the content of the conversation during a voice chat.

There is also a need for providing new and improved information processing apparatus and program that can synchronize automatically and efficiently keywords contained in broadcast information transmitted from a broadcasting station.

According to a viewpoint of the present invention, there is provided a voice chat system, including: a plurality of information processing apparatuses that performs a voice chat; a keyword extraction database referenced by the information processing apparatuses when extracting keywords from a dialog of the conversation during the voice chat; and a search engine used by the information processing apparatuses when searching for the keywords and articles related to the keywords using the extracted keywords, wherein at least one information processing apparatus includes: a parameter extraction unit that extracts a parameter from voice data generated from the dialog, the parameter characterizing the voice data; a keyword extraction unit that recognizes the generated voice data and extracts the keywords from the voice data based on the parameter and the keyword extraction database; an information search unit that searches for the extracted keywords using the search engine and acquires a search result for the keywords and the articles related to the keywords; a display unit that displays a keyword that is correlated with address information of the search result for the keyword and an article that is correlated with address information of the articles related to the keywords; and a keyword synchronization unit that transmits the extracted keywords to an information processing apparatus, which is a counterpart of the chat, and performs keyword synchronization with the counterpart information processing apparatus.

According to the embodiment described above, in an information processing apparatus performing a voice chat, a parameter extraction unit extracts a parameter from voice data generated from a dialog of the conversation during the voice chat, the parameter characterizing the voice data; a keyword extraction unit recognizes the generated voice data and extracts keywords from the voice data based on the parameter and a keyword extraction database; an information search unit searches for the extracted keywords using a search engine and acquires a search result for the keywords and the articles related to the keywords; a display unit displays the keywords and the articles related to the keywords in a correlated manner with address information of the search result for the keywords and address information of the articles; and a keyword synchronization unit transmits the extracted keywords to an information processing apparatus, which is a counterpart of the chat, and performs keyword synchronization with the counterpart information processing apparatus. In the voice chat system of the embodiments of the present invention, speech recognition is automatically performed on the content of the conversation during a voice chat to extract keywords and the keywords are automatically transmitted to a counterpart of the voice chat. Accordingly, it is possible to improve the convenience of users in the voice chat.

According to another viewpoint of the present invention, there is provided an information processing apparatus performing voice chat with other information processing apparatus, the apparatus including: a parameter extraction unit that extracts a parameter from voice data generated from a dialog of the conversation during the voice chat, the parameter characterizing the voice data; a keyword extraction unit that recognizes the generated voice data and extracts keywords from the voice data based on the parameter and a keyword extraction database; an information search unit that searches for the extracted keywords using a search engine and acquires a search result for the keywords and articles related to the keywords; and a search information accumulation unit that accumulates the keywords and the articles in a correlated manner with address information of the search result for the keywords and address information of the articles, respectively.

According to the embodiment described above, a parameter extraction unit extracts a parameter from voice data generated from a dialog of the conversation during a voice chat, the parameter characterizing the voice data; a keyword extraction unit recognizes the generated voice data and extracts keywords from the voice data based on a keyword extraction database; an information search unit searches for the extracted keywords using a search engine and acquires a search result for the keywords and articles related to the keywords; and a search information accumulation unit accumulates the keywords and the articles in a correlated manner with address information of the search result for the keywords and address information of the articles, respectively. The processes from the generation of the voice data and the acquisition of the search information are performed automatically. Therefore, users of the information processing apparatus are not necessary to perform any additional operations, and can automatically acquire information that can be used as a topic of the voice chat.

The information processing apparatus may further include a keyword synchronization unit that transmits the extracted keywords to an information processing apparatus, which is a counterpart of the chat, and performs keyword synchronization with the counterpart information processing apparatus. According to the embodiment described above, a keyword synchronization unit transmits the extracted keywords to an information processing apparatus, which is a counterpart of a chat, and performs keyword synchronization. The extracted keywords are automatically transmitted to the counterpart information processing apparatus of the chat; therefore, counterparts of the voice chat can share the extracted keywords without needing to perform any additional operations.

The information processing apparatus may further include a database memory unit that stores the keyword extraction database. According to the embodiment described above, a keyword extraction database is stored in a database memory unit of an information processing apparatus, and it is therefore possible to shorten the time necessary for the information processing apparatus to access the keyword extraction database. As a result, it is possible to shorten the time necessary for the information processing apparatus to perform the keyword detection.

The search engine may be provided within the information processing apparatus. According to the embodiment described above, a search engine is provided in an information processing apparatus. As a result, it is possible to shorten the time necessary for the information processing apparatus to access the search engine. As a result, it is possible to shorten the time necessary for the search of information related to the keywords.

The information processing apparatus may further include a display unit that displays a keyword that is correlated with address information of the search result for the keyword and an article that is correlated with address information of the articles related to the keywords. According to the embodiment described above, a keyword and an article related to the keyword are displayed on a display unit in a correlated manner with address information of a search result for the keywords and address information of the article, respectively. Since both the keyword and the article related to the keyword are displayed, when the displayed article contains information that users are interested, the users can easily access the information.

The information processing apparatus may further include a reference history memory unit that stores a reference history of the keywords. According to the embodiment described above, a reference history of keywords is stored in a reference history memory unit of an information processing apparatus. The information processing apparatus references the reference history memory unit when extracting keywords from voice data, thereby enabling keyword detection of high efficiency.

The reference history memory unit may store the referenced keywords in a correlated manner with an identifier assigned to the respective chat and a counterpart of the chat. According to the embodiment described above, information related to referenced keywords is stored in a reference history memory unit in a correlated manner with an identifier assigned to the respective chat and a counterpart of the chat. Therefore, by using the content of the reference history memory unit, it is possible to enable keyword detection of higher efficiency.

The keyword extraction unit may extract a keyword placed at a higher rank of the reference history on a preferential basis. Alternatively, the keyword extraction unit may extract a higher-rank search keyword of the search engine on a preferential basis. According to the embodiment described above, a keyword placed at a higher rank of reference history or a higher-rank search keyword of a search engine is extracted on a preferential basis by a keyword detection unit. Since such a keyword is highly usable as a topic of a voice chat, it is possible to improve accuracy in speech recognition.

According to a further embodiment of the present invention, there is provided an information processing apparatus performing voice chat with other information processing apparatus, the at least one information processing apparatus including: a parameter extraction unit that extracts a parameter from voice data generated from a dialog of the conversation during the voice chat, the parameter characterizing the voice data; a keyword extraction unit that recognizes the generated voice data and extracts keywords from the voice data based on the parameter and a keyword extraction database; an information search unit that searches for the extracted keywords using a search engine and acquires a search result for the keywords and articles related to the keywords; and a search information accumulation unit that accumulates the keywords and the articles in a correlated manner with address information of the search result for the keywords and address information of the articles, respectively, wherein the information processing apparatus includes a keyword synchronization unit that receives the keywords transmitted from the at least one information processing apparatus and performs keyword synchronization with the corresponding information processing apparatus.

According to the embodiment described above, a keyword synchronization unit receives keywords from the at least one information processing apparatus, which is a counterpart of a voice chat, having a parameter extraction unit, a keyword extraction unit, an information search unit, and a search information accumulation unit, and performs keyword synchronization with the information processing apparatus. Since the speech recognition or the keyword detection, which imposes huge processing load, is executed by at least one information processing apparatus, which is a counterpart of the voice chat, it is possible to perform the voice chat without imposing additional load to the user's own information processing apparatus.

According to a still another viewpoint of the present invention, there is provided a program for allowing a computer to realize: a parameter extraction function that extracts a parameter from voice data generated from a dialog of the conversation during the voice chat, the parameter characterizing the voice data; a keyword extraction function that recognizes the generated voice data and extracts keywords from the voice data based on the parameter and a keyword extraction database; an information search function that searches for the extracted keywords using a search engine and acquires a search result for the keywords and articles related to the keywords; and a search information storage function that stores the keywords and the articles in a correlated manner with address information of the search result for the keywords and address information of the articles, respectively.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

According to a still another viewpoint of the present invention, there is provided a program for allowing a computer to realize: a keyword synchronization function that receives keywords transmitted from at least one information processing apparatus and performs keyword synchronization with the corresponding information processing apparatus.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

According to a still another viewpoint of the present invention, there is provided an information processing apparatus, including: a broadcast text information receiving unit that receives broadcast text information transmitted from a broadcasting station; a keyword extraction unit that extracts keywords from the broadcast text information based on a keyword extraction database; an information search unit that searches for the extracted keywords using a search engine and acquires a search result for the keywords and the articles related to the keywords; and an external display device connection control unit that performs connection control with an external display device and outputs the keywords, a search result for the keywords, and articles related to the keywords to the external display device.

According to the embodiment described above, a broadcast text information receiving unit receives broadcast text information transmitted from a broadcasting station; a keyword extraction unit extracts keywords from the broadcast text information based on a keyword extraction database; an information search unit searches for the extracted keywords using a search engine and acquires a search result for the keywords and the articles related to the keywords; and an external display device connection control unit performs connection control with an external display device and outputs the keywords, a search result for the keywords, and articles related to the keywords to the external display device. The processes from the reception of the broadcast text information and the acquisition of the search information are performed automatically. Therefore, users of the information processing apparatus are not necessary to perform any additional operations, and the acquired search information can be automatically displayed to the external display device.

The broadcast text information receiving unit may acquire reception channel information concerning a broadcast channel through which the external display device is receiving and the broadcast text information corresponding to the broadcast channel from the external display device connected to the information processing apparatus. Alternatively, the broadcast text information receiving unit may acquire reception channel information concerning a broadcast channel through which the external display device is receiving, from the external display device connected to the information processing apparatus, and acquires the broadcast text information corresponding to the broadcast channel from the broadcasting station.

The information processing apparatus may further include a reference history memory unit that stores a reference history of the keywords in the external display device, and the external display device connection control unit may notify the search engine of a keyword selected by the external display device.

The information processing apparatus may further include a keyword synchronization unit that transmits the extracted keywords to at least one information processing apparatus and performs keyword synchronization with the at least one information processing apparatus.

According to a still another viewpoint of the present invention, there is provided an information processing apparatus, including: a broadcast audio information receiving unit that receives broadcast audio information transmitted from a broadcasting station; a parameter extraction unit that extracts a parameter from voice data contained in the broadcast audio information, the parameter characterizing the voice data; a keyword extraction unit that recognizes the voice data and extracts keywords from the voice data based on the parameter and a keyword extraction database; an information search unit that searches for the extracted keywords using a search engine and acquires a search result for the keywords and articles related to the keywords; and an external display device connection control unit that performs connection control with an external display device and outputs the keywords, the search result for the keywords, and the articles related to the keywords to the external display device.

According to the embodiment described above, a broadcast audio information receiving unit receives broadcast audio information transmitted from a broadcasting station; a parameter extraction unit extracts a parameter from voice data contained in the broadcast audio information, the parameter characterizing the voice data; a keyword extraction unit recognizes the voice data and extracts keywords from the voice data based on the parameter and a keyword extraction database; an information search unit searches for the extracted keywords using a search engine and acquires a search result for the keywords and articles related to the keywords; and an external display device connection control unit performs connection control with an external display device and outputs the keywords, the search result for the keywords, and the articles related to the keywords to the external display device. The processes from the reception of the voice data contained in the broadcast audio information and the acquisition of the search information are performed automatically. Therefore, users of the information processing apparatus are not necessary to perform any additional operations, and the acquired search information can be automatically displayed to the external display device.

The broadcast audio information receiving unit may acquire reception channel information concerning a broadcast channel through which the external display device is receiving and the broadcast audio information corresponding to the broadcast channel from the external display device connected to the information processing apparatus. Alternatively, the broadcast audio information receiving unit may acquire reception channel information concerning a broadcast channel through which the external display device is receiving, from the external display device connected to the information processing apparatus, and acquires the broadcast audio information corresponding to the broadcast channel from the broadcasting station.

The information processing apparatus may further include a reference history memory unit that stores a reference history of the keywords in the external display device, and the external display device connection control unit may notify the search engine of a keyword selected by the external display device.

The information processing apparatus may further include a keyword synchronization unit that transmits the extracted keywords to at least one information processing apparatus and performs keyword synchronization with the at least one information processing apparatus.

According to a still another viewpoint of the present invention, there is provided a program for allowing a computer to realize: a broadcast text information receiving function that receives broadcast text information broadcast from a broadcasting station; a keyword extraction function that extracts keywords from the broadcast text information based on a keyword extraction database; an information search function that searches for the extracted keywords using a search engine and acquires a search result for the keywords and articles related to the keywords; and an external display device connection control function that performs connection control with an external display device and outputs the keywords, the search result for the keywords, and the articles related to the keywords to the external display device.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

According to a still another viewpoint of the present invention, there is provided a program for allowing a computer to realize: a broadcast audio information receiving function that receives broadcast audio information transmitted from a broadcasting station; a parameter extraction function that extracts a parameter from voice data contained in the broadcast audio information, the parameter characterizing the voice data; a keyword extraction function that recognizes the voice data and extracts keywords from the voice data based on the parameter and a keyword extraction database; an information search function that searches for the extracted keywords using a search engine and acquires a search result for the keywords and articles related to the keywords; and an external display device connection control function that performs connection control with an external display device and outputs the keywords, the search result for the keywords, and the articles related to the keywords to the external display device.

According to the embodiment described above, the computer program is stored in a memory unit of the computer and executed when a CPU of the computer reads the program, thereby causing the computer to function as the information processing apparatus. A computer-readable recording medium may be provided having recorded therein the computer program. The recording medium may be a magnetic disk, an optical disk, a magneto-optical disk, and a flash memory, for example. The computer program may be distributed, for example, via a network without using the recording medium.

Hereinafter, preferred embodiments of the present invention will be described in detail with reference to the attached drawings. Note that, in this specification and the attached drawings, structural elements that have substantially the same function and structure are denoted with the same reference numerals, and repeated explanation of these structural elements is omitted.

Third Embodiment

Hereinafter, a voice chat system according to a third embodiment of the present invention will be described in detail.

Figure 29:
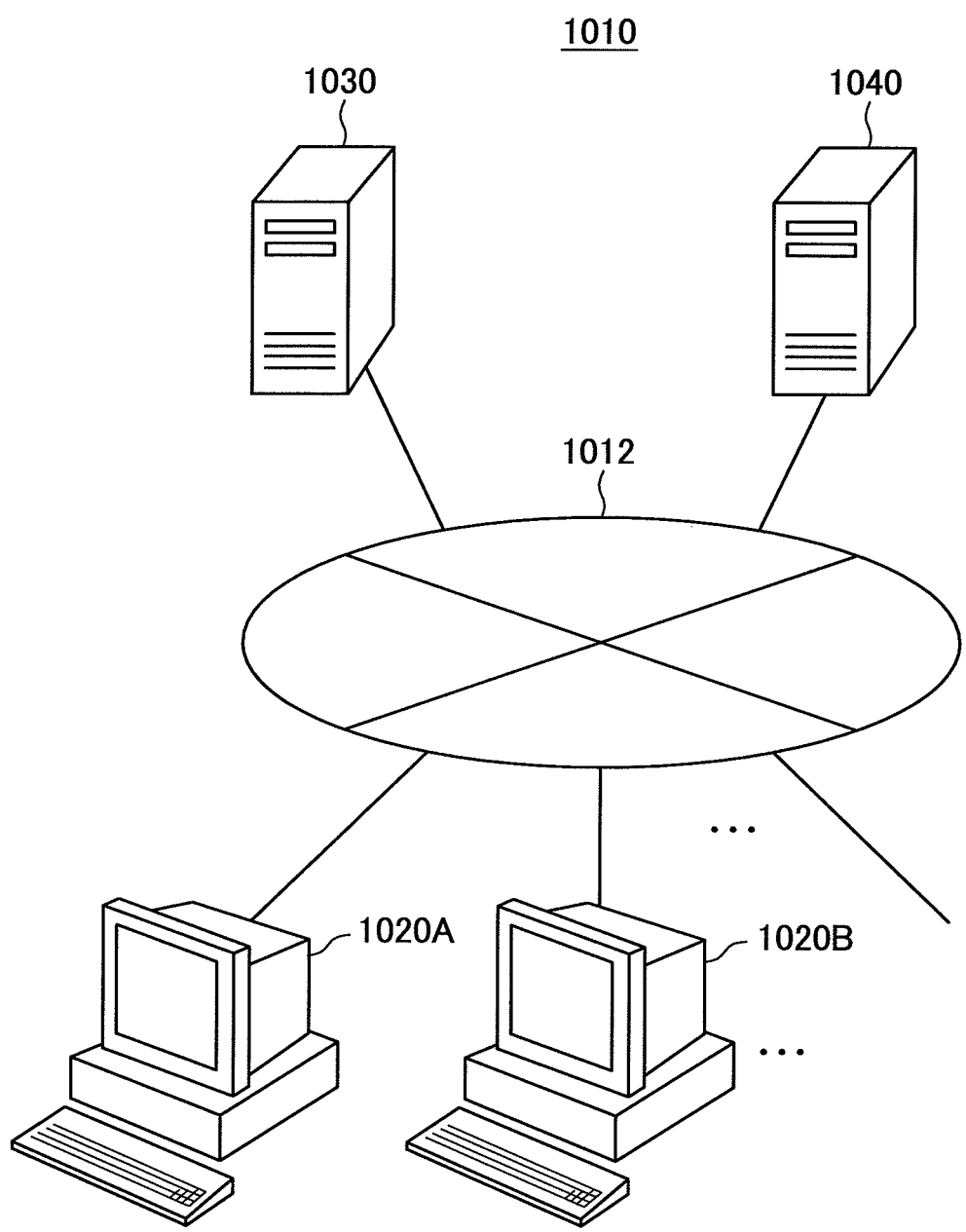
FIG. 29 is an explanatory diagram showing a voice chat system according to a third embodiment of the present invention.

FIG. 29 is an explanatory diagram showing a voice chat system according to a third embodiment. The voice chat system 1010 includes a communication network 1012, a keyword extraction database 1030, a search engine 1040, and information processing apparatuses 1020A and 1020B (hereinafter, sometimes, collectively referred to as information processing apparatus or apparatuses 1020).

The communication network 1012 is a communication network that connects the information processing apparatus 20, the keyword extraction database 1030, and the search engine 1040 to enable bidirectional or unidirectional communication therebetween. The communication network 1012 may be constructed, for example, by a public network, such as Internet, telephone network, satellite communication network, or broadcast communication channel, or a private network, such as WAN (Wide Area Network), LAN (Local Area Network), IP-VPN (Internet Protocol-Virtual Private Network), Ethernet (registered trademark), or wireless LAN. The communication network 1012 may be wired or wireless.

The information processing apparatus 1020 performs a chat (a voice chat) by means of voice with another information processing apparatus 1020 connected thereto via the communication network 1012. The information processing apparatus 1020 can request the keyword extraction database 1030 and the search engine 1040 connected thereto via the communication network 1012 to perform referencing of a database or search of information via the communication network 1012.

The another information processing apparatus 1020 performing the voice chat may be connected thereto via the communication network 1012, as shown in the drawing. Alternatively, the another information processing apparatus 1020 may be directly connected, not via the communication network 1012, to a USB (Universal Serial Bus) port, an IEEE 1394 port such as i.Link, an SCSI (Small Computer System Interface) port, an RS-232C port, and the like.

In the shown example shown in the drawing, the information processing apparatus 1020 is a desktop PC; however, in the present embodiment, the information processing apparatus 1020 may be a notebook PC. In the present embodiment, the information processing apparatus 1020 is not limited to the example described above but may be constructed, for example, by a television set-top checkbox, an information appliance such as a home-use game machine, a mobile phone, a PDA (Personal Digital Assistant), and the like as long as it is a device capable of having a function of communicating via a network. Additionally or alternatively, the information processing apparatus 20 may be a portable device, such as a portable game machine, a PHS, or a portable video/audio player, which is carried by a user who leased it.

In FIG. 29, only two information processing apparatuses 1020 are connected to the communication network 12. However, the present embodiment is not limited to the example, and a plurality of information processing apparatuses 1020 may be connected to the communication network 1012.

The keyword extraction database 1030 is a database that the information processing apparatus 1020 references when the information processing apparatus 1020 extracts keywords from voice data obtained from the content of the conversation during a voice chat. In the keyword extraction database 1030, a variety of information such as the concatenation relationship of the pronunciations, phonemes, and syllables of a word serving as a keyword and the category of the keyword are described. For example, in the keyword extraction database 1030, the higher-rank search keywords of the search engine or the terms that are frequently used as a topic in the blogs are described as keywords. The keyword extraction database 1030 may be a dynamic database that is updated on an as needed basis in accordance with the change of the higher-rank search keywords of the search engine (search server) or the terms frequently used as a topic in the blogs; alternatively, the keyword extraction database 1030 may be a static database. The keywords described in the keyword extraction database 1030 may be processed with a probabilistic latent semantic analysis (PLSA) model or the like and transformed into a form of a suitable topic vector. Here, the topic vector refers to a vector space representation of a topic and is used to determine the commonness of the topic. In addition, recognition weight information described later may be added to the keywords described in the keyword extraction database 1030.

The concatenation relationship of the pronunciations, phonemes, and syllables of a word serving as a keyword refers to a relationship representing how the words described as the keywords in the keyword extraction database 1030 are concatenated (connected) with each other in terms of their pronunciations, phonemes, and syllables. As a method of describing the concatenation relationship, statistical word concatenation probability (n-gram or class n-gram), generation grammar, finite state automaton (FSA) or the like may be used.

The search engine 1040 is a database of a website that users can search for information available through the Internet using keywords or the like. Here, the information may be open to the public or closed. In the present embodiment, the search engine 1040 may provide a full-text search service that allows search of the full text of information in store using a keyword; or it may be a directory service that allows search of information classified by categories.

(Configuration of Information Processing Apparatus 20)

Next, the configuration of the information processing apparatus 1020 according to the present embodiment will be described briefly with reference to FIG. 30.

In the following descriptions, the term "word" refers to a unit that is conveniently treated as a single word in a speech recognition process. It is not necessarily the same as a linguistic word. For example, "タロウ君 (uttered as taroukun)"

may be treated as one word, or may be treated as two words in the form of "tarou" and "kun." Further, a larger unit "こんにちは "タロウ君 (uttered as konnichiwa taroukun)" may be treated as one word.

Additionally, the term "phoneme" refers to a unit that is conveniently treated as a single unit in an acoustic point of view. It is not necessarily the same as a phonetic syllable or phoneme. For example, in the word "東京 (uttered as tou kyou)," the part "tou" may be represented by three phoneme symbols "t/o/u," or "to:," which is a prolonged sound of "o." Further, the part "tou" may be represented by "t/o/o." In addition, a symbol representing a silence may be adopted. Furthermore, symbols that classify the silence as "a silence before an utterance", "a short silence interposed between utterances", "a silence in an utterance", and "a silence corresponding to 'っ (uttered as tsu)" may be adopted.

Figure 30:
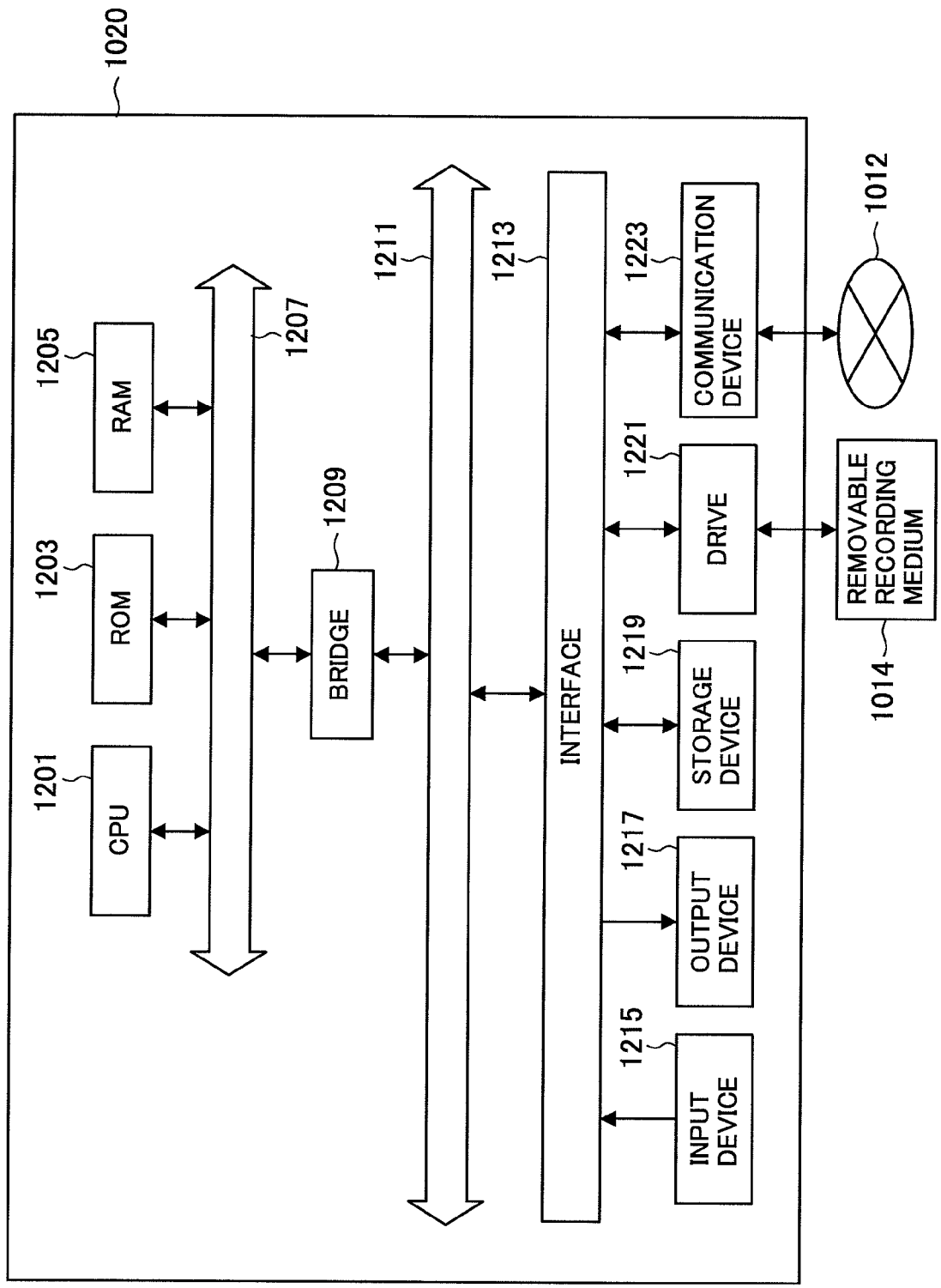
FIG. 30 is a block diagram for explaining the hardware configuration of an information processing apparatus according to the third embodiment.

FIG. 30 is an explanatory diagram showing the hardware configuration of the information processing apparatus 20 according to the present embodiment. The information processing apparatus 1020 includes a central processing unit (CPU) 1201, a read only memory (ROM) 1203, a random access memory (RAM) 1205, a host bus 1207, a bridge 1209, an external bus 1211, an interface 1213, an input device 1215, an output device 1217, a storage device 1219, a drive 1221, and a communication device 1233.

The CPU 1201 functions as an arithmetic processing unit and a control unit. The CPU 1201 controls the overall or a part of the internal operations in the information processing apparatus 120 in accordance with various programs recorded in the ROM 1203, the RAM 1205, the storage device 1219, or a removable recording medium 1014. The ROM 1203 stores the programs, arithmetic parameters, and so on used by the CPU 1201. The RAM 1205 temporarily stores the programs used in execution of the CPU 1201 and the parameters appropriately varying in the execution of the CPU 1201. The CPU 1201, the ROM 1203, and the RAM 1205 are connected to each other via the host bus 1207, such as a CPU bus.

The host bus 1207 is connected to the external bus 1211, such as Peripheral Component Interconnect (PCI) bus, via the bridge 1209.

The input device 1215 includes an operation unit, such as a mouse, a keyboard, a touch panel, buttons, switches, and a lever, operated by a user and a voice input unit, such as a microphone and a headset. The input device 1215 may be a remote control unit (a so-called remote controller) that uses an infrared ray or other electronic wave or may be an externally connected device such as a mobile phone or a PDA corresponding to the operation of the information processing apparatus 1020. The input device 1215 may be an input control circuit that generates an input signal based on information input by the user using the operation unit or the voice input unit and outputs the generated input signal to the CPU 1201. The user of the information processing apparatus 1020 operates the input device 1215 to input a variety of data to the information processing apparatus 1020 or to instruct the information processing apparatus 1020 to perform processing operations.

The output device 1217 may be constructed, for example, by a display unit, such as a cathode ray tube (CRT) display unit, a liquid crystal display (LCD) unit, a plasma display panel (PDP) unit, an electro-luminescence (EL) display unit, or a lamp, an audio output unit including a speaker and a headphone, and a device such as a printer, a mobile phone, or a fax machine, which can notify users of acquired information in a visible or audible manner. The output device 1217 outputs, for example, a variety of information searched by a search server. Specifically, the display unit displays a search result of the variety of information by the search server as a text or an image. Meanwhile, the audio output unit converts the voice data that is played back into a voice to output the voice.

The storage device 1219 is a data storage device which is an example of a storage unit of the information processing apparatus 1020 according to the present embodiment. The storage device 1219 is constructed, for example, by a magnetic storage unit such as a hard disk drive (HDD), a semiconductor storage device, an optical storage device, a magneto-optical storage device, and the like. The storage device 1219 stores the programs or a variety of data executed by the CPU 1201 and a variety of data acquired from the outside.

The drive 1221 is a reader-writer for a storage medium. The drive 1221 is incorporated in the information processing apparatus 1020 or is externally attached to the information processing apparatus 1020. The drive 1221 reads out information recorded in the removable storage medium 1014, such as a magnetic disk, an optical disk, a magneto-optical disk, or a semiconductor memory, which is loaded in the drive 1221, and outputs the readout information to the RAM 1205. The drive 1221 can record information in the removable storage medium 1014, such as a magnetic disk, an optical disk, a magneto-optical disk, or a semiconductor memory, which is loaded in the drive 1221. The removable recording medium 1014 may be, for example, a DVD medium, a HD-DVD medium, a Blu-ray medium, a compact flash (CF), a memory stick, or a secure digital (SD) memory card. The removable recording medium 1014 may be, for example, an electronic device or an integrated circuit (IC) card having mounted thereon a non-contact type IC chip.

The communication device 1223 is a communication interface constructed by a communication device used for connecting to the communication network 1012. The communication device 1223 may be, for example, a communication card for wired or wireless local area network (LAN), Bluetooth or wireless USB (WUSB), a router for optical communication, a router for asymmetric digital subscriber line (ADSL), or a modem for various communication protocols. The communication device 1223 transmits and receives a variety of information to and from the Internet or other communication devices while transmitting and receiving information related to a voice chat with another information processing apparatus 1020. The communication network 1012 connected to the communication device 1223 may be constructed by a network such as the Internet, a home LAN, an infrared communication, or a satellite communication, which is connected in a wired or wireless manner.

With the configuration described above, the information processing apparatus 1020 can perform a voice chat with another information processing apparatus directly connected to the information processing apparatus 1020 or with another information processing apparatus connected thereto via the communication network 1012 while acquiring a variety of information from the keyword extraction database 1030 the search engine 1040 or the like connected thereto via the communication network 1012. Moreover, the information processing apparatus 1020 can take out information stored in the information processing apparatus 1020 using the removable recording medium 1014.

Hereinabove, an example of the hardware configuration that can realize the functions of the information processing apparatus 1020 according to the present embodiment has been described. The components described above may be constructed using a general-purpose element or may be constructed by a specialized hardware that is specialized to the functions of the respective components. Therefore, the hardware configuration can be appropriately modified in accordance with the level of technology at the time of practicing the present embodiment. The hardware configuration described above is merely for illustration purposes, and the invention is by no means limited to this. Some components such as the host bus 1207, the external bus 1211, or the interface 1213 may be omitted depending on the form of use.

Figure 31:
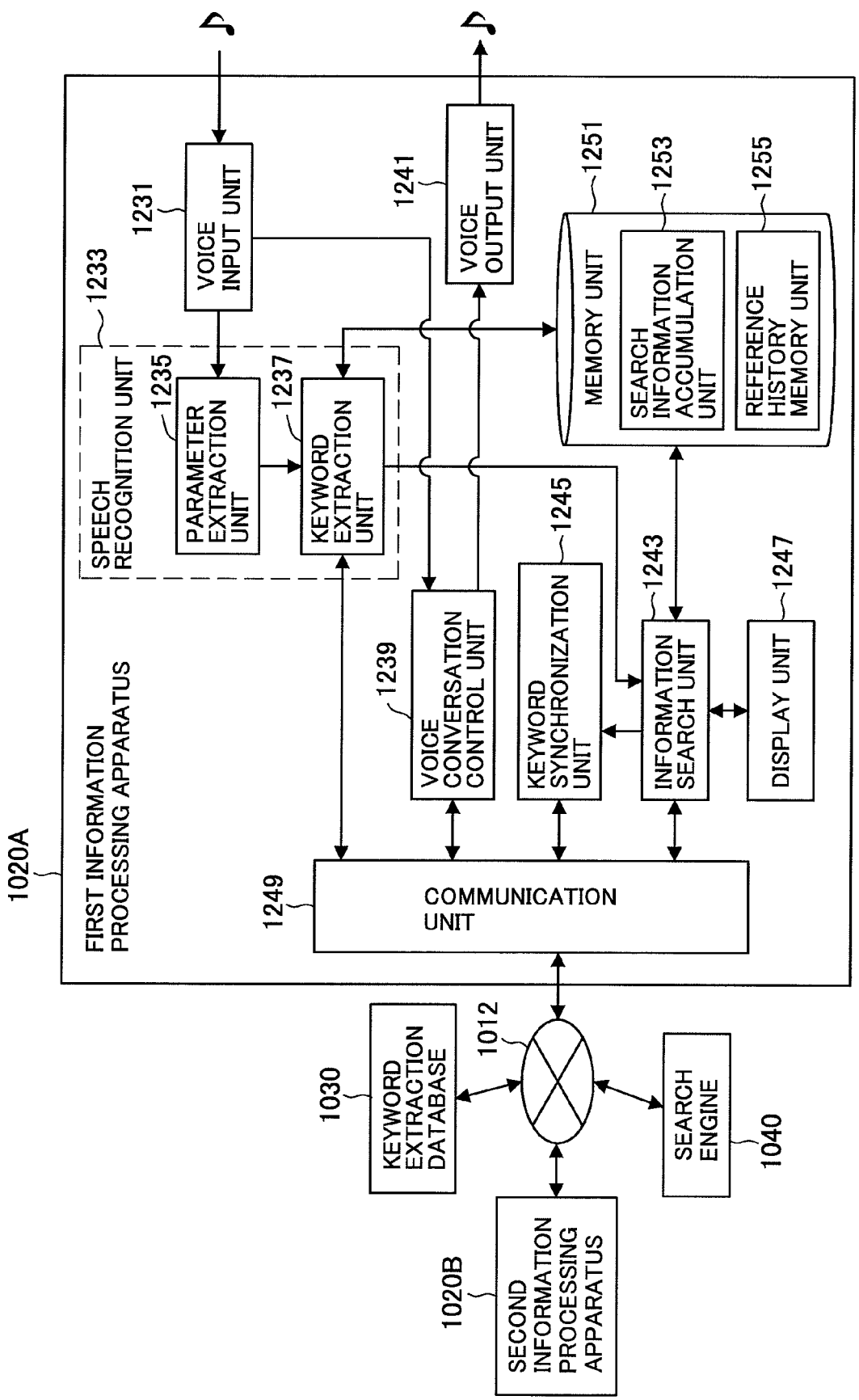
FIG. 31 is a block diagram for explaining the configuration of the information processing apparatus according to the third embodiment.

Next, the configuration of the information processing apparatus 1020 according to the present embodiment will be described in detail. In the following descriptions, two information processing apparatuses 1020 performing a voice chat will be referred to as a first information processing apparatus 1020A and a second information processing apparatus 1020B. The first and second information processing apparatuses 1020A and 1020B generate voice data from the sound of the respective users of the information processing apparatuses and transmit the voice data to the other information processing apparatus, which is a counterpart of the voice chat. FIG. 31 is a block diagram for explaining the configuration of the third information processing apparatus 1020A according to the first embodiment.

The first information processing apparatus 1020A according to the present embodiment includes a voice input unit 1231, a speech recognition unit 1233, a voice conversation control unit 1239, a voice output unit 1241, an information search unit 1243, a keyword synchronization unit 1245, a display unit 1247, a communication unit 1249, and a memory unit 1251.

The voice input unit 1231 is an interface that inputs, to the first information processing apparatus 20A, a dialog of the conversation during a voice chat which is the speech uttered by the user of the first information processing apparatus 1020A. The voice input unit 1231 is constructed, for example, by an input device such as a microphone or a headset, connected to the first information processing apparatus 1020A. The speech of the users uttered to the microphone or headset is automatically input in real time to the first information processing apparatus 1020A. The input analog signal is sampled and quantized through AD conversion and transmitted as voice data, which is a digital signal, to the speech recognition unit 1233 via the voice input unit 1231.

The speech recognition unit 1233 is constructed, for example, by CPU, ROM or RAM. The speech recognition unit 1233 performs real-time based speech recognition based on the voice data transmitted from the voice input unit 1231. The speech recognition unit 1233 further includes a parameter extraction unit 1235 and a keyword extraction unit 1237.

The parameter extraction unit 1235 extracts feature parameters such as Mel Frequency Cepstrum Coefficients (MFCC) and time difference parameter thereof, spectrum of the voice data, power linear predictive coefficients, cepstrum coefficients, and a line spectrum pair, from each frame (at appropriate time intervals) of the generated voice data.

The parameter extraction unit 1235 transmits the extracted feature parameters to the keyword extraction unit 1237. The parameter extraction unit 1237 may store, in the memory unit 1251 described later, the extracted feature parameters.

The keyword extraction unit 1237 extracts keywords from the voice data, which is a digital signal of the speech uttered by the user of the first information processing apparatus 1020A, based on the keyword extraction database 1030 and the feature parameters generated and extracted by the parameter extraction unit 1235. When the keyword extraction unit 1237 extracts the keywords, the keyword extraction unit 1237 can reference the keyword extraction database 1030 connected to the communication network 1012 via the communication unit 1249.

A plurality of keywords is contained in the sentences of the speech uttered by the users during the voice chat. The keyword extraction unit 1237 automatically extracts all the keywords existing in the sentences of the speech. The keyword extraction unit 1237 transmits the extracted keywords to the information search unit 1243 described later. The keyword extraction unit 1237 may store the extracted keywords in the memory unit 1251.

The method of the speech recognition unit 1233 recognizing the voice transmitted from the voice input unit 1231 and extracting keywords from the recognized voice will be described later.

The voice conversation control unit 1239 is constructed, for example, by CPU, ROM, and RAM, and controls the voice chat with the second information processing apparatus 1020B connected via the communication network 1012. The voice conversation control unit 1239 receives the voice data generated by the speech input unit 1231 and transmits the voice data to the second information processing apparatus 1020B via the communication unit 1249. The voice conversation control unit 1239 receives voice data transmitted from the second information processing apparatus 1020B via the communication unit 1249 and transmits the voice data to the voice output unit 1241. The voice conversation control unit 1239 may be configured to store, every time the voice chat is performed, the date the voice chat was performed, an identifier for identifying the voice chat, and an identifier for identifying a counterpart of the voice chat in the memory unit 1251 in a correlated manner.

The voice conversation control unit 1239 may be constructed by a specialized hardware that is specialized to the voice conversation control and may be provided as an application program such as a voice chat program.

The voice output unit 1241 is an interface that receives the voice data of the speech uttered by the user of the second information processing apparatus 1020B and inputs the received voice data to the first information processing apparatus 1020A. The voice output unit 1241 is constructed, for example, by a speaker or an earphone which is an output device connected to the first information processing apparatus 1020A.

The voice data received via the communication unit 1249 from the second information processing apparatus 1020B is output to the user of the first information processing apparatus 1020A via the voice output unit 1241.

The information search unit 1243 stores, in the memory unit 1251, the keywords transmitted from the keyword extraction unit 1237 and the time at which the keywords were transmitted from the keyword extraction unit 1237 in a correlated manner. The information search unit 1243 determines whether or not a keyword synchronization process is to be performed on the keywords transmitted from the keyword extraction unit 1237. When it is determined that the keyword synchronization process should be performed, the information search unit 1243 transmits the keywords to the keyword synchronization unit 1245, thereby requesting the execution of the keyword synchronization process. The information search unit 1243 accesses the search engine 1040 via the communication unit 1249 and performs information search of the keywords transmitted from the keyword extraction unit 1237, thereby acquiring a search result for the keywords and the articles related to the keywords. The information search unit 1243 stores the obtained search result in the search result storage unit 1253 of the memory unit 1251 and transmits the search result to the display unit 1247. Here, the search result that the information search unit 1243 acquires from the search engine 1040 includes a title or an URL of information about the search keyword in the search engine 1040 and a metadata of information, such as a genre of the information.

When requested by the display unit 1247 to acquire more detailed information about a specific keyword or an article related to the keyword, the information search unit 1243 accesses the search engine 1040 via the communication unit 1249 to acquire the more detailed information and stores the specific keyword notified from the display unit 1247 in the reference history memory unit 1255 of the memory unit 1251.

The keyword synchronization unit 1245 transmits the keywords extracted by the keyword extraction unit 1237 from the voice data to the second information processing apparatus 1020B via the communication unit 1249, thereby synchronizing the first and second information processing apparatuses 1020A and 1020B. The keyword synchronization process can be performed not only in the direction from the first information processing apparatus 1020A to the second information processing apparatus 1020B, but also from the second information processing apparatus 1020B to the first information processing apparatus 1020A in the following manner. That is, the first information processing apparatus 1020A may response to the keyword synchronization process initiated by the second information processing apparatus 1020B so that the keywords transmitted from the second information processing apparatus 1020B are received to the first information processing apparatus 1020A.

The display unit 1247 displays the information search result transmitted from the information search unit 1243 to an output device such as a display or the like provided to the first information processing apparatus 1020A via a browser application, for example. The information that the information search unit 1243 acquires from the search engine 1040 contains a URL or the like of the information or articles in the search engine 1040. Therefore, when the user of the first information processing apparatus 1020A selects the displayed information by means of an input device such as a mouse or a keyboard connected to the first information processing apparatus 1020A, the display unit 1247 requests the information search unit 1243 to acquire the details of the selected information.

The communication unit 1249 is a communication device installed in the first information processing apparatus 1020A, for example. The communication unit 1249 relays communication of information via the communication network 1012 between the first information processing apparatus 1020A, specifically, the keyword extraction unit 1237, the voice conversation control unit 1239, the information search unit 1243, and the keyword synchronization unit 1245, and the external device of the first information processing apparatus 1020A, specifically the keyword extraction database 1030, the search engine 1040 or the second information processing apparatus 1020B. Moreover, the communication unit 1249 can communicate information with other information processing apparatus that are directly connected to the first information processing apparatus 1020A not via the communication network 1012.

The memory unit 1251 is a storage device installed in the first information processing apparatus 1020A, for example, and stores therein data such as the keywords extracted by the keyword extraction unit 1237 or the search information acquired by the information search unit 1243. Besides these data, the memory unit 1251 can store therein the voice data generated by the voice input unit 1231 or a variety of databases. Furthermore, the memory unit 1251 may further store therein a variety of parameters that need be stored when the first information processing apparatus 1020A performs a process and progress information of the process. The memory unit 1251 is accessible when the speech recognition unit 1233, the voice conversation control unit 1239, the information search unit 1243, the keyword synchronization unit 1245, or the like freely performs reading or writing to the memory unit 1251. The memory unit 1251 further includes a search information accumulation unit 1253 and a reference history memory unit 1255.

The search information accumulation unit 1253 accumulates the search information acquired by the information search unit 1243 and the information acquisition data in a correlated manner. When it is desired to display once-acquired search information, the information stored in the search information accumulation unit 1253 can be referenced to display the once-acquired search information.

The reference history memory unit 1255 stores, as a reference history, the keywords that the user of the first information processing apparatus 1020A has referenced among the keywords or articles displayed on the display unit 1247 for more detailed information. The reference history is data that includes the referenced keywords, weight information of the referenced keywords, an identifier of the voice chat itself having referenced the keywords, and a counterpart of the voice chat. The reference history stored in the reference history memory unit 1255 may be used when the keyword extraction unit 1237 extracts the keywords.

The information search unit 1243, the keyword synchronization unit 1245, and the display unit 2147 may be constructed by a specialized hardware that is specialized to the respective function and may be provided as an application program such as a speech recognition program.

The configuration of the second information processing apparatus 1020B is substantially the same as the first information processing apparatus 1020A, and descriptions thereof will be omitted.

Hereinabove, an example of the function of the information processing apparatus 1020 according to the present invention has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

(Speech Recognition Method and Keyword Extraction Method)

Figure 32:
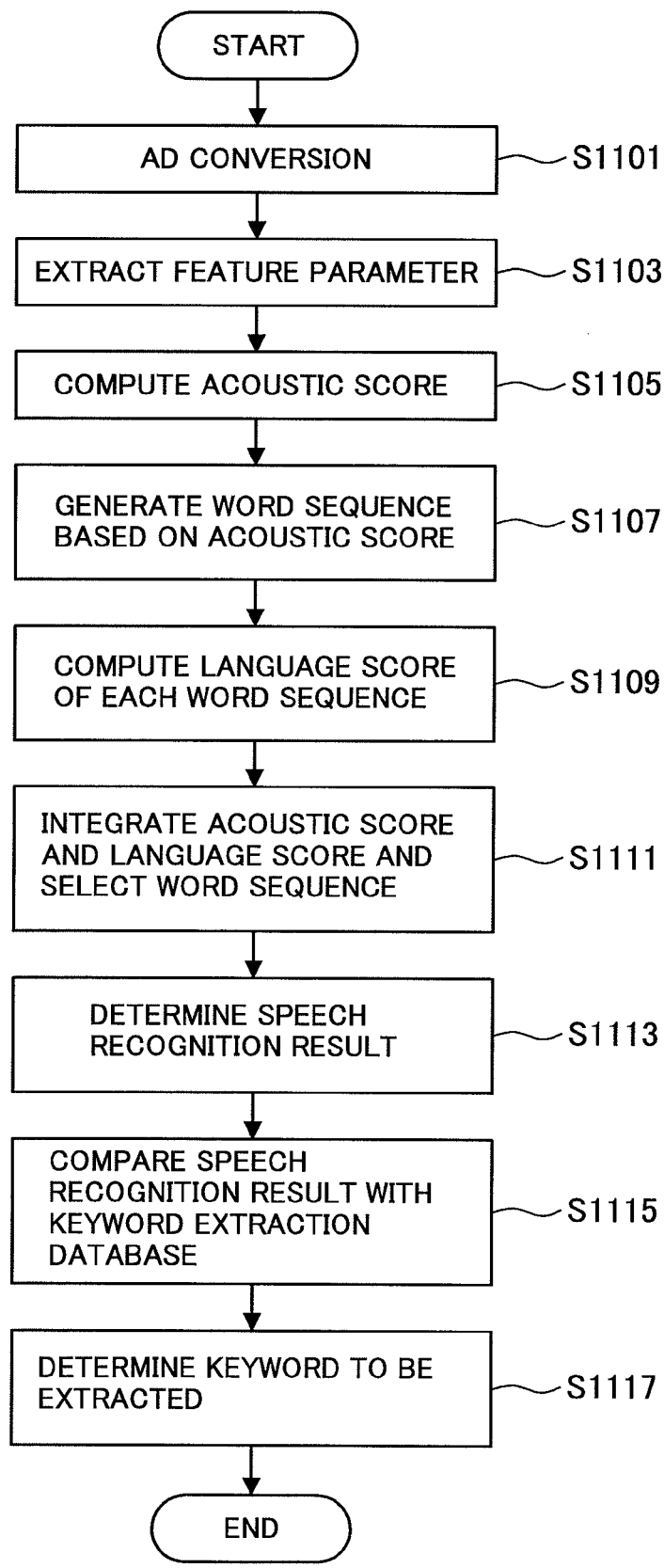
FIG. 32 is a flowchart for explaining an example of a speech recognition method and a keyword extraction method used by the information processing apparatus according to the third embodiment.

Hereinafter, a method of the speech recognition unit 1233 performing speech recognition to extract keywords from a speech recognition result will be briefly described with reference to FIG. 32. The speech recognition method and keyword extraction method used by the speech recognition unit 1233 according to the present embodiment is not limited to the example described below. FIG. 32 is a flowchart for explaining an example of the speech recognition method and keyword extraction method used by the speech recognition unit 1233 according to the present embodiment.

The speech recognition unit 1231 generates voice data from the speech of the user of the first information processing apparatus 1020A input thereto. In the voice input unit 1231, the input user's speech is AD-converted to sample and quantize the speech, which is an analog signal, and the analog speech signal is converted into voice data, which is a digital signal (Step S1101). Upon completion of the conversion to the voice data, the voice input unit 1231 transmits the generated voice data to the speech recognition unit 1233 and the voice conversation control unit 1239.

Subsequently, the parameter extraction unit 1235 extracts feature parameters such as Mel Frequency Cepstrum Coefficients (MFCC) and time difference parameter thereof, spectrum of the voice data, power linear predictive coefficients, cepstrum coefficients, and a line spectrum pair, from each frame (at appropriate time intervals) of the generated voice data (Step S1103).

The keyword extraction unit 1237 calculates a word sequence that is closest to the speech (input voice) input to the voice input unit 1231 as a recognition result and extracts keywords from the recognition result based on the feature parameters acquired from the parameter extraction unit 1235, for example, by referencing the keyword extraction database 1030, an acoustic model, a language model, and dictionaries used in the acoustic model or the language model.

Here, the acoustic model stores therein a model that represents an acoustic feature of individual phonemes, syllables, or the like of the speech to be recognized. As the acoustic model, a Hidden Markov Model (HMM), for example, can be used. As the acoustic model, two models, one for quiet environment (an acoustic model capable of providing high recognition rate under quiet environment) and the other for noisy environment (an acoustic model capable of providing favorable recognition rate under noisy environment) may be provided so that either one of the models can be referenced depending on the environment.

The language model stores therein a model that describes information (concatenation information) representing how the words registered in each dictionary are concatenated (connected). As the language model, statistical word concatenation probability (n-gram or class n-gram), generation grammar, finite state automaton (FSA) or the like may be used.

The language model may store therein concatenation information of a category of the words as well as the concatenation information of the words. For example, when "a category to which the words representing personal names belong" is represented as a symbol "_personal name_" and "a category to which the words representing food belongs" is represented as a symbol "_food_," the language model also describes the concatenation information of "_personal name_" and "_food_"; that is, concatenation between categories and concatenation between the category and the words stored in advance in the dictionary are also described.

Therefore, concatenation information of the words that are not contained in the language model can be acquired. For example, when acquiring concatenation information between "イチロー (uttered as ichiro)" and "は (a particle, uttered as wa)," even though the concatenation information of "イチロー (uttered as ichiro) "is not described in the language model, if it is possible to know that the "イチ (uttered as ichiro)" belongs to a category represented as a symbol "_personal name_," it is possible to acquire the concatenation information between "イチロー (uttered as ichiro) "and "は (a particle, uttered as wa)" by acquiring the concatenation information between "_personal name_" and "は (a particle, uttered as wa).

Upon receiving the voice data from the voice input unit 1231, the keyword extraction unit 1237 generates a word sequence by connecting some of the words in terms of the pronunciations or phonemes of the words based on the acoustic model. The keyword extraction unit 1237 calculates an acoustic score of the generated word sequence based on the acoustic model (Step S1105). Here, the acoustic store is a numeric value that represents how closely the word sequence, which is a result of the speech recognition, resembles the input voice in terms of sound (from the acoustic point of view). The keyword extraction unit 1237 selects a predetermined number of word sequence having higher acoustic score based on the calculated acoustic score.

The keyword extraction unit 1237 may perform matching using a Viterbi decoder based on beam search or a stack decoder base on A* search. Additionally or alternatively, a so-called keyword spotting method may be used in the matching. If "recognition weight" information is added the variety of word dictionaries referenced by the keyword extraction unit 1237, a weight may be applied to a language score described later and the recognition result may be ranked by the weighted score. The recognition weight information is information that describes a recognition weight, which is a correction factor (weight factor) used in calculation of the language score; as the recognition weight has a greater value, the correction value of the language score increases, and thus keywords having a greater recognition weight are highly likely to be adopted as the recognition result. For example, a keyword having a recognition weight of 10 will be speech-recognized with a probability ten times higher than a keyword (i.e., an unweighted keyword) having a recognition weight of 1.

Regarding the determining of the recognition weight, rank information in the search keyword list acquired from the search engine 1040 or frequency of occurrence of keywords in the output of the speech recognition result may be used. Since the search keyword list is a list of search keywords placed on the higher rank in the search engine 1040, ranks may be assigned to the keywords in the descending order of their frequencies of occurrence in the search; a predetermined recognition weight is determined in order of the rank.

Specifically, predetermined coefficients are assigned to the keywords in the descending order of their frequencies of occurrence in the search, and a normalized keyword frequency is multiplied with the assigned coefficients, thereby obtaining the recognition weight. Regarding the acquisition of the search keyword list and the sub-keyword, and the adding of the keyword information, a thesaurus, an ontology database, an encyclopedia, a Japanese language dictionary, or a morphological analysis tool, which is stored in a server connected thereto via the communication network 1020, may be used instead of the search engine 1040. The search engine 1040 may be used in addition to the thesaurus, the ontology database, the encyclopedia, the Japanese language dictionary, and the morphological analysis tool.

Regarding the determining of the recognition weight, information on whether or not the user of the first information processing apparatus 1020A has performed the search of the keywords obtained as the speech recognition result using the search engine 1040 or not, or the preference of the user of the first information processing apparatus 1020A may be used.

Subsequently, the keyword extraction unit 1237 calculates a language score of each selected word sequence based on the language model (Step S1109). Here, the language score is a numeric value for determining whether or not the selected word sequence is suitable for the language model. If grammar or finite state automaton is used as the language model, the language score is a numeric value that indicates whether or not the word sequence is acceptable to the language model. If a statistical language model is used as the language model, the language score is a generation probability of the word sequence. Specifically, if grammar or finite state automaton is used as the language model, when the word sequence is acceptable to the language model, the language score of the word sequence is "1"; when the word sequence is not acceptable to the language model, the language score of the word sequence is "0." When the statistical language model such as n-gram or class n-gram is used as the language model, the generation probability of the word sequence is used as the language score. The detailed method of calculating the language score is described in Japanese Patent Application No. 2001-382579 filed by the present applicant (corresponding to JP-A NO. 2003-186494).

Subsequently, the keyword extraction unit 1237 integrates the acoustic score and the language score calculated in the previous steps and sorts and selects the word sequences by the score (Step S1111), thereby determining the word sequence having the greatest integrate score as a recognition result (Step S1113). Specifically, the keyword extraction unit 1237 determines as the recognition result, the word sequence that maximizes the product or the logarithmic sum of the acoustic score acquired from the acoustic model and the language score acquired from the language model. When information such as a recognition weight of words is added to the dictionaries used in the language model, a language score having the recognition weight information incorporated therein may be used.

With this, a word sequence that is most feasible from the acoustic and linguistic points of view is determined as the recognition result.

Subsequently, the keyword extraction unit 1237 accesses the keyword extraction database 1030 via the communication unit 1249 to compare the speech recognition result with the keywords registered in the keyword extraction database 1030 (Step S1115). If a word registered in the keyword extraction database 1030 is contained in the speech recognition result, the keyword extraction unit 1237 determines that the word contained in the speech recognition result is to be extracted (Step S1117).

The keyword extraction unit 1237 may be configured to access the second information processing apparatus 1020B, which is a counterpart of the voice chat, before accessing the keyword extraction database 1030, so as to exchange the recognition result of the voice chat. For example, by exchanging voice information or the speaker's way of talking, it is possible to increase the accuracy of the speech recognition. In order to validate the speech recognition results of the information processing apparatuses, the topic vectors of the speech recognition results may be exchanged.

By using the speech recognition method and the keyword extraction method described above, it is possible not only to appropriately recognize the content of the conversation during the voice chat but also appropriately extract keywords from the speech recognition result.

(Keyword Synchronization Method)

Figure 33:
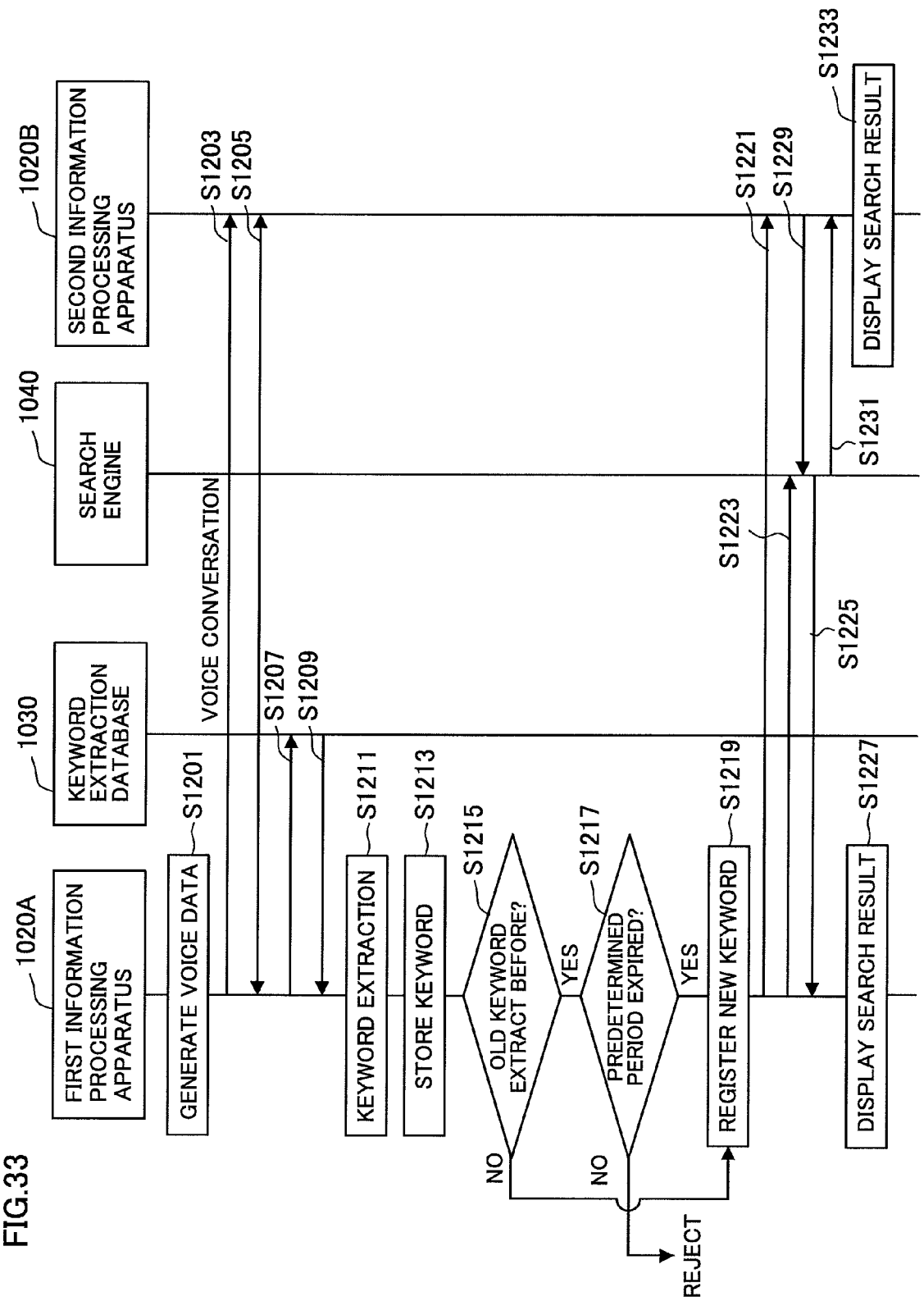
FIG. 33 is a flowchart for explaining a keyword synchronization method in the voice chat system according to the third embodiment.

Next, a keyword synchronization method in the voice chat system according to the present embodiment will be described in detail with reference to FIG. 33. FIG. 33 is a flowchart for explaining the keyword synchronization in the voice chat system according to the third embodiment. FIG. 33 shows the case in which the user of the first information processing apparatus 1020A utters sounds to the second information processing apparatus 1020B.

When the user of the first information processing apparatus 1020A utters sounds toward the voice input unit 1231 such as a microphone or a headset connected to the first information processing apparatus 1020A, the voice input unit 2131 generates voice data from the sound uttered by the user (Step S1201). The generated voice data is transmitted to the parameter extraction unit 1235 and the voice conversation control unit 1239. The voice conversation control unit 1239 transmits the generated voice data to the second information processing apparatus 1020B via the communication unit 1249 so that a voice conversation is made between the first and second information processing apparatuses 1020A and 1020B (Step S1203).

The parameter extraction unit 1235 transmits the voice data and a variety of extracted parameters to the keyword extraction unit 1237, and the keyword extraction unit 1237 performs speech recognition on the voice data in order to extract keywords from a speech recognition result. Subsequently, the keyword extraction unit 1237 exchanges the speech recognition result with the second information processing apparatus 1020B via the communication unit 1249 (Step S1205) in order to increase the accuracy of the speech recognition result. Thereafter, the keyword extraction unit 1237 accesses the keyword extraction database 1030 connected to the communication network 1012 via the communication unit 1249 (Step S1207). The keyword extraction database 1030 issues a reference permit to the first information processing apparatus 1020A, allowing referencing databases registered therein (Step S1209). The keyword extraction unit 1237 of the first information processing apparatus 1020A extracts keywords by referencing the keyword extraction database 1030 (Step S1211).

When extracting the keywords, the keyword extraction unit 1237 may be configured to access the search engine 1040 or the like and extract the higher-rank search keywords of the search engine 1040 or the terms that are frequently used as a topic in the blogs on a preferential basis. The topics of the voice chat are often topics that are in fashion at the time of the voice chat. Therefore, keywords related to such topics are highly likely to be the higher-rank search keywords of the search engine 1040 or the terms that are frequently used as a topic in the blogs. Therefore, by extracting such keywords on a preferential basis, the keyword extraction can be performed more efficiently.

Subsequently, the keyword extraction unit 1237 transmits the extracted keywords to the information search unit 1243 and the information search unit 1243 stores the transmitted keywords in the memory unit 1251 in a correlated manner with the transmission time (Step S1213). Subsequently, the information search unit 1243 determines whether or not the transmitted keywords are an old keywords that were extracted before during the current voice chat (Step S1215). If the transmitted keywords are new keywords that were not extracted before, the keyword extraction unit 1237 newly registers the keywords (Step S1219).

If the transmitted keywords are old keywords, the information search unit 1243 searches for the transmission time of the old keywords and determines whether or not a predetermined period (for example, 5 minutes) has expired after the transmission time (Steps S1217). The predetermined period used in the above determining step is not limited to this and may be set to an arbitrary period. If the predetermined period has not expired after the transmission time of the old keywords, the information search unit 1243 rejects the transmitted keywords, and the keyword extraction process is finished. If the predetermined period has expired after the transmission time of the old keywords, the information search unit 1243 updates the transmission time of the new keywords and newly registers the keywords (Step S1219).

When the keywords are newly registered, the information search unit 1243 transmits the newly registered keywords to the keyword synchronization unit 1245. Upon receiving the keywords, the keyword synchronization unit 1245 transmits the transmitted keywords to the second information processing apparatus 1020B via the communication unit 1249 (Step S1221). With such transmitting process, a synchronization process that synchronizes the keywords extracted by the first information processing apparatus 1020A to the second information processing apparatus 1020B, which is a counterpart of the voice chat, is made. Here, the synchronization process only involves exchanging of the keywords. Therefore, there is no need to prepare a synchronization area on the memory of the information processing apparatus.

In the first information processing apparatus 1020A in which the new keywords are registered, the information search unit 1243 accesses the search engine 1040 connected to the communication network 1012 via the communication unit 1249 (Step S1223) and acquires the search result for the new keywords and metadata that describes URLs or the like of the articles related to the keywords (Step S1225). Thereafter, the information search unit 1243 stores the acquired information in the search information accumulation unit 1253 and transmits the acquired information to the display unit 1247. Subsequently, the display unit 1246 displays the transmitted information on a display device via a browser or the like (Step S1227).

In the second information processing apparatus 1020B to which the keywords are transmitted, determinations on whether or not the keywords are old and, if old, whether or not a predetermined period has expired are performed independent from the first information processing apparatus 1020A. If the keywords are not old, or although old if the predetermined period has expired, the second information processing apparatus 1020B newly registers the transmitted keywords.

Thereafter, the second information processing apparatus 1020B accesses the search engine 1040 (Step S1229) and acquires metadata that describes URLs or the like of the transmitted keywords (Step S1231). As same in the first information processing apparatus 1020A, the second information processing apparatus 1020B stores the acquired information in the search information accumulation unit 1253 and transmits the acquired information to the display unit 1247. Subsequently, the display unit 1247 displays the transmitted information on a display device via a browser or the like (Step S1233).

The process steps from the step of inputting the content of the conversation during the voice chat into the first information processing apparatus 1020A to the step of synchronizing keywords to display the search result for information related to the keywords are automatically performed by the first information processing apparatus 1020A. Therefore, the user of the first information processing apparatus 1020A does not need to do any special operations for the speech recognition, keyword detection, and keyword synchronization process. Accordingly, the user of the first information processing apparatus 1020A can concentrate on the voice chat. Meanwhile, in the second information processing apparatus 1020B, the keyword synchronization process and the information search result displaying process are also automatically performed. The user of the second information processing apparatus 1020B does not need to do any special operations for such process and can concentrate on the voice chat.

As described above, the first information processing apparatus 1020A performs keyword extraction based on the sound uttered by the user of the first information processing apparatus 1020A and then performs keyword synchronization with respect to the second information processing apparatus 1020B. As a result, the first information processing apparatus 1020A that has performed keyword extraction and the second information processing apparatus 1020B, in which the keyword synchronization has been made, perform search using the search engine 1040 and display the search results in an independent manner from each other. With such a process, on the display devices of the first and second information processing apparatuses 1020A and 1020B, the same keywords and the same articles related to the keywords are displayed substantially simultaneously with small time lag corresponding to the inherent communication delay. Since the information related to the keywords is also displayed, it is possible to automatically provide information that can be used as a topic of the voice chat and to thus broaden the conversation of the voice chat.

It has been described for the case in which the user of the first information processing apparatus 1020A utters sounds to the second information processing apparatus 1020B. However, the above-described process can be similarly performed for the case in which the user of the second information processing apparatus 1020B utters sounds to the first information processing apparatus 1020A. In this case, the second information processing apparatus 1020B performs generation of the voice data and extraction of the keywords, obtains newly registered keywords, and performs the keyword synchronization process with respect to the first information processing apparatus 1020A. As a result, search of the keyword related information and display of the search result are performed by the first and second information processing apparatuses 1020A and 1020B in an independent and parallel manner similar to the manner described above. In this way, the inputting (generating of the voice data) of the conversation during a voice chat and the extracting of the keywords are processed by the respective information processing apparatuses in an independent and parallel manner.

When the voice chat between the first and second information processing apparatuses 1020A and 1020B ends, the keywords and the temporary information related to the keywords registered in the information processing apparatuses 1020A and 1020B are deleted, and new keywords are registered in later use.

In the above description, the keyword extraction database 1030 is independently connected to the communication network 1012 connected to the first information processing apparatus 1020A. The keyword extraction database 1030 may be provided in the first information processing apparatus 1020A. In this case, the keyword extraction database 1030 is stored, for example, in a database memory unit of the first information processing apparatus 1020A. When the keyword extraction database 1030 is provided in the first information processing apparatus 1020A, it is possible to obviate the communication time lag during keyword extraction. Therefore, the keyword extraction can be performed in a shorter period. The database memory unit may be independently provided in the first information processing apparatus 1020A or may be provided in the memory unit 1251 of the first information processing apparatus 1020A.

In the above description, the search engine 1040 is independently connected to the communication network 1012 connected to the first information processing apparatus 1020A. However, the first information processing apparatus 1020A may include the search engine 1040. When the search engine 1040 is provided in the first information processing apparatus 1020A, it is possible to obviate the communication time lag during information search. Therefore, the information search can be performed in a shorter period.

(Search Result Display Screen)

Next, an example of an information search result display screen according to the present embodiment will be described in detail with reference to FIG. 34. FIG. 34 is an explanatory diagram showing an example of search information display by the information processing apparatus according to the third embodiment.

A search result display screen 1050 displays keywords detected during a voice chat on a display screen in an updated manner. On the display screen, newer keywords are placed on the upper part, and older keywords are placed on the lower part. The maximum number of keywords displayable on one screen can appropriately be set. When the number of keywords exceeds the maximum, the lowermost keyword on the screen is deleted first.

In the example of FIG. 34, keywords are displayed in column 1503 with an index number in column 1501 that is assigned in order of their registration time. Newer keywords, i.e., the keywords in column, 1503 having greater index number in column 1501 are displayed on the upper part. Besides the index number column 1501 and the keyword column 1503, the display screen includes a pin lock checkbox column 1505 and a delete checkbox column 1507. The pin lock checkbox and the delete checkbox are provided to the respective keywords. The pin lock checkbox is used to lock the keywords so that the locked keywords remain on the screen. The delete checkbox is used to select the keywords to be deleted when the displayed contents are updated.

The keywords in column 1503 are linked to their search result display screens showing the search result when the keywords in column 1503 are searched using the search engine 1040. When the keywords in column 1503 are clicked using a mouse pointer, for example, users can see the search result for the keywords by the search engine 1040.

If the pin lock checkbox in column 1505 is checked, the keyword of which the pin lock checkbox is checked is moved to the uppermost part and locked. Thus, even when new keywords are displayed on the screen, the locked keyword is not moved down. If there are plural locked keywords, they may be displayed in order of their registration time.

Among the registered keywords extracted from the dialog of the conversation during the voice chat, there may be one that is of no use to the user of the information processing apparatus in the voice chat. In such a case, by checking the delete checkbox in column 1507 beside the corresponding keyword, the keyword can be deleted when the displayed contents are updated.

Regarding one keyword in column 1503, not only the representation of the keyword but also the articles related to the keyword in column 1503 described in the search engine 1040 are displayed, for example, in thumbnails in column 1509 below the corresponding keyword in column 1503. The articles in column 1509 related to the keyword are linked to the full-text of the articles described in the search engine 1040 when users click on the articles in column 1509 using a mouse pointer, for example. The pin lock checkbox in column 1505 and the delete checkbox in column 1507 are also provided to the respective articles in column 1509. The number of articles related to the keyword in column 1503 displayable in column 1509 is not limited to that illustrated in the drawing but can be set arbitrarily. The articles displayed in column 1509 of the search result display screen 1050 may be one that is frequently referenced in the search engine 1040.

In the example of the display screen 1050 shown in FIG. 34, keywords, "カシム (personal name, uttered as Cassim), " "代表 (representative, uttered as daihyou), " "イエメン (country name, Yemen)," "千葉 (place name, Chiba), " "牧 (uttered as boku)," are extracted in this order during a voice chat. Since the pin lock checkbox of the keyword, "カシム (personal name, uttered as Cassim)," is checked, although it is the oldest keyword of the registered keywords, it is displayed on the uppermost part of the display screen 1050. The delete checkboxes of the keyword "代表 (representative, uttered as daihyou)" and the information "新潟市牧支所ホームページ (Niigata City Council of Social Welfare Homepage)" related to the keyword "牧 (uttered as boku)" are checked. Therefore, such a keyword and keyword-related information is deleted when the displayed contents are updated.

Regarding the keywords displayed in column 1503 of the display screen 1050, the same keywords are displayed substantially simultaneously on the screens of the information processing apparatuses 1020 of the respective speakers in the voice chat by the keyword synchronization unit 1245 installed in the information processing apparatuses 1020. However, since the checking of the pin lock checkbox and the delete checkbox is independently operated by the respective speakers, different contents may be displayed on the respective display screens 105 of the information processing apparatuses 1020 with the progress of the voice chat.

(Reference History Data of Search Information)

Next, a method of using a reference history of the search information during keyword extraction according to the present embodiment will be described with reference to FIG. 35. FIG. 35 is an explanatory diagram showing reference history data of the search information according to the third embodiment.

In the information processing apparatus 1020 according to the present embodiment, the keywords in column 1503 selected by the user of the information processing apparatus 1020 on the search result display screen 1050 are stored as reference history data in the reference history memory unit 1255 in a correlated manner with information as shown in FIG. 35, for example.

As shown in FIG. 35, the reference history data includes a keyword in column 1601 selected by the user, weight information in column 1603 representing the number of selections of the keyword in column 1601, session ID information in column 1605, which is an identifier for identifying a voice chat in which the keyword in column 1601 is selected, and conversational counterpart information in column 1607 representing a counterpart in each voice chat to which is assigned the session ID.

The weight information in column 1603 is information representing the number of selections of the keyword in column 1601 in the voice chat system 1010 of the present embodiment. In the reference history information shown in FIG. 35, a keyword, "ジャパンカップ (Japan Cup)", is totally selected twice; and keywords, "ザンブロック" and "牧" are selected once, respectively.

In the voice chat system according to the present embodiment, whenever a voice chat is performed, a session ID in column 1605 including the data of the voice chat and a session number of the voice chat during the date is assigned to each voice chat session. In the reference history data shown in FIG. 35, the keyword, "ジャパンカップ (Japan Cup)," is selected twice: once in a voice chat of a session ID "200609150001"; and once in a voice chat of a session ID "200609150002."

The conversational counterpart information in column 1607 is data representing a counterpart of a voice chat in which the keyword in column 1601 is selected. In the reference history data shown in FIG. 35, the keyword, "ジャパンカップ (Japan Cup)," is selected twice by two participants: once by a participant "A" in a voice chat of a session ID "200609150001"; and once by a participant "B" in a voice chat of a session ID "200609150002."

In the information processing apparatus 1020 according to the present embodiment, such reference history data can be used in extraction of keywords from the voice data. By using the reference history data, it is possible to acquire information such as directivity of the conversational counterpart on a topic or relatedness between words. With such information, the speech recognition or the keyword extraction can be performed more efficiently. Hereinafter, the way the reference history information is used will be described briefly.

The keyword extraction unit 1237 according to the present embodiment can reference the reference history memory unit 1255, in which the above-described reference history data is stored, when performing speech recognition, to use a variety of information contained in the reference history data as one of the parameter information used in the speech recognition. For example, when performing speech recognition, the keyword extraction unit 1237 can increase the speech recognition priority of a keyword having a greater number in the weight information column 1603 of the reference history data by referencing the reference history memory unit 1255. Accordingly, the speech recognition can be performed efficiently.

When a keyword recognized by the keyword extraction unit 1237 is registered in the reference history data, the speech recognition priority of another keyword selected in a chat session having the same session ID as the registered keyword can be increased. This is because it is predicted that the keywords having the same session ID have strong are strongly related to each other.

When a keyword recognized by the keyword extraction unit 1237 is registered in the reference history data, the speech recognition priority of another keyword selected by the same conversational counterpart as the registered keyword can be increased. This is because it is predicted that the keywords selected during the voice chat by the same conversational counterpart are coincident with each other in terms of the directivity of the conversational counterpart on a topic.

As described above, according to the information processing apparatus 1020 of the present embodiment, by effectively feeding back the reference history data, it becomes possible to perform the speech recognition and the keyword extraction more efficiently.

Modified Example of Information Processing Apparatus

Figure 36A:
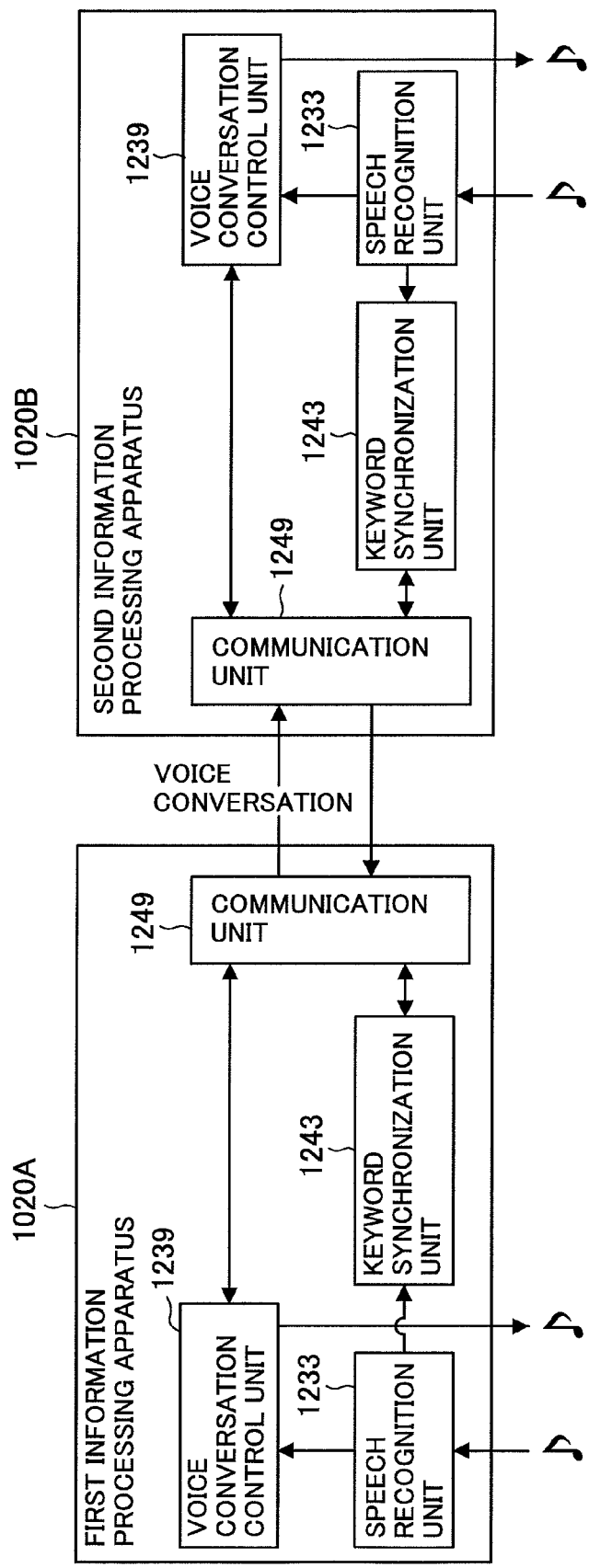
FIG. 36A is a simplified block diagram for explaining a speech recognition method of the information processing apparatus according to the third embodiment.
Figure 36B:
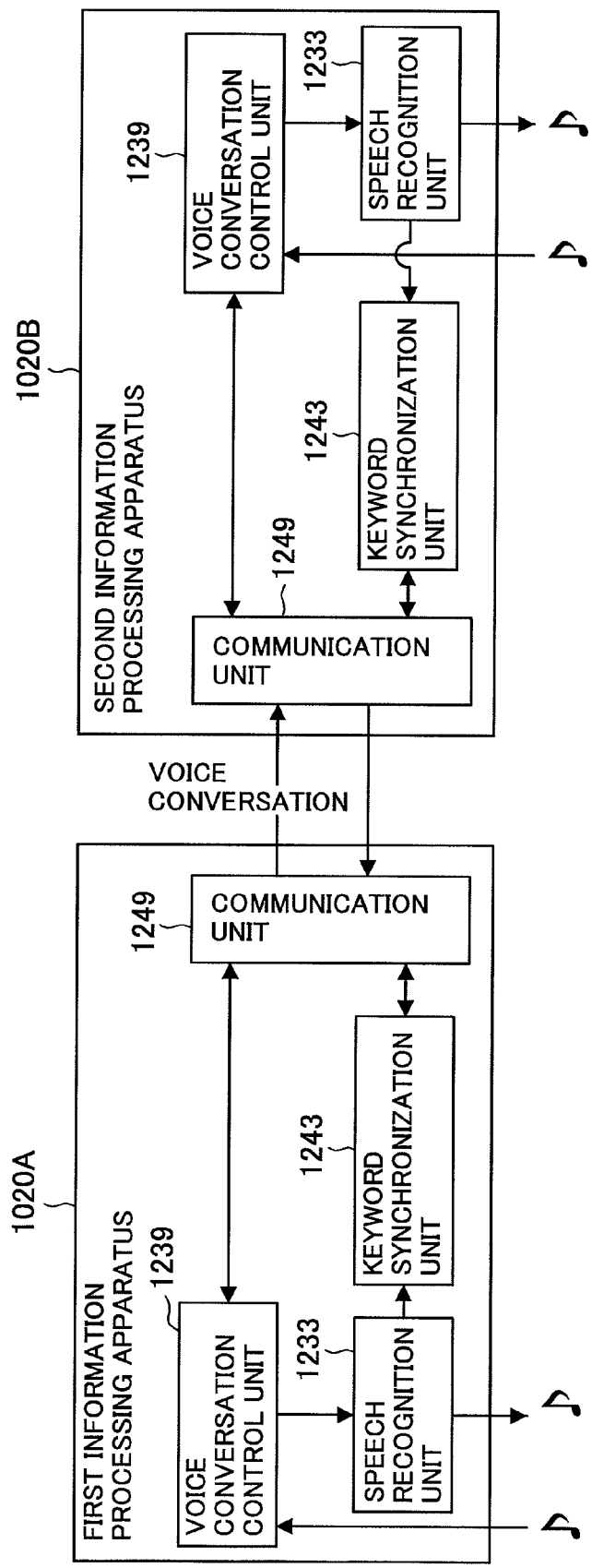
FIG. 36B is a simplified block diagram for explaining a first modified example of the speech recognition method of the information processing apparatus according to the third embodiment.

Next, a modified example of the information processing apparatus 1020 according to the present embodiment will be described briefly with reference to FIGS. 36A to 36D. FIG. 36A is a simplified block diagram for explaining a speech recognition method of the information processing apparatus according to the third embodiment. FIGS. 36B to 36D are simplified block diagrams for explaining modified examples of the speech recognition method of the information processing apparatus according to the third embodiment.

In the information processing apparatuses 1020A and 1020B shown in FIGS. 36A to 36D, only some of the processing units of the respective information processing apparatuses are illustrated. Needless to say, in addition to the processing units illustrated, processing units illustrated in FIG. 31 are also included in the information processing apparatuses.

In the information processing apparatus 1020 according to the present embodiment, as shown in FIG. 36A, it has been described for the case in which the first and second information processing apparatuses 1020A and 1020B performing a voice chat receive sounds uttered by the corresponding users to cause the speech recognition unit 1233 to perform speech recognition and cause the keyword synchronization unit 1245 to perform a keyword synchronization process. However, the information processing apparatus of the present embodiment may be modified in the following manner.

First Modified Example

A first modified example of FIG. 36B shows the case in which the information processing apparatuses 1020A and 1020B performing a voice chat transmit sounds uttered by the corresponding users as it is to their counterpart information processing apparatuses and perform speech recognition on the received sounds uttered by the users of the counterpart information processing apparatuses.

Specifically, the sounds uttered by the user of the first information processing apparatus 1020A are transmitted as it is to the second information processing apparatus 1020B via the voice conversation control unit 1239 and the communication unit 1249 and speech-recognized by the second information processing apparatus 1020B. Likewise, the sounds uttered by the user of the second information processing apparatus 1020B are transmitted as it is to the first information processing apparatus 1020A via the voice conversation control unit 1239 and the communication unit 1249 and speech-recognized by the first information processing apparatus 1020A. In the present modified example, the speech recognition, the keyword extraction, and the keyword-related information search are performed in both the first and second information processing apparatuses 1020A and 1020B.

Second Modified Example

A second modified example of FIG. 36C shows the case in which the speech recognition is performed in only one of the information processing apparatuses and the keyword synchronization and the information search are performed in the other information processing apparatus. Specifically, the speech recognition is performed in the first information processing apparatus 1020A, and the keyword synchronization process is performed in the second information processing apparatus 1020B. The sounds uttered by the user of the first information processing apparatus 1020A are speech-recognized and keyword-extracted by the speech recognition unit 1233 and are then transmitted to the second information processing apparatus 1020B. Then, the second information processing apparatus 1020B performs the keyword synchronization process and the search of the keyword-related information. The sounds uttered by the user of the second information processing apparatus 1020B are transmitted as it is to the first information processing apparatus 1020A and are then speech-recognized and keyword-extracted by the speech recognition unit 1257.

In the example of FIG. 36C, the speech recognition is performed independently in the first information processing apparatus 1020A. However, the speech recognition may be performed independently in the second information processing apparatus 1020B. In the example of FIG. 36C, two independent speech recognition units are provided in the first information processing apparatus 1020A. However, the above-described speech recognition may be performed by only one speech recognition unit. The present modified example is useful when the processing capability of one information processing apparatus is far superior to the other information processing apparatus, and vice-versa.

Third Modified Example

A third modified example of FIG. 36D shows the case in which the speech recognition is rarely performed in the information processing apparatuses but in the server 1016 that relays the connection between the information processing apparatuses, and the apparatuses perform only the keyword synchronization and the information search. Specifically, the sounds uttered by the user of the first information processing apparatus 1020A are transmitted as it is to the server 1016 and are speech-recognized by the speech recognition unit 1163 of the server 1016 to be transmitted to the second information processing apparatus 1020B. Meanwhile, the sounds uttered by the user of the second information processing apparatus 1020B are transmitted as it is to the server 1016 and are speech-recognized by the speech recognition unit 1163 of the server 1016 to be transmitted to the first information processing apparatus 1020A. In the example of FIG. 36D, two independent speech recognition units are provided in the server 1016. However, the above-described speech recognition may be performed by only one speech recognition unit.

Fourth Embodiment

Hereinafter, a keyword extraction system according to a fourth embodiment of the present invention will be described in detail.

Figure 37:
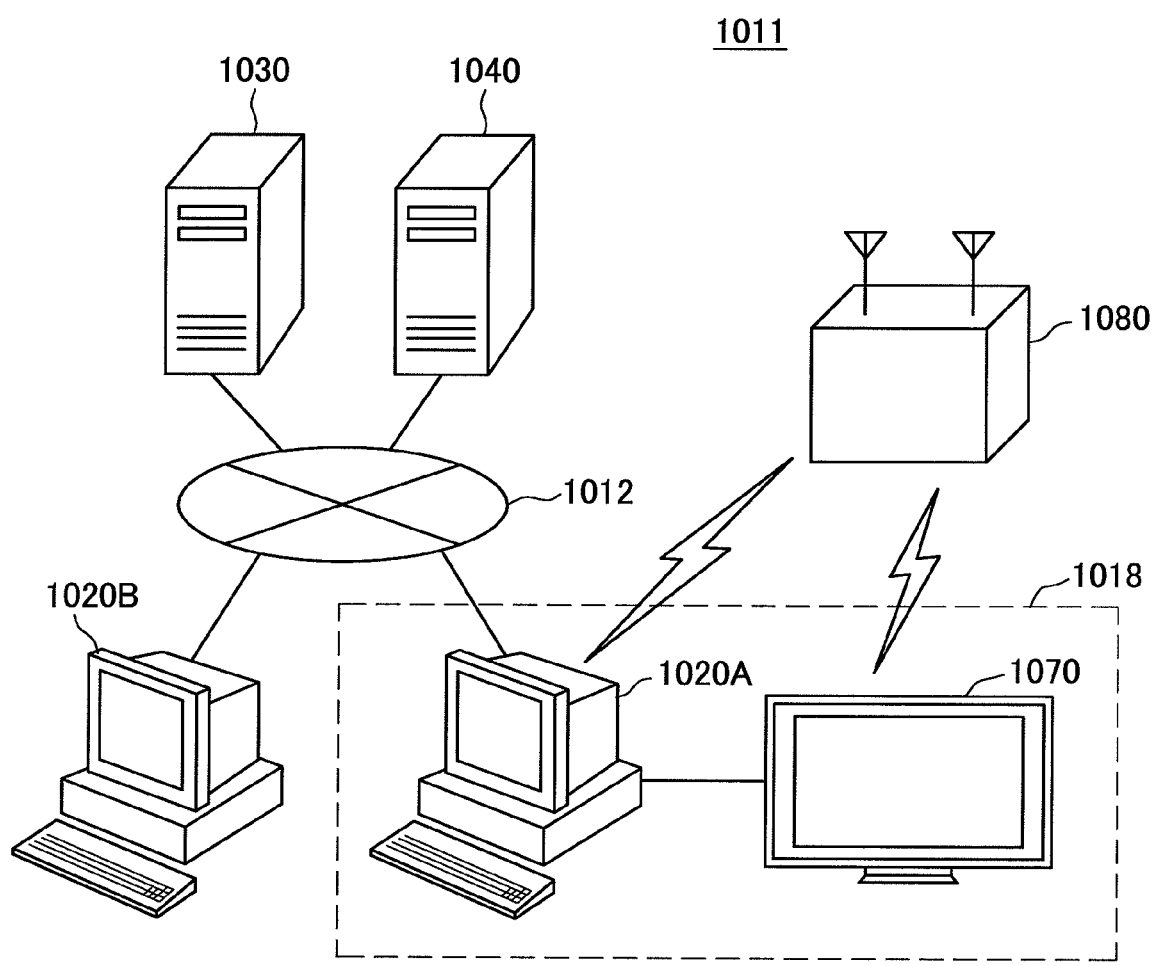
FIG. 37 is an explanatory diagram showing a keyword extraction system according to a fourth embodiment of the present invention.

FIG. 37 is an explanatory diagram showing the configuration of a keyword extraction system according to the fourth embodiment of the present invention. As shown in FIG. 37, the keyword extraction system 1011 according to the present embodiment includes a communication network 1012, a keyword extraction database 1030, a search engine 1040, and information processing apparatuses 1020A and 1020B (hereinafter, sometimes, collectively referred to as information processing apparatus or apparatuses 1020). The information processing apparatus 1020A is connected to an external display device 1070 within a home network 1018. The information processing apparatuses 1020A and 1020B and the external display device 1070 can receive broadcast information transmitted from a broadcasting station 1080.

The communication network 1012, the keyword extraction database 1030, and the search engine 1040 have the same configuration and provides substantially the same effect as communication network 1012, the keyword extraction database 1030, and the search engine 1040 according to the third embodiment, and detailed descriptions thereof will be omitted.

The information processing apparatus 1020 performs a chat (a voice chat) by means of voice with another information processing apparatus 1020 connected thereto via the communication network 1012. The information processing apparatus 1020 can request the search engine 1040 connected thereto via the communication network 1012 to perform referencing of a database or search of information via the communication network 1012.

The another information processing apparatus 1020 performing the voice chat may be connected to the information processing apparatus 1020 via the communication network 1012, as shown in the drawing. Alternatively, the another information processing apparatus 1020 may be directly connected to the information processing apparatus 1020, not via the communication network 1012, to a USB port, an IEEE 1394 port such as i.Link, an SCSI port, an RS-232C port, and the like.

The information processing apparatus 1020 is connected to the external display device 1070 described later within the home network 1018; therefore a variety of data can be communicated between the information processing apparatus 1020 and the external display device 1070. The connection between the information processing apparatus 1020 and the external display device 1070 may be performed via a connection port such as HDMI-CEC (high-definition multimedia interface-consumer electronics control). The information processing apparatus 1020 can receive a broadcast wave containing the broadcast information transmitted from the broadcasting station 1080 described later using a receiving function provided therein.

In the shown example shown in the drawing, the information processing apparatus 1020 is a desktop PC; however, in the present embodiment, the information processing apparatus 1020 may be a notebook PC.

In the present embodiment, the information processing apparatus 1020 is not limited to the example described above but may be constructed, for example, by a television set-top checkbox, an information appliance such as a home-use game machine, a mobile phone, a PDA, and the like as long as it is a device capable of having a function of communicating via a network. Additionally or alternatively, the information processing apparatus 1020 may be a portable device, such as a portable game machine, a PHS, or a portable video/audio player, which is carried by a user who leased it.

The external display device 1070 is a display unit, such as a CRT display unit, a liquid crystal display unit, a plasma display panel unit, or an electro-luminescence (EL) display unit. The external display device 1070 receives the broadcast wave containing the broadcast information transmitted from the broadcasting station 1080 described later and displays the content of the broadcast information on a display area of the display unit. Here, the broadcast information transmitted from the broadcasting station refers to data such as broadcast text information, broadcast audio information, or video information, provided through a terrestrial digital broadcasting such as a one-segment digital broadcasting or a 12-segment digital broadcasting (hereinafter, referred to as full-segment digital broadcasting), a cable broadcasting, or an Internet broadcasting via a network. The broadcast wave containing the broadcast information refers to a wave of the terrestrial digital broadcasting such as the one-segment digital broadcasting or the full-segment digital broadcasting. The external display device 1070 can transmit the received broadcast information to the information processing apparatus 1020 via a connection port such as HDMI-CEC. The external display device 1070 can receive a variety of data transmitted from the information processing apparatus 1020 and display information corresponding to the data.

Hereinafter, the fourth embodiment will be described by way of the example of the terrestrial digital broadcasting.

The broadcasting station 1080 transmits a broadcast wave containing broadcast information composed of data including: broadcast text information, broadcast audio information, and video information. The external display device 1070 receives the broadcast wave transmitted from the broadcasting station 1080 and displays caption information or outputs a sound based on the broadcast text information contained in the broadcast wave. The information processing apparatus 1020 can receive the broadcast wave transmitted from the broadcasting station 1080 to use the content of the broadcast wave in a variety of processing.

(Configuration of Information Processing Apparatus 1020)

Next, the configuration of the information processing apparatus 1020 according to the present embodiment will be described in detail. The hardware configuration of the information processing apparatus 1020 according to the present embodiment is substantially the same as the hardware configuration according to the third embodiment, and detailed descriptions thereof will be omitted.

Figure 38:
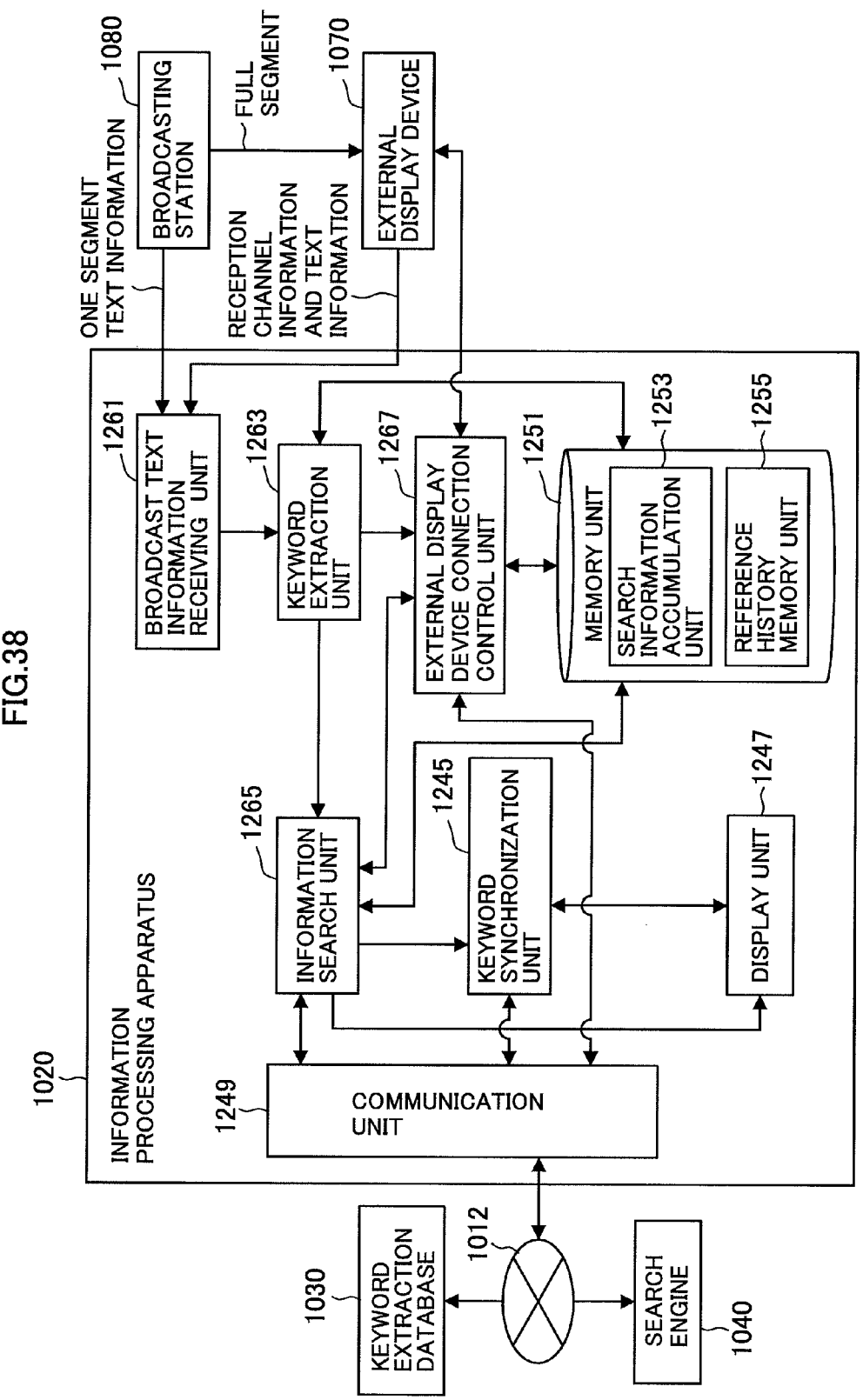
FIG. 38 is a block diagram for explaining the configuration of an information processing apparatus according to the fourth embodiment.

FIG. 38 is a block diagram for explaining the configuration of the information processing apparatus 1020 according to the fourth embodiment. As shown in FIG. 38, the information processing apparatus 1020 according to the present embodiment includes a keyword synchronization unit 1245, a display unit 1247, a communication unit 1249, a memory unit 1251, a broadcast text information receiving unit 1261, a keyword extraction unit 1263, an information search unit 1265, and an external display device connection control unit 1267.

The keyword synchronization unit 1245 transmits the keywords extracted by the keyword extraction unit 1237 from the voice data to the other information processing apparatus 1020 via the communication unit 1249, thereby synchronizing the first and second information processing apparatuses 1020A and 1020B. The keyword synchronization process can be performed not only in the direction from the information processing apparatus 1020 to another information processing apparatus 1020, but also from the another information processing apparatus 1020 to the information processing apparatus 1020 in the following manner. That is, the information processing apparatus 1020 may response to the keyword synchronization process initiated by the another information processing apparatus 1020 so that the keywords transmitted from the another information processing apparatus 1020 are received to the information processing apparatus 1020.

The display unit 1247 displays the information search result transmitted from the information search unit 1265 to an output device such as a display or the like provided to the information processing apparatus 1020 via a browser application, for example. The information that the information search unit 1265 acquires from the search engine 1040 contains a URL or the like of the information or articles in the search engine 1040. Therefore, when the user of the information processing apparatus 1020 selects the displayed information by means of an input device such as a mouse or a keyboard connected to the information processing apparatus 1020, the display unit 1247 requests the information search unit 1265 to acquire the details of the selected information.

The communication unit 1249 is a communication device installed in the information processing apparatus 1020, for example. The communication unit 1249 relays communication of information via the communication network 1012 between the information processing apparatus 1020, specifically, the information search unit 1265, the keyword extraction unit 1263, and the keyword synchronization unit 1245 of the information processing apparatus 1020, and the external device of the information processing apparatus 1020, specifically the keyword extraction database 1030, the search engine 1040 or another information processing apparatus 1020.

Moreover, the communication unit 1249 can communicate information with other information processing apparatus that are directly connected to the information processing apparatus 1020 not via the communication network 1012.

The memory unit 1251 is a storage device installed in the information processing apparatus 1020, for example, and stores therein data such as the keywords extracted by the keyword extraction unit 1263 or the search information acquired by the information search unit 1265. Besides these data, the memory unit 1251 can store therein a variety of databases. Furthermore, the memory unit 1251 may further appropriately store therein a variety of parameters that need be stored when the information processing apparatus 1020 performs a process and progress information of the process. The memory unit 1251 is accessible when the information search unit 1265, the keyword synchronization unit 1245, or the like freely performs reading or writing to the memory unit 1251. The memory unit 1251 further includes a search information accumulation unit 1253 and a reference history memory unit 1255.

The search information accumulation unit 1253 accumulates the search information acquired by the information search unit 1265 and the information acquisition data in a correlated manner. When it is desired to display once-acquired search information, the information stored in the search information accumulation unit 1253 can be referenced to display the once-acquired search information.

The reference history memory unit 1255 stores, as a reference history, the keywords that the user of the information processing apparatus 1020 has referenced among the keywords or articles displayed on the display unit 1247 for more detailed information. The reference history is data that includes the referenced keywords, weight information of the referenced keywords, an identifier of the voice chat itself having referenced the keywords, and a counterpart of the voice chat. The reference history stored in the reference history memory unit 1255 may be used when the keyword extraction unit 1263 extracts the keywords.

The information search unit 1265, the keyword synchronization unit 1245, and the display unit 1247 may be constructed by a specialized hardware that is specialized to the respective function and may be provided as an application program such as a speech recognition program.

The broadcast text information receiving unit 1261 acquires, from the external display device 1070, reception channel information concerning a broadcast channel through which the external display device 1070 is currently receiving. Here, the reception channel information refers to information that represents a broadcast channel through which the external display device 1070 is currently receiving. The broadcast text information receiving unit 1261 can synchronize the reception broadcast channel of the broadcast text information receiving unit 1261 with the reception broadcast channel of the external display device 1070 by acquiring the reception channel information from the external display device 1070.

The broadcast text information receiving unit 1261 receives a broadcast wave corresponding to the reception broadcast channel of the external display device 1070 directly from the broadcasting station 1080 based on the acquired reception channel information. At this time, the broadcast text information receiving unit 1261 may be configured to directly receive an one-segment broadcast wave among the broadcast wave transmitted from the broadcasting station 1080 and acquires text information from the received wave. The broadcast text information receiving unit 1261 may be configured to directly receive the full-segment broadcast wave transmitted from the broadcasting station 1080.

The broadcast text information receiving unit 1261 may be configured to receive the broadcast text information received by the external display device 1070 and transmitted to the information processing apparatus 1020 from the external display device 1070 based on the acquired reception channel information.

The broadcast text information receiving unit 1261 outputs the received broadcast text information to the keyword extraction unit 1263 described later. The broadcast text information receiving unit 1261 may record the received broadcast text information in the memory unit 1251.

The keyword extraction unit 1263 extracts keywords from the character string contained in the broadcast text information received by the broadcast text information receiving unit 1261 based on the keyword extraction database 1030.

When the keyword extraction unit 1263 extracts the keywords, the keyword extraction unit 1263 can reference the keyword extraction database 1030 connected to the communication network 1012 via the communication unit 1249.

A plurality of keywords are contained in the character string that represents the broadcast text information. The keyword extraction unit 1263 automatically extracts all the keywords existing in the character string. The keyword extraction unit 1263 transmits the extracted keywords to the information search unit 1265 and the external display device control unit 1267, which will be described later. The keyword extraction unit 1263 may store the extracted keywords in the memory unit 1251.

The information search unit 1265 stores, in the memory unit 1251, the keywords transmitted from the keyword extraction unit 1263 and the time at which the keywords were transmitted from the keyword extraction unit 1263 in a correlated manner. The information search unit 1265 determines whether or not a keyword synchronization process is to be performed on the keywords transmitted from the keyword extraction unit 1263. When it is determined that the keyword synchronization process should be performed, the information search unit 1265 transmits the keywords to the keyword synchronization unit 1245, thereby requesting the execution of the keyword synchronization process. The information search unit 1265 accesses the search engine 1040 via the communication unit 1249 and performs information search of the keywords transmitted from the keyword extraction unit 1263, thereby acquiring a search result for the keywords and the articles related to the keywords. The information search unit 1265 stores the obtained search result in the search result storage unit 1253 of the memory unit 1251 and transmits the search result to the display unit 1247 and the external display device connection control unit 1267 described later. Here, the search result that the information search unit 1265 acquires from the search engine 1040 includes a title or an URL of information about the search keyword in the search engine 1040 and a metadata of information, such as a genre of the information.

When requested by the display unit 1247 or the external display device connection control unit 1267 to acquire more detailed information about a specific keyword or an article related to the keyword, the information search unit 1265 accesses the search engine 1040 via the communication unit 1249 to acquire the more detailed information and stores the specific keyword notified from the display unit 1247 or the external display device connection control unit 1267 in the reference history memory unit 1255 of the memory unit 1251.

The external display device connection control unit 1267 performs connection control between the information processing apparatus 1020 and the external display device 1070 connected to the information processing apparatus 1020. The external display device connection control unit 1267 transmits the keywords extracted by the keyword extraction unit 1263 and the search result for the keywords acquired by the information search unit 1265 to the external display device 1070. When requested by the external display device 1070 to acquire more detailed information about a specific keyword or an article related to the keyword, the external display device connection control unit 1267 may transmit the request to the information search unit 1265. When the information search unit 1265 acquires more detailed information from the search engine 1040 or the like in response to the request, the external display device connection control unit 1267 outputs the detailed information acquired by the information search unit 1265 to the external display device 1070. Incidentally, when transmitting data corresponding to a variety of information to the external display device 1070, the external display device connection control unit 1267 may transform a format of the data to be transmitted into a format that can be displayed by the external display device 1070.

The external display device connection control unit 1267 may transmit, to the search engine 1040, information on the selected keywords based on the content recorded in the reference history memory unit 1255. The search engine 1040 can use the information transmitted from the external display device connection control unit 1267 in a variety of processing executed within the search engine 1040.

Hereinabove, an example of the function of the information processing apparatus 1020 according to the present embodiment has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

The information processing apparatus 1020 according to the present embodiment may further include the speech recognition unit or the voice conversation control unit of the information processing apparatus 1020 according to the third embodiment. The information processing apparatus 1020 may further include a database memory unit that stores the content of the keyword extraction database 1030. With this, the content of the keyword extraction database 1030 can be stored in the database memory unit provided in the information processing apparatus 1020. Therefore, it is possible to shorten the time necessary for the information processing apparatus 1020 to access the keyword extraction database 1030. As a result, it is possible to shorten the time necessary for the information processing apparatus 1020 to perform the keyword extraction. In addition, by updating the content of the database memory unit on a periodic basis, the information processing apparatus 1020 can acquire the content of the updated database recorded in the keyword extraction database 1030.

(Configuration of External Display Device 1070)

Figure 39:
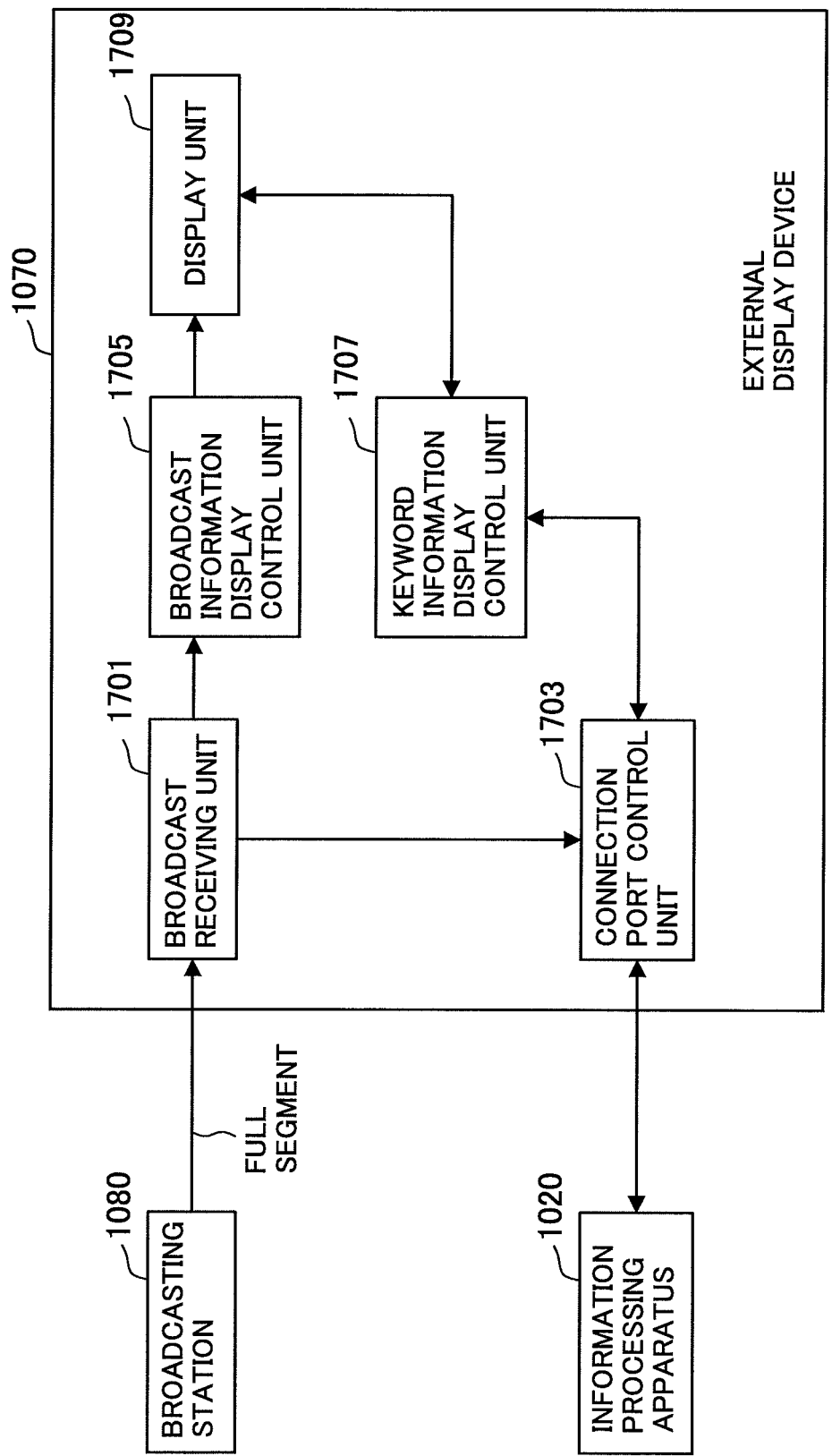
FIG. 39 is a block diagram for explaining the configuration of an external display device according to the fourth embodiment.
Figure 40:
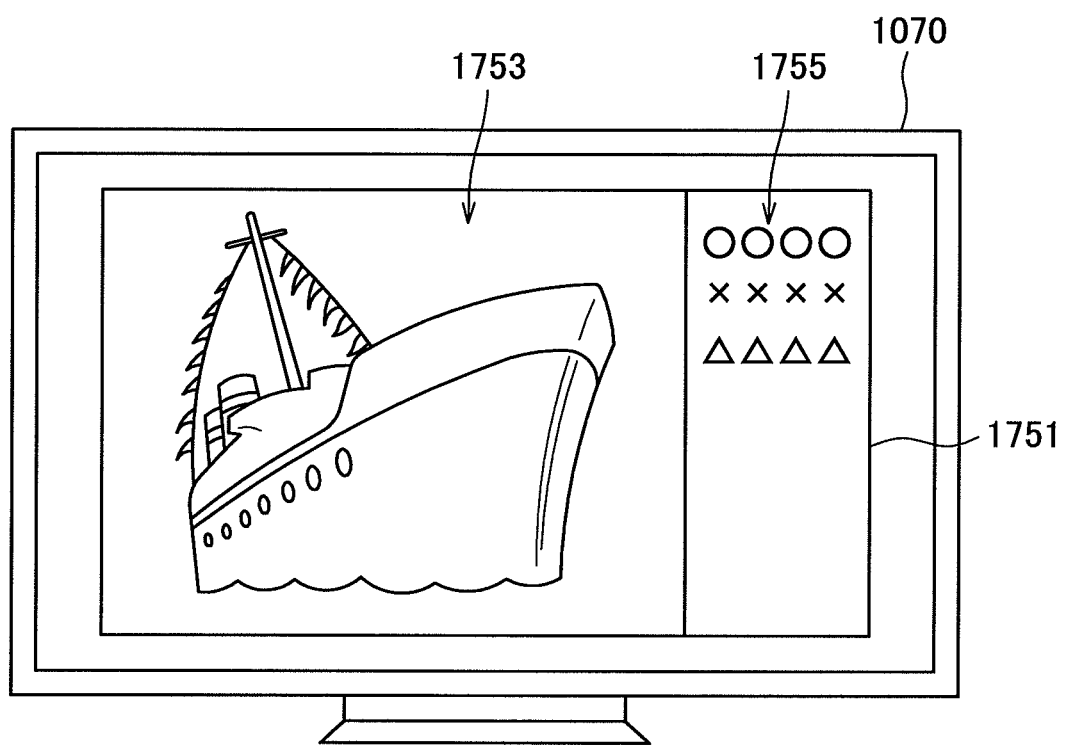
FIG. 40 is an explanatory diagram showing an information display screen of the external display device according to the fourth embodiment.

Next, the configuration of the external display device 1070 according to the present embodiment will be described in detail with reference to FIGS. 39 and 40. FIG. 39 is a block diagram for explaining the configuration of an external display device according to the fourth embodiment. FIG. 40 is an explanatory diagram showing an information display screen of the external display device according to the second embodiment.

The hardware of the external display device 1070 according to the present embodiment includes a display element such as a CRT, a liquid crystal display panel, a plasma display panel, or an EL panel, and a drive control circuit that is constructed by CPU, ROM, and RAM and used in controlling the driving of the display element.

As shown in FIG. 39, the external display device 1070 of the present embodiment includes a broadcast receiving unit 1701, a connection port control unit 1703, a broadcast information display control unit 1705, a keyword information display control unit 1707, and a display unit 1709.

The broadcast receiving unit 1701 receives a broadcast wave transmitted from the broadcasting station 1080 and outputs data such as broadcast text information, broadcast audio information, or video information, contained in the broadcast wave to the connection port control unit 1703 and the broadcast information display control unit 1705, which will be described later. The broadcast receiving unit 1701 may be configured to record the received information in a memory unit (not shown) provided in the external display device 1070 or an externally attached memory unit (not shown) connected to the external display device 1070.

The connection port control unit 1703 controls a connection port such as HDMI-CEC capable of digital communication with the information processing apparatus 1020. The connection port control unit 1703 transmits the reception channel information about the broadcast channel, through which the broadcast receiving unit 1701 is receiving, to the information processing apparatus 1020 via the connection port such as MDMI-CEC. The data received by the broadcast receiving unit 1701, such as broadcast text information, broadcast audio information, and video information, may be output to the information processing apparatus 1020 via the connection port control unit 1703. The variety of data transmitted from the information processing apparatus 1020 are input to the external display device 1070 via the connection port control unit 1703. The variety of data transmitted from the information processing apparatus 1020 are transmitted to the keyword information display control unit 1707 described later.

The broadcast information display control unit 1705 performs display control when displaying the broadcast text information, the broadcast audio information, and the video information transmitted from the broadcast receiving unit 1701 on the display unit 1709 described later.

The keyword information display control unit 1707 performs display control when displaying the keyword information transmitted from the information processing apparatus 1020 on the display unit 1709 described later. Here, the keyword information transmitted from the information processing apparatus 1020 refers to information that includes the keywords extracted by the information processing apparatus 1020, a search result for the extracted keywords, and the articles related to the keywords. Upon receiving, from the display unit 1709, a request for acquisition of detailed information on the information selected by the user of the external display device 1070 selecting the information displayed on the display unit 1709 by means of an input device such as a mouse, a keyboard, or a remote controller, the keyword information display control unit 1707 transmits the detailed information acquisition request to the information processing apparatus 1020 via the connection port control unit 1703.

The display unit 1709 displays, on an information display screen of the external display device 1070, the broadcast text information, the broadcast audio information, and the video information, which are display-controlled by the broadcast information display control unit 1705, and the keyword information, which is display-controlled by the keyword information display control unit 1707.

The information display screen 1751 of the external display device 1070 normally includes an image display area 1753 on which the broadcast text information, the broadcast audio information, and the video information are displayed. Here, when the keyword information is transmitted from the information processing apparatus 1020, the display area of the information display screen 1751 is divided to generate a keyword information display area 1755 on which the keyword information is displayed. The image display area 1753 is controlled, for example, by the broadcast information display control unit 1705, and the keyword information display area 1755 is controlled, for example, by the keyword information display control unit 1707.

The details of the keyword information display area 1755 are substantially the same as the search result display screen 1050 of the information processing apparatus according to the third embodiment of the present invention, and detailed descriptions thereof will be omitted.

Hereinabove, an example of the function of the external display device 1070 according to the present invention has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

(Keyword Extraction Method)

Figure 41:
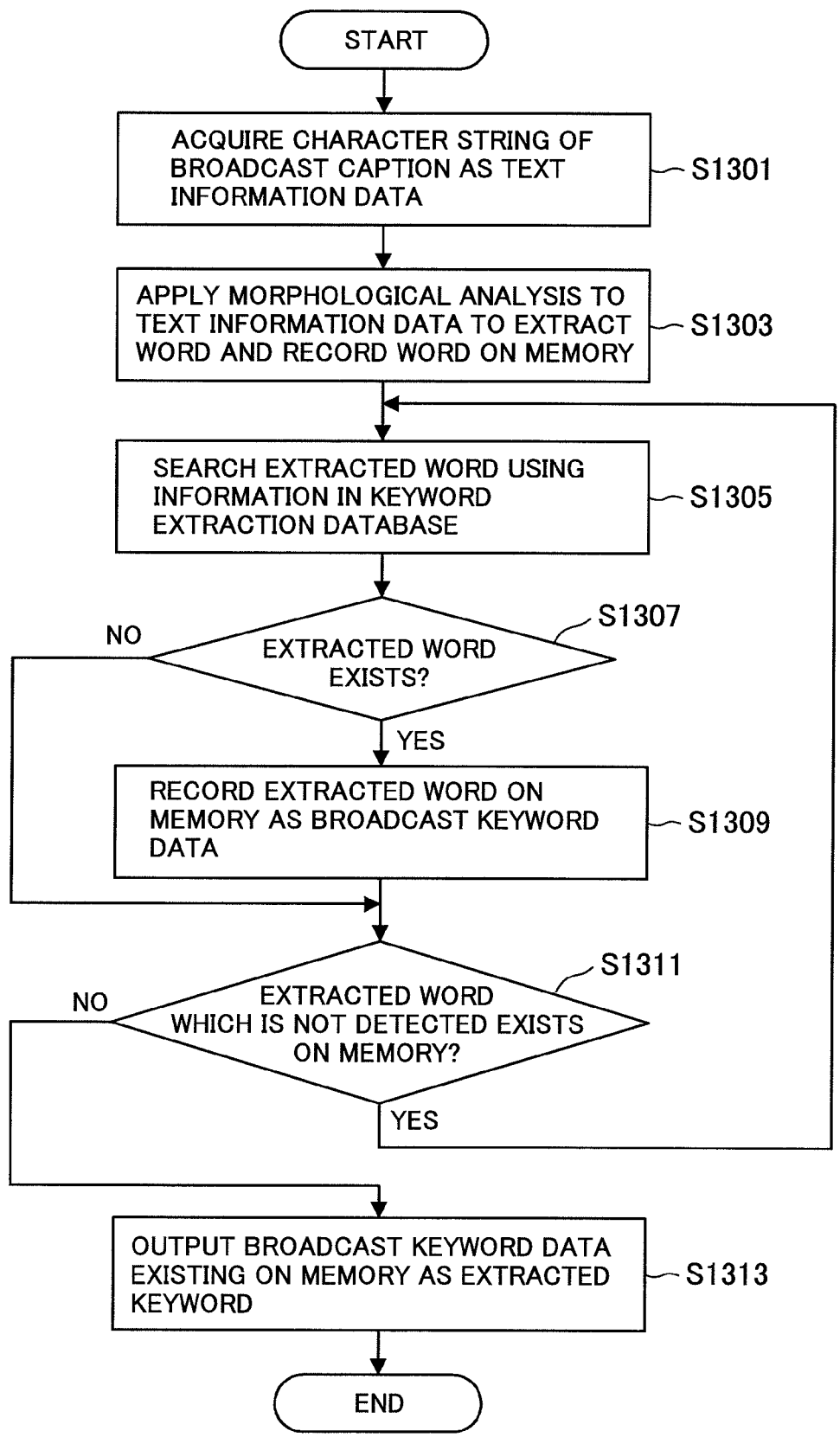
FIG. 41 is flowchart for explaining a keyword extraction method according to the fourth embodiment.

Next, an example of a keyword extraction method performed by the information processing apparatus 1020 according to the present embodiment will be described in detail with reference to FIG. 41. FIG. 41 is a flowchart for explaining a keyword extraction method according to the fourth embodiment.

First, the broadcast text information receiving unit 1261 of the information processing apparatus 1020 receives broadcast text information from the external display device 1070 or the broadcasting station 1080 based on the reception channel information acquired from the external display device 1070, thereby acquiring the character string of the broadcast caption as text information data (Step S1301). The broadcast text information receiving unit 1261 outputs the acquired text information data to the keyword extraction unit 1263.

Next, the keyword extraction unit 1263 applies morphological analysis to the transmitted text information data to extract words from the character string and records the extracted words on a memory of the information processing apparatus 1020 (Step S1303).

Next, the keyword extraction unit 1263 searches for the extracted words using the information of the keyword extraction database 1030 connected to the communication network 1012 or the content of the keyword extraction database 1030 (Step S1305).

Subsequently, the keyword extraction unit 1263 determines whether or not the extracted words exist in the keyword extraction database 1030 (Step S1307). When the extracted words exist in the keyword extraction database 1030, the keyword extraction unit 1263 records the existing extracted words on the memory as broadcast keyword data (Step S1309). When the extracted words do not exist in the keyword extraction database 1030, the keyword extraction unit 1263 performs a process of Step S1311 described later.

Next, the keyword extraction unit 1263 determines whether or not the extracted words, which were not found in the keyword extraction database 1030, exist on the memory (Step S1311). When the unfound words exist on the memory, the process of Step S1305 is performed. When the unfound words do not exist in the memory, the keyword extraction unit 1263 outputs the broadcast keyword data existing on the memory as an extracted keyword (Step S1313).

By using the method described above, the information processing apparatus 1020 according to the present embodiment can extract keywords from the received broadcast text information.

The keyword synchronization method executed by the information processing apparatus 1020 according to the present embodiment is substantially the same as the keyword synchronization method executed by the information processing apparatus 1020 according to the third embodiment of the present embodiment, and detailed descriptions thereof will be omitted.

In the information processing apparatus 1020 according to the present embodiment, the words (keywords) existing in the keyword extraction database 1030 are automatically extracted from the broadcast text information transmitted from the broadcasting station 1080. Therefore, it is possible to display the extracted keywords to the external display device 1070. By using such a function, the user performing bidirectional communication such as a chat using the information processing apparatus 1020 or the external display device 1070 can use the extracted keywords as a topic of the chat or the like.

Figure 42:
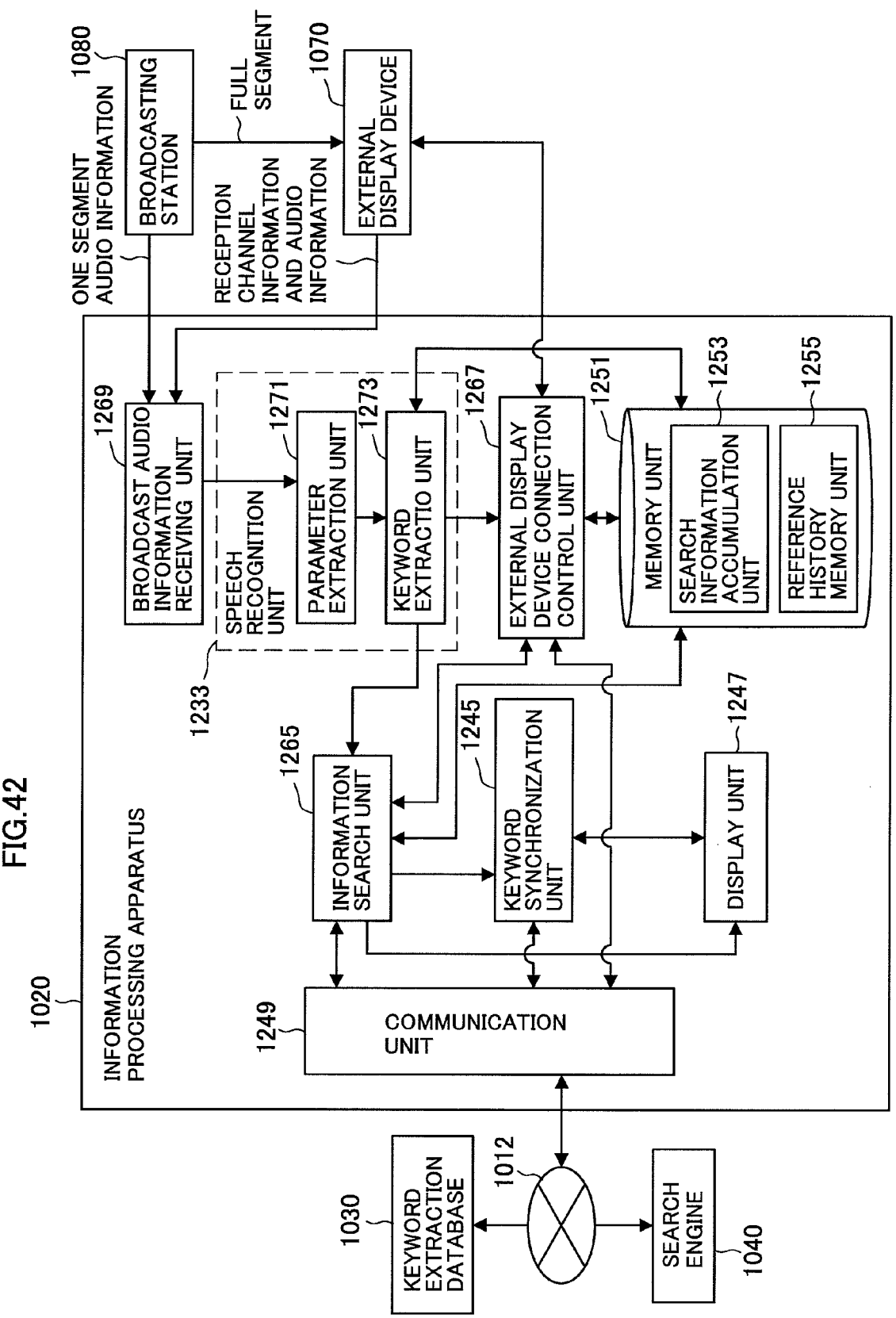
FIG. 42 is a block diagram for explaining the configuration of a first modified example of the information processing apparatus according to the fourth embodiment.
Figure 43:
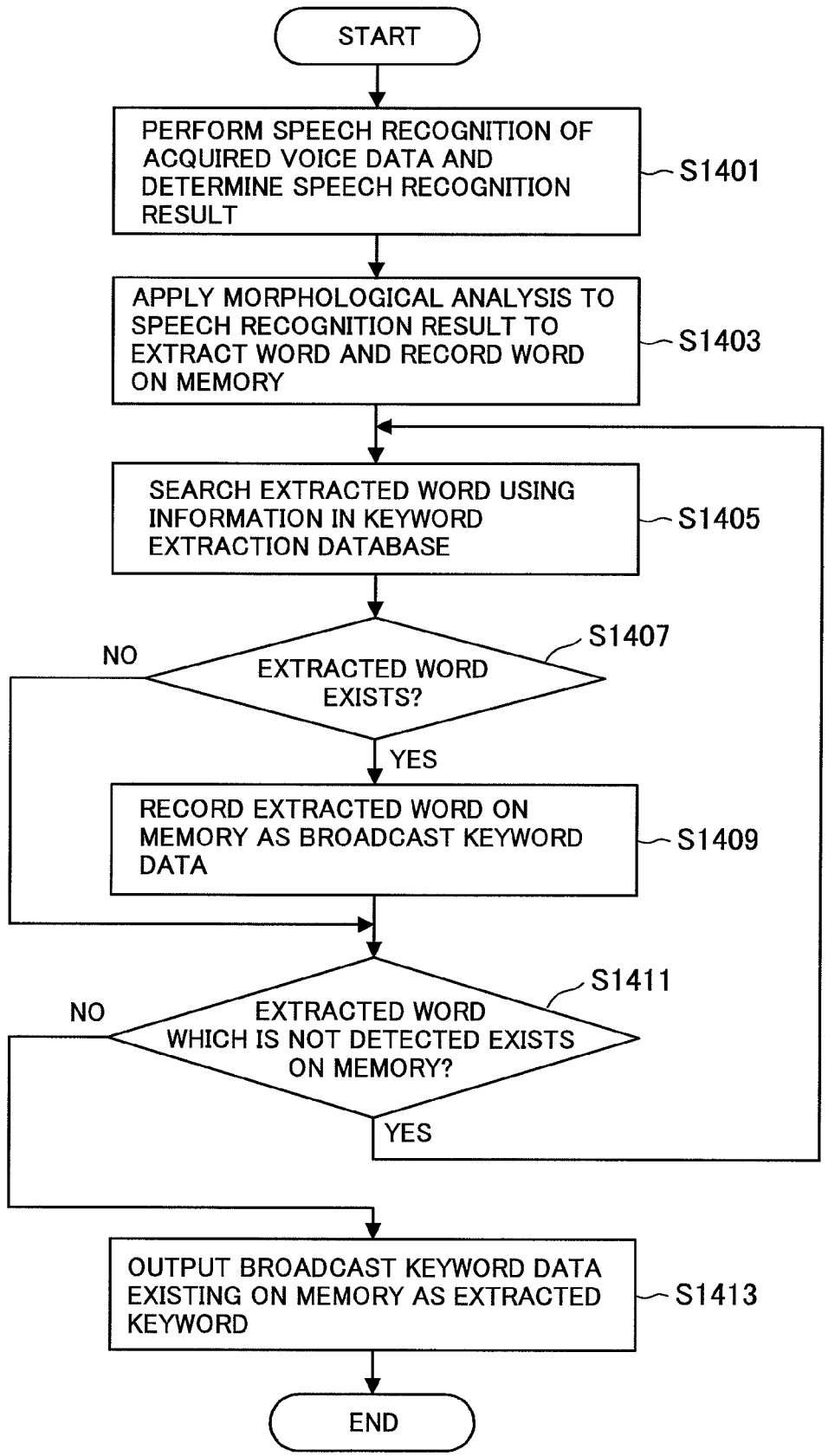
FIG. 43 is a flowchart for explaining a keyword extraction method according to the first modified example.

First Modified Example of Information Processing Apparatus according to Fourth Embodiment Next, a first modified example of the information processing apparatus 1020 according to the present embodiment will be described in detail with reference to FIGS. 42 and 43. FIG. 42 is a block diagram for explaining the configuration of the information processing apparatus 1020 according to the present modified example. FIG. 43 is a flowchart for explaining a keyword extraction method according to the present modified example. The hardware configuration of the information processing apparatus 1020 according to the present modified example is substantially the same as the hardware configuration of the fourth embodiment of the present invention, and detailed descriptions thereof will be omitted.

As shown in FIG. 42, the information processing apparatus 1020 according to the present modified example includes a keyword synchronization unit 1245, a display unit 1247, a communication unit 1249, a memory unit 1251, a broadcast audio information receiving unit 1269, an information search unit 1265, an external display device connection control unit 1267, a parameter extraction unit 1271, and a keyword extraction unit 1273.

The keyword synchronization unit 1245, the display unit 1247, the communication unit 1249, the memory unit 1251, the information search unit 1265, and the external display device connection control unit 1267 according to the present modified example have substantially the same configuration and provides substantially the same effect as the keyword synchronization unit 1245, the display unit 1247, the communication unit 1249, the memory unit 1251, the information search unit 1265, and the external display device connection control unit 1267, and detailed descriptions thereof will be omitted.

The broadcast audio information receiving unit 1269 acquires, from the external display device 1070, reception channel information concerning a broadcast channel through which the external display device 1070 is currently receiving. The broadcast audio information receiving unit 1269 can synchronize the reception broadcast channel of the broadcast audio information receiving unit 1269 with the reception broadcast channel of the external display device 1070 by acquiring the reception channel information from the external display device 1070.

The broadcast audio information receiving unit 1269 receives a broadcast wave corresponding to the reception broadcast channel of the external display device 1070 directly from the broadcast 1080 based on the acquired reception channel information. At this time, the broadcast audio information receiving unit 1269 may directly receive an one-segment broadcast wave among the broadcast wave transmitted from the broadcasting station 1080 and acquire audio information from the received wave. The broadcast audio information receiving unit 1269 may be configured to directly receive the full-segment broadcast wave transmitted from the broadcasting station 1080.

The broadcast audio information receiving unit 1269 may be configured to receive the broadcast audio information received by the external display device 1070 and transmitted to the information processing apparatus 1020 from the external display device 1070 based on the acquired reception channel information.

The broadcast audio information receiving unit 1269 outputs the received broadcast audio information to the keyword extraction unit 1271. The broadcast audio information receiving unit 1269 may record the received broadcast audio information in the memory unit 1251.

The parameter extraction unit 1271 and the keyword extraction unit 1273 are processing units of the speech recognition unit 1233 of the information processing apparatus 1020 according to the present modified example. The parameter extraction unit 1271 extracts feature parameters such as Mel Frequency Cepstrum Coefficients (MFCC) and time difference parameter thereof, spectrum of the voice data, power linear predictive coefficients, cepstrum coefficients, and a line spectrum pair, from each frame (at appropriate time intervals) of the generated voice data.

The parameter extraction unit 1271 transmits the extracted feature parameters to the keyword extraction unit 1273. The parameter extraction unit 1273 may store, in the memory unit 1251 described later, the extracted feature parameters.

The keyword extraction unit 1273 extracts keywords from the voice data contained in the broadcast audio information based on the keyword extraction database 1030 and the feature parameters generated and extracted by the parameter extraction unit 1271. When the keyword extraction unit 1273 extracts the keywords, the keyword extraction unit 1273 can reference the keyword extraction database 1030 connected to the communication network 1012 via the communication unit 1249.

Typically, a plurality of keywords is contained in the voice data contained in the broadcast audio information. The keyword extraction unit 1273 automatically extracts all the keywords existing in the voice data. The keyword extraction unit 1273 transmits the extracted keywords to the information search unit 1265. The keyword extraction unit 1273 may store the extracted keywords in the memory unit 1251.

Hereinabove, an example of the function of the information processing apparatus 1020 according to the present modified example has been described. The components described above may be constructed using a general-purpose element or circuit or may be constructed by a specialized hardware that is specialized to the functions of the respective components. The whole functions of the components may be executed by a CPU or the like. Therefore, the hardware configuration can be appropriately modified in accordance with the level of technology at the time of practicing the present embodiment.

The information processing apparatus 1020 according to the present modified example may further include the voice conversation control unit of the information processing apparatus 1020 according to the third embodiment of the present invention. The information processing apparatus 1020 may further include a database memory unit that stores the content of the keyword extraction database 1030. With this, the content of the keyword extraction database 1030 can be stored in the database memory unit provided in the information processing apparatus 1020. Therefore, it is possible to shorten the time necessary for the information processing apparatus 1020 to access the keyword extraction database 1030. As a result, it is possible to shorten the time necessary for the information processing apparatus 1020 to perform the keyword extraction.

(Keyword Extraction Method)

Next, an example of a keyword extraction method performed by the information processing apparatus 1020 according to the present modified example will be described in detail with reference to FIG. 43.

First, the broadcast audio information receiving unit 1269 of the information processing apparatus 1020 receives broadcast audio information from the external display device 1070 or the broadcasting station 1080 based on the reception channel information acquired from the external display device 1070. The parameter extraction unit 1271 and the keyword extraction unit 1273 perform speech recognition on the voice data and determine a speech recognition result (Step S1401).

Next, the keyword extraction unit 1273 applies morphological analysis to the speech recognition result to extract words from the speech recognition result and records the extracted words on a memory of the information processing apparatus 1020 (Step S1403).

Next, the keyword extraction unit 1273 searches for the extracted words using the information of the keyword extraction database 1030 connected to the communication network 1012 or the content of the keyword extraction database 1030 (Step S1405).

Subsequently, the keyword extraction unit 1273 determines whether or not the extracted words exist in the keyword extraction database 1030 (Step S1407). When the extracted words exist in the keyword extraction database 1030, the keyword extraction unit 1273 records the existing extracted words on the memory as broadcast keyword data (Step S1409). When the extracted words do not exist in the keyword extraction database 1030, the keyword extraction unit 1273 performs a process of Step S1411 described later.

Next, the keyword extraction unit 1273 determines whether or not the extracted words, which were not found in the keyword extraction database 1030, exist on the memory (Step S1411). When the unfound words exist on the memory, the process of Step S1405 is performed. When the unfound words do not exist in the memory, the keyword extraction unit 1273 outputs the broadcast keyword data existing on the memory as an extracted keyword (Step S1413).

By using the method described above, the information processing apparatus 1020 according to the present modified example can extract keywords from the received broadcast audio information.

The keyword synchronization method executed by the information processing apparatus 1020 according to the present modified example is substantially the same as the keyword synchronization method executed by the information processing apparatus 1020 according to the third embodiment of the present invention, and detailed descriptions thereof will be omitted.

In the information processing apparatus 1020 according to the present modified example, the words (keywords) existing in the keyword extraction database 1030 are automatically extracted from the broadcast audio information transmitted from the broadcasting station 1080. Therefore, it is possible to display the extracted keywords to the external display device 1070. By using such a function, the user performing bidirectional communication such as a chat using the information processing apparatus 1020 or the external display device 1070 can use the extracted keywords as a topic of the chat or the like.

It should be understood by those skilled in the art that various modifications, combinations, sub-combinations and alterations may occur depending on design requirements and other factors insofar as they are within the scope of the attached claims or the equivalents thereof.

For example, in the embodiments described above, the broadcasting station 1080 transmits a terrestrial digital broadcasting. However, the broadcasting station 1080 may provide a cable broadcasting or an Internet broadcasting.

In the embodiments described above, FIG. 38 shows the case in which the broadcasting station 1080 provides a television program through a terrestrial digital broadcasting. However, AV contents provided by a camcorder that user can personally capture and reproduce images with.

In the embodiments described above, two information processing apparatuses perform the voice chat. However, in the voice chat system according to the present embodiment, the voice chat may be performed among plural information processing apparatuses, and the keyword synchronization may be performed between the respective information processing apparatuses.

As described above, according to the embodiment of the present invention, keywords related to the content of the conversation during a voice chat are automatically and efficiently synchronized. In addition, keywords contained in broadcast information are automatically and efficiently synchronized.

What is claimed is:

1. A voice chat system, comprising:
a plurality of information processing apparatuses that perform a voice chat while performing speech recognition; and
a search server connected to the plural information processing apparatuses via a communication network,
wherein the search server discloses a search keyword list containing the search keywords searched by the search server and rank information associated with the search keyword list to at least one of the information processing apparatuses, the at least one information processing apparatus comprising:
a recognition word dictionary generating unit that acquires the search keyword list from the search server to generate a recognition word dictionary containing words for use in the speech recognition;
a speech recognition unit that performs speech recognition on voice data obtained from a dialog of the conversation during the voice chat by referencing a recognition database containing the recognition word dictionary;
a voice conversation control unit that performs communication control of the voice data with at least one information processing apparatus; and
a keyword detection unit that detects keywords related to the content of the conversation during the voice chat from the result of the speech recognition,
wherein the search server represents a website that provides a keyword search service and a directory search service so that a user uses the search server to search for information available through Internet.

2. An information processing apparatus acquiring, from a search server, a search keyword list containing the search keywords searched by the search server and rank information associated with the search keyword list and performing a voice chat with other information processing apparatus, the apparatus comprising:
a recognition word dictionary generating unit that acquires the search keyword list from the search server to generate a recognition word dictionary containing words for use in the speech recognition;
a speech recognition unit that performs speech recognition on voice data obtained from a dialog of the conversation during the voice chat by referencing a recognition database containing the recognition word dictionary;

a voice conversation control unit that performs communication control of the voice data with the other information processing apparatus; and a keyword detection unit that detects keywords related to the content of the conversation during the voice chat from the result of the speech recognition, wherein the search server represents a website that provides a keyword search service and a directory search service so that a user uses the search server to search for information available through Internet.

3. The information processing apparatus according to claim 2, wherein the recognition word dictionary includes:

a fixed word dictionary in which predetermined words are pre-registered; and a variable word dictionary in which registered words are updated on an as needed basis, and wherein the recognition word dictionary generating unit selects words to be registered in the variable word dictionary from the search keyword list that contains higher-rank search keywords of the search server to generate the variable word dictionary.

4. The information processing apparatus according to claim 3, wherein the recognition word dictionary generating unit determines a preference of a user of the information processing apparatus based on history information of the keywords detected by the keyword detection unit and selects the words from the search keyword list based on the preference.

5. The information processing apparatus according to claim 3, wherein the recognition word dictionary generating unit searches for the words selected from the search keyword list using the search server and acquires a sub-keyword related to the words from a search result obtained by the search, thereby registering the sub-keyword in the variable word dictionary in a correlated manner with the words.

6. The information processing apparatus according to claim 3, wherein the recognition word dictionary generating unit applies a weight to the respective words selected from the search keyword list based on search rank information that is determined by a frequency of the words being searched by the search server.

7. The information processing apparatus according to claim 6, wherein the recognition word dictionary generating unit calculates a frequency of the keywords based on history information of the keywords detected by the keyword detection unit and changes the weight of the words registered in the variable word dictionary and corresponding to the keywords.

8. An information processing apparatus acquiring, from a search server, a search keyword list containing the search keywords searched by the search server and rank information associated with the search keyword list, selecting words from the search keyword list, acquiring, from a recognition word dictionary generating device that applies weight information for use in speech recognition to the selected words, the words having the weight information applied thereto, and performing a voice chat with other information processing apparatus, the apparatus comprising:

a speech recognition unit that performs speech recognition on voice data obtained from a dialog of the conversation during the voice chat by referencing a recognition database containing the words acquired from the recognition word dictionary generating device;

a voice conversation control unit that performs communication control of the voice data with the other information processing apparatus; and a keyword detection unit that detects keywords related to the content of the conversation during the voice chat from the result of the speech recognition, wherein the search server represents a website that provides a keyword search service and a directory search service so that a user uses the search server to search for information available through Internet.

9. A speech recognition method used in an information processing apparatus, the apparatus acquiring, from a search server, a search keyword list containing the search keywords searched by the search server and rank information associated with the search keyword list and performing a voice chat with other information processing apparatus, the method comprising the steps of:

acquiring the search keyword list from the search server to generate a recognition word dictionary containing words for used in speech recognition;

obtaining voice data from the content of the conversation during the voice chat;

analyzing the voice data based on an acoustic feature of the voice data and generating word sequence candidates corresponding to the content of the conversation; and analyzing the generated word sequence candidates based on a linguistic concatenation feature between the words that constitute the word sequence by referencing a recognition database for use in the speech recognition containing the recognition word dictionary, thereby selecting a most feasible word sequence, wherein the search server represents a website that provides a keyword search service and a directory search service so that a user uses the search server to search for information available through Internet.

10. A speech recognition method used in an information processing apparatus, the apparatus acquiring, from a search server, a search keyword list containing the search keywords searched by the search server and rank information associated with the search keyword list, selecting words from the search keyword list, acquiring, from a recognition word dictionary generating device that applies weight information for use in speech recognition to the selected words, the words having the weight information applied thereto, and performing a voice chat with other information processing apparatus, the method comprising the steps of:

acquiring the words having the weight information applied thereto from the recognition word dictionary generating device and storing the words in a recognition database for use in speech recognition;

obtaining voice data from the content of the conversation during the voice chat;

analyzing the voice data based on an acoustic feature of the voice data and generating word sequence candidates corresponding to the content of the conversation; and analyzing the generated word sequence candidates based on a linguistic concatenation feature between the words that constitute the word sequence by referencing the recognition database, thereby selecting a most feasible word sequence, wherein the search server represents a website that provides a keyword search service and a directory search service so that a user uses the search server to search for information available through Internet.

11. A non-transitory storage medium storing a program for a computer that controls an information processing apparatus, the apparatus acquiring, from a search server, a search keyword list containing the search keywords searched by the search server and rank information associated with the search keyword list and performing a voice chat with other information processing apparatus, the program allowing the computer to execute:

a recognition word dictionary generating function that acquires the search keyword list from the search server to generate a recognition word dictionary containing words for use in the speech recognition;

a speech recognition function that performs speech recognition on voice data obtained from a dialog of the conversation during the voice chat by referencing a recognition database containing the recognition word dictionary;

a voice conversation control function that performs communication control of the voice data with the other information processing apparatus; and a keyword detection function that detects keywords related to the content of the conversation during the voice chat from the result of the speech recognition, wherein the search server represents a website that provides a keyword search service and a directory search service so that a user uses the search server to search for information available through Internet.

12. A non-transitory storage medium storing a program for a computer that controls an information processing apparatus, the apparatus acquiring, from a search server, a search keyword list containing the search keywords searched by the search server and rank information associated with the search keyword list, selecting words from the search keyword list, acquiring, from a recognition word dictionary generating device that applies weight information for use in speech recognition to the selected words, the words having the weight information applied thereto, and performing a voice chat with other information processing apparatus, the program allowing the computer to execute:

a speech recognition function that performs speech recognition on voice data obtained from a dialog of the conversation during the voice chat by referencing a recognition database containing the words acquired from the recognition word dictionary generating device;

a voice conversation control function that performs communication control of the voice data with the other information processing apparatus; and a keyword detection function that detects keywords related to the content of the conversation during the voice chat from the result of the speech recognition, wherein the search server represents a website that provides a keyword search service and a directory search service so that a user uses the search server to search for information available through Internet.

13. An information processing apparatus, comprising:

a recognition word dictionary generating unit that acquires, from a search server, a search keyword list containing the search keywords searched by the search server and rank information associated with the search keyword list to generate a recognition word dictionary containing words for use in language recognition;

a broadcast text information receiving unit that receives broadcast text information transmitted from a broadcasting station;

a keyword detection unit that detects predetermined keywords from the broadcast text information by referencing the recognition word dictionary; and an external display device connection control unit that performs connection control with an external display device and outputs the keywords detected from the broadcast text information to the external display device, wherein the search server represents a website that provides a keyword search service and a directory search service so that a user uses the search server to search for information available through Internet.

14. The information processing apparatus according to claim 13, wherein the broadcast text information receiving unit acquires reception channel information concerning a broadcast channel through which the external display device is receiving and the broadcast text information corresponding to the broadcast channel from the external display device connected to the information processing apparatus.

15. The information processing apparatus according to claim 13, wherein the broadcast text information receiving unit acquires reception channel information concerning a broadcast channel through which the external display device is receiving, from the external display device connected to the information processing apparatus, and acquires the broadcast text information corresponding to the broadcast channel from the broadcasting station.

16. The information processing apparatus according to claim 13, wherein the information processing apparatus stores a reference history of the keywords in the external display device, and wherein the external display device connection control unit notifies the search engine of a keyword selected by the external display device.

17. An information processing apparatus, comprising:

a recognition word dictionary generating unit that acquires, from a search server, a search keyword list containing the search keywords searched by the search server and rank information associated with the search keyword list to generate a recognition word dictionary containing words for use in speech recognition;

a broadcast audio information receiving unit that receives broadcast audio information transmitted from a broadcasting station;

a speech recognition unit that performs speech recognition on the broadcast audio information by referencing a recognition database containing the recognition word dictionary;

a keyword detection unit that detects predetermined keywords from the result of the speech recognition on the broadcast audio information; and an external display device connection control unit that performs connection control with an external display device and outputs the keywords detected from the broadcast audio information to the external display device, wherein the search server represents a website that provides a keyword search service and a directory search service so that a user uses the search server to search for information available through Internet.

18. The information processing apparatus according to claim 17, wherein the broadcast audio information receiving unit acquires reception channel information concerning a broadcast channel through which the external display device is receiving and the broadcast audio information corresponding to the broadcast channel from the external display device connected to the information processing apparatus.

19. The information processing apparatus according to claim 17, wherein the broadcast audio information receiving unit acquires reception channel information concerning a broadcast channel through which the external display device is receiving, from the external display device connected to the information processing apparatus, and acquires the broadcast audio information corresponding to the broadcast channel from the broadcasting station.

20. The information processing apparatus according to claim 17, wherein the information processing apparatus stores a reference history of the keywords in the external display device, and
wherein the external display device connection control unit notifies the search engine of a keyword selected by the external display device.

21. A keyword detection method, comprising the steps of:
acquiring, from a search server, a search keyword list containing the search keywords searched by the search server and rank information associated with the search keyword list to generate a recognition word dictionary containing words for use in language recognition;
receiving broadcast text information transmitted from a broadcasting station;
detecting predetermined keywords from the broadcast text information by referencing the recognition word dictionary; and
performing connection control with an external display device and outputting the keywords detected from the broadcast text information to the external display device,
wherein the search server represents a website that provides a keyword search service and a directory search service so that a user uses the search server to search for information available through Internet.

22. A keyword detection method, comprising the steps of:
acquiring, from a search server, a search keyword list containing the search keywords searched by the search server and rank information associated with the search keyword list to generate a recognition word dictionary containing words for use in speech recognition;
receiving broadcast audio information transmitted from a broadcasting station;
performing speech recognition on the broadcast audio information by referencing a recognition database containing the recognition word dictionary;
detecting predetermined keywords from the result of the speech recognition on the broadcast audio information; and
performing connection control with an external display device and outputting the keywords detected from the broadcast audio information to the external display device,
wherein the search server represents a website that provides a keyword search service and a directory search service so that a user uses the search server to search for information available through Internet.

23. A non-transitory storage medium storing a program for allowing a computer to realize:
a recognition word dictionary generating function that acquires, from a search server, a search keyword list containing the search keywords searched by the search server and rank information associated with the search keyword list to generate a recognition word dictionary containing words for use in language recognition;
a broadcast text information receiving function that receives broadcast text information transmitted from a broadcasting station;
a keyword detection function that detects predetermined keywords from the broadcast text information by referencing the recognition word dictionary; and
an external display device connection control function that performs connection control with an external display device and outputs the keywords detected from the broadcast text information to the external display device,
wherein the search server represents a website that provides a keyword search service and a directory search service so that a user uses the search server to search for information available through Internet.

24. A non-transitory storage medium storing a program for allowing a computer to realize:
a recognition word dictionary generating function that acquires, from a search server, a search keyword list containing the search keywords searched by the search server and rank information associated with the search keyword list to generate a recognition word dictionary containing words for use in speech recognition;
a broadcast audio information receiving function that receives broadcast audio information transmitted from a broadcasting station;
a speech recognition function that performs speech recognition on the broadcast audio information by referencing a recognition database containing the recognition word dictionary;
a keyword detection function that detects predetermined keywords from the result of the speech recognition on the broadcast audio information; and
an external display device connection control function that performs connection control with an external display device and outputs the keywords detected from the broadcast audio information to the external display device,
wherein the search server represents a website that provides a keyword search service and a directory search service so that a user uses the search server to search for information available through Internet.

25. A voice chat system, comprising:
a plurality of information processing apparatuses that performs a voice chat;
a keyword extraction database referenced by the information processing apparatuses when extracting keywords from a dialog of the conversation during the voice chat; and
a search engine used by the information processing apparatuses when searching for the keywords and articles related to the keywords using the extracted keywords, the search engine disclosing to at least one information processing apparatus a search keyword list containing search keywords searched by the search engine and rank information associated with the search keyword list,
wherein at least one information processing apparatus includes:
a parameter extraction unit that extracts a parameter from voice data generated from the dialog, the parameter characterizing the voice data;
a keyword extraction unit that recognizes the generated voice data and extracts the keywords from the voice data based on the parameter and the keyword extraction database;
an information search unit that searches for the extracted keywords using the search engine and acquires a search result for the keywords and the articles related to the keywords;
a display unit that displays a keyword that is correlated with address information of the search result for the keyword and an article that is correlated with address information of the articles related to the keywords; and
a keyword synchronization unit that transmits the extracted keywords to an information processing apparatus, which is a counterpart of the chat, and performs keyword synchronization with the counterpart information processing apparatus, wherein the search engine represents a website that provides a keyword search service and a directory search service so that a user uses the search engine to search for information available through Internet.

26. An information processing apparatus performing voice chat with other information processing apparatus, the apparatus comprising:

a parameter extraction unit that extracts a parameter from voice data generated from a dialog of the conversation during the voice chat, the parameter characterizing the voice data;

a keyword extraction unit that recognizes the generated voice data and extracts keywords from the voice data based on the parameter and a keyword extraction database;

an information search unit that searches for the extracted keywords using a search engine and acquires a search result for the keywords and articles related to the keywords, the information search unit acquiring from the search engine a search keyword list containing search keywords searched by the search engine and rank information associated with the search keyword list; and a search information accumulation unit that accumulates the keywords and the articles in a correlated manner with address information of the search result for the keywords and address information of the articles, respectively, wherein the search engine represents a website that provides a keyword search service and a directory search service so that a user uses the search engine to search for information available through Internet.

27. The information processing apparatus according to claim 26, further comprising a keyword synchronization unit that transmits the extracted keywords to an information processing apparatus, which is a counterpart of the chat, and performs keyword synchronization with the counterpart information processing apparatus.

28. The information processing apparatus according to claim 26, further comprising a database memory unit that stores the keyword extraction database.

29. The information processing apparatus according to claim 26, wherein the search engine is provided within the information processing apparatus.

30. The information processing apparatus according to claim 26, further comprising a display unit that displays a keyword that is correlated with address information of the search result for the keyword and an article that is correlated with address information of the articles related to the keywords.

31. The information processing apparatus according to claim 26, further comprising a reference history memory unit that stores a reference history of the keywords.

32. The information processing apparatus according to claim 31, wherein the reference history memory unit stores the referenced keywords in a correlated manner with an identifier assigned to the respective chat and a counterpart of the chat.

33. The information processing apparatus according to claim 31, wherein the keyword extraction unit extracts a keyword placed at a higher rank of the reference history on a preferential basis.

34. The information processing apparatus according to claim 26, wherein the keyword extraction unit extracts a higher-rank search keyword of the search engine on a preferential basis.

35. An information processing apparatus performing voice chat with other information processing apparatus, the at least one information processing apparatus comprising:

a parameter extraction unit that extracts a parameter from voice data generated from a dialog of the conversation during the voice chat, the parameter characterizing the voice data;

a keyword extraction unit that recognizes the generated voice data and extracts keywords from the voice data based on the parameter and a keyword extraction database;

an information search unit that searches for the extracted keywords using a search engine and acquires a search result for the keywords and articles related to the keywords, the information search unit acquiring from the search engine a search keyword list containing search keywords searched by the search engine and rank information associated with the search keyword list; and a search information accumulation unit that accumulates the keywords and the articles in a correlated manner with address information of the search result for the keywords and address information of the articles, respectively, wherein the information processing apparatus comprises a keyword synchronization unit that receives the keywords transmitted from the at least one information processing apparatus and performs keyword synchronization with the corresponding information processing apparatus, wherein the search engine represents a website that provides a keyword search service and a directory search service so that a user uses the search engine to search for information available through Internet.

36. A non-transitory storage medium storing a program for allowing a computer to realize:

a parameter extraction function that extracts a parameter from voice data generated from a dialog of the conversation during the voice chat, the parameter characterizing the voice data;

a keyword extraction function that recognizes the generated voice data and extracts keywords from the voice data based on the parameter and a keyword extraction database;

an information search function that searches for the extracted keywords using a search engine and acquires a search result for the keywords and articles related to the keywords, the information searching function acquiring from the search engine a search keyword list containing search keywords searched by the search engine and rank information associated with the search keyword list; and a search information storage function that stores the keywords and the articles in a correlated manner with address information of the search result for the keywords and address information of the articles, respectively, wherein the search engine represents a website that provides a keyword search service and a directory search service so that a user uses the search engine to search for information available through Internet.

37. A non-transitory storage medium storing a program for allowing a computer to realize:

a keyword synchronization function that receives keywords transmitted from at least one information processing apparatus and performs keyword synchronization with the corresponding information processing apparatus, wherein the keywords are extracted from a speech of a user with reference to a keyword list and associated rank information provided by a search engine representing a that provides a keyword search service and a directory search service so that a user uses the search engine to search for information available through Internet.

38. An information processing apparatus, comprising:

a broadcast text information receiving unit that receives broadcast text information transmitted from a broadcasting station;

a keyword extraction unit that extracts keywords from the broadcast text information based on a keyword extraction database;

an information search unit that searches for the extracted keywords using a search engine and acquires articles related to the keywords, the information search unit acquiring from the search engine a search keyword list containing search keywords searched by the search engine and rank information associated with the search keyword list; and an external display device connection control unit that performs connection control with an external display device and outputs the keywords, a search result for the keywords, and articles related to the keywords to the external display device, wherein the search engine represents a website that provides a keyword search service and a directory search service so that a user uses the search engine to search for information available through Internet.

39. The information processing apparatus according to claim 38, wherein the broadcast text information receiving unit acquires reception channel information concerning a broadcast channel through which the external display device is receiving and the broadcast text information corresponding to the broadcast channel from the external display device connected to the information processing apparatus.

40. The information processing apparatus according to claim 38, wherein the broadcast text information receiving unit acquires reception channel information concerning a broadcast channel through which the external display device is receiving, from the external display device connected to the information processing apparatus, and acquires the broadcast text information corresponding to the broadcast channel from the broadcasting station.

41. The information processing apparatus according to claim 38, further comprising a reference history memory unit that stores a reference history of the keywords in the external display device, wherein the external display device connection control unit notifies the search engine of a keyword selected by the external display device.

42. The information processing apparatus according to claim 38, further comprising a keyword synchronization unit that transmits the extracted keywords to at least one information processing apparatus and performs keyword synchronization with the at least one information processing apparatus.

43. An information processing apparatus, comprising:

a broadcast audio information receiving unit that receives broadcast audio information transmitted from a broadcasting station;

a parameter extraction unit that extracts a parameter from voice data contained in the broadcast audio information, the parameter characterizing the voice data;

a keyword extraction unit that recognizes the voice data and extracts keywords from the voice data based on the parameter and a keyword extraction database;

an information search unit that searches for the extracted keywords using a search engine and acquires a search result for the keywords and articles related to the keywords, the information search unit acquiring from the search engine a search keyword list containing search keywords searched by the search engine and rank information associated with the search keyword list; and an external display device connection control unit that performs connection control with an external display device and outputs the keywords, the search result for the keywords, and the articles related to the keywords to the external display device, wherein the search engine represents a website that provides a keyword search service and a directory search service so that a user uses the search engine to search for information available through Internet.

44. The information processing apparatus according to claim 43, wherein the broadcast audio information receiving unit acquires reception channel information concerning a broadcast channel through which the external display device is receiving and the broadcast audio information corresponding to the broadcast channel from the external display device connected to the information processing apparatus.

45. The information processing apparatus according to claim 43, wherein the broadcast audio information receiving unit acquires reception channel information concerning a broadcast channel through which the external display device is receiving, from the external display device connected to the information processing apparatus, and acquires the broadcast audio information corresponding to the broadcast channel from the broadcasting station.

46. The information processing apparatus according to claim 43, further comprising a reference history memory unit that stores a reference history of the keywords in the external display device, wherein the external display device connection control unit notifies the search engine of a keyword selected by the external display device.

47. The information processing apparatus according to claim 43, further comprising a keyword synchronization unit that transmits the extracted keywords to at least one information processing apparatus and performs keyword synchronization with the at least one information processing apparatus.

48. A non-transitory storage medium storing a program for allowing a computer to realize:

a broadcast text information receiving function that receives broadcast text information broadcast from a broadcasting station;

a keyword extraction function that extracts keywords from the broadcast text information based on a keyword extraction database;

an information search function that searches for the extracted keywords using a search engine and acquires a search result for the keywords and articles related to the keywords, the information search function acquiring from the search engine a search keyword list containing search keywords searched by the search engine and rank information associated with the search keyword list; and an external display device connection control function that performs connection control with an external display device and outputs the keywords, the search result for the keywords, and the articles related to the keywords to the external display device, wherein the search engine represents a website that provides a keyword search service and a directory search service so that a user uses the search engine to search for information available through Internet.

49. A non-transitory storage medium storing a program for allowing a computer to realize:
- a broadcast audio information receiving function that receives broadcast audio information transmitted from a broadcasting station;
- a parameter extraction function that extracts a parameter from voice data contained in the broadcast audio information, the parameter characterizing the voice data;
- a keyword extraction function that recognizes the voice data and extracts keywords from the voice data based on the parameter and a keyword extraction database;
- an information search function that searches for the extracted keywords using a search engine and acquires a search result for the keywords and articles related to the keywords the information search function acquiring from the search engine a search keyword list containing search keywords searched by the search engine and rank information associated with the search keyword list; and
- an external display device connection control function that performs connection control with an external display device and outputs the keywords, the search result for the keywords, and the articles related to the keywords to the external display device,
- wherein the search engine represents a website that provides a keyword search service and a directory search service so that a user uses the search engine to search for information available through Internet.

* * * * *